US009292258B2

(12) United States Patent
Ikarashi et al.

(10) Patent No.: US 9,292,258 B2
(45) Date of Patent: Mar. 22, 2016

(54) SECURE SUM-OF-PRODUCT COMPUTATION METHOD, SECURE SUM-OF-PRODUCT COMPUTATION SYSTEM, COMPUTATION APPARATUS AND PROGRAMS THEREFOR

(75) Inventors: Dai Ikarashi, Tokyo (JP); Koki Hamada, Tokyo (JP); Koji Chida, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 365 days.

(21) Appl. No.: 13/981,251

(22) PCT Filed: Jan. 20, 2012

(86) PCT No.: PCT/JP2012/051199
§ 371 (c)(1),
(2), (4) Date: Jul. 23, 2013

(87) PCT Pub. No.: WO2012/102203
PCT Pub. Date: Aug. 2, 2012

(65) Prior Publication Data
US 2013/0304780 A1    Nov. 14, 2013

(30) Foreign Application Priority Data

Jan. 24, 2011  (JP) ................................. 2011-012126
Mar. 14, 2011  (JP) ................................. 2011-054965
May 17, 2011   (JP) ................................. 2011-110635

(51) Int. Cl.
G06F 7/57      (2006.01)
G06F 7/544     (2006.01)
H04L 9/08      (2006.01)

(52) U.S. Cl.
CPC ................ *G06F 7/57* (2013.01); *G06F 7/5443* (2013.01); *H04L 9/085* (2013.01); *H04L 2209/46* (2013.01)

(58) Field of Classification Search
CPC .............................. G06F 7/5443; H04L 9/085
See application file for complete search history.

(56) References Cited

U.S. PATENT DOCUMENTS

| | | | | |
|---|---|---|---|---|
| 2009/0235085 A1* | 9/2009 | Mathur | ................... | G06F 21/31 713/186 |
| 2010/0054458 A1* | 3/2010 | Schneider | ............... | H04L 9/085 380/28 |
| 2010/0325443 A1* | 12/2010 | Mattsson | ............ | G06F 21/6218 713/189 |
| 2012/0166582 A1* | 6/2012 | Binder | ................... | H04L 63/18 709/217 |

OTHER PUBLICATIONS

Chida, K. et al., "A Three-Party Secure Function Evaluation with Lightweight verifiability Revisited", Computer Security Symposium 2010, vol. 2010, No. 9, pp. 555-560, Oct. 12, 2010 ( with English abstract ).
International Search Report Issued Feb. 21, 2012 in PCT/JP12/051199 filed Jan. 20, 2012.

* cited by examiner

*Primary Examiner* — Chuong D Ngo
(74) *Attorney, Agent, or Firm* — Oblon, McClelland, Maier & Neustadt, L.L.P.

(57) ABSTRACT

There is provided a method that can quickly perform a secure sum-of-product computation by cooperative computation by three parties (computation apparatuses) that is easy to implement. In a secure computation method in which a party X performs a party-X random number generation step, a party-X first computation step and a party-X second computation step, a party Y performs a party-Y random number generation step, a party-Y first computation step and a party-Y second computation step, and a party Z performs a party-Z random number generation step, a party-Z first computation step and a party-Z second computation step, computation processings performed by the parties are symmetrical to each other.

17 Claims, 17 Drawing Sheets

US 9,292,258 B2

SECURE SUM-OF-PRODUCT COMPUTATION METHOD, SECURE SUM-OF-PRODUCT COMPUTATION SYSTEM, COMPUTATION APPARATUS AND PROGRAMS THEREFOR

TECHNICAL FIELD

The present invention relates to a secure sum-of-product computation method, a secure sum-of-product computation system, a computation apparatus and programs therefor for performing data processings, particularly, a multiplication computation and a sum-of-product computation, while concealing data by secret sharing.

BACKGROUND ART

In the field of management and operation of so-called sensitive information, such as customer information and management information, the information to be managed is increasing in variety, and the information processing technology such as cloud computing is changing, so that measures to ensure security and privacy are becoming more important. Recently, the secret sharing art has become popular to prevent leakage of information by distributing the information among plural sites. Besides, a secure functional computation (a multi-party protocol) for deriving a specified computation result without reconstructing the distributed information is also being developed for commercialization. The secret sharing art is effective as a measure to ensure security when storing information but has a risk of leakage of information when using the information, because the information generally needs to be reconstructed for use. In view of the presence of such a risk of leakage of information, the secure functional computation can uses distributed information as operands for computation instead of the original input values and does not need to reconstruct the original input values at all in the computation process. Therefore, the secure functional computation can be said to be an advanced security art that maintains the functionality of the secret sharing art even when the information is used.

A prior art for performing a multiplication while concealing information is a multiplication protocol described in Non-Patent literature 1. A prior art for performing a sum-of-product computation while concealing information is a combination of a multiplication protocol and an addition protocol. These protocols are 3-party secure functional computation protocols that derive a result of an arithmetic/logical operation by cooperative computation by three parties (three computing entities) without reconstructing a shared input value. In the 3-party secure functional computation protocol, data is treated as a natural number smaller than a predetermined prime number p. To conceal data, which will be denoted as "a", the data a is divided into three fragments in such a manner that the fragments satisfy the following condition.

$$a = a_0 + a_1 + a_2 \bmod p$$

In practice, random numbers $a_0$ and $a_1$ are generated, and a relation holds: $a_2 = a - a_0 - a_1$. Then, a random number sequence $(a_0, a_1)$ is transmitted to a party X of the three parties, a random number sequence $(a_1, a_2)$ is transmitted to a party Y of the three parties, and a random number sequence $(a_2, a_0)$ is transmitted to a party Z of the three parties. Since $a_1$ and $a_2$ are random numbers, any of the parties X, Y and Z does not have information about the data a. However, any two of the parties can cooperate to reconstruct the data a.

Since the concealment is an additive distribution, the shared value can be equally reconstructed before or after addition of its fragments because of the interchangeability. That is, the addition and the constant multiplication of the distributed fragments can be achieved without communications. If a multiplication can additionally be performed, a logical circuit can be formed, and any computation can be performed. The multiplication needs communications and random number generation and therefore is a bottleneck of the 3-party secure functional computation.

PRIOR ART LITERATURE

Non-Patent Literature

Non-patent literature 1: Koji Chida, Koki Hamada, Dai Ikarashi, Katsumi Takahashi, "A Three-Party Secure Function Evaluation with Lightweight Verifiability Revisited", CSS2010, 2010.

SUMMARY OF THE INVENTION

Problems to be Solved by the Invention

In the 3-party secure functional computation, the multiplication and the sum-of-product computation requires communications and random number generation and therefore are a bottleneck in the computation processing.

More specifically, the conventional multiplication protocol requires two rounds of communications. In addition, the computation amounts and the communication amounts of the three parties are not symmetrical to each other, so that a different program needs to be implemented in each party. As a result, the implementation cost increases. In addition, the part where the computation amount and the communication amount are at the maximum constitutes a bottleneck. In addition, the sum-of-product computation generally requires a large amount of communications.

An object of the present invention is to provide a secure sum-of-product computation method, a secure sum-of-product computation system, a computation apparatus and a program therefor that can quickly perform a multiplication and a sum-of-product computation and can be readily implemented.

Means to Solve the Problems

A secure sum-of-product computation method according to the present invention is a secure sum-of-product computation method used for performing a sum-of-product computation of data strings $A_0 = (a0_0, \ldots, a0_{na0-1})$, $A_1 = (a1_0, \ldots, a1_{na1-1})$ and $A_2 = (a2_0, \ldots, a2_{na2-1})$ and data strings $B_0 = (b0_0, \ldots, b0_{nb0-1})$, $B_1 = (b1_0, \ldots, b1_{nb1-1})$ and $B_2 = (b2_0, \ldots, b2_{nb2-1})$ by cooperative computation by three computation apparatuses, which are a party X, a party Y and a party Z, the sum-of-product computation being expressed as $$\sum_{i0,j0} (e00_{i0,j0} \cdot a0_{i0} \cdot b0_{j0}) + \qquad \text{[FORMULA 1]}$$

$$\sum_{i0,j1} (e01_{i0,j1} \cdot a0_{i0} \cdot b1_{j1}) + \sum_{i1,j0} (e10_{i1,j0} \cdot a1_{i1} \cdot b0_{j0}) +$$

$$\sum_{i1,j1} (e11_{i1,j1} \cdot a1_{i1} \cdot b1_{j1}) + \sum_{i1,j2} (e12_{i1,j2} \cdot a1_{i1} \cdot b2_{j2}) +$$

-continued $$\sum_{i2,j1}(e21_{i2,j1} \cdot a2_{i2} \cdot b1_{j1}) + \sum_{i2,j2}(e22_{i2,j2} \cdot a2_{i2} \cdot b2_{j2}) +$$

$$\sum_{i2,j0}(e20_{i2,j0} \cdot a2_{i2} \cdot b0_{j0}) + \sum_{i0,j2}(e02_{i0,j2} \cdot a0_{i0} \cdot b2_{j2})$$

(i0=0, ..., na0-1, i1=0, ..., na1-1, i2=0, ..., na2-1, j0=0, ..., nb0-1, j1=0, ..., nb1-1, and j2=0, ..., nb2-1, na0, na1, na2, nb0, nb1 and nb2 represent natural numbers), and comprises a party-X random number generation step, a party-X first computation step, a party-X second computation step, a party-Y random number generation step, a party-Y first computation step, a party-Y second computation step, a party-Z random number generation step, a party-Z first computation step and a party-Z second computation step.

In the processing, the data strings $A_0$, $A_1$, $B_0$ and $B_1$ are input to the party X, the data strings $A_1$, $A_2$, $B_1$ and $B_2$ are input to the party Y, and the data strings $A_2$, $A_0$, $B_2$ and $B_0$ are input to the party Z.

In the party-X random number generation step, the party X generates a number rx and transmits the number to the party Y.

In the party-X first computation step, the party X computes a value $c_X$ according to $$c_X = \sum_{i0,j1}(e01_{i0,j1} \cdot a0_{i0} \cdot b1_{j1}) + \sum_{i1,j0}(e10_{i1,j0} \cdot a1_{i1} \cdot b0_{j0}) + r_X \quad \text{[FORMULA 2]}$$

($e01_{i0,j1}$ and $e10_{i1,j0}$ represent any numbers) and transmits the value to the party Z.

In the party-X second computation step, the party X receives a number $r_Z$ from the party Z and a value $c_Y$ from the party Y, computes values $c_0$ and $c_1$ according to $$c_0 = \sum_{i0,j0}(e00_{i0,j0} \cdot a0_{i0} \cdot b0_{j0}) + c_X - r_Z \quad \text{[FORMULA 3]}$$

$$c_1 = \sum_{i1,j1}(e11_{i1,j1} \cdot a1_{i1} \cdot b1_{j1}) + c_Y - r_X$$

($e00_{i0,j0}$ and $e11_{i1,j1}$ represent any numbers) and outputs the values.

In the party-Y random number generation step, the party Y generates a number $r_Y$ and transmits the number to the party Z.

In the party-Y first computation step, the party Y computes the value $c_Y$ according to $$c_Y = \sum_{i1,j2}(e12_{i1,j2} \cdot a1_{i1} \cdot b2_{j2}) + \sum_{i2,j1}(e21_{i2,j1} \cdot a2_{i2} \cdot b1_{j1}) + r_Y \quad \text{[FORMULA 2]}$$

($e12_{i1,j2}$ and $e21_{i2,j1}$ represent any numbers) and transmits the value to the party X.

In the party-Y second computation step, the party Y receives the number rx from the party X and a value $c_Z$ from the party Z, computes values $c_1$ and $c_2$ according to $$c_1 = \sum_{i1,j1}(e11_{i1,j1} \cdot a1_{i1} \cdot b1_{j1}) + c_Y - r_X \quad \text{[FORMULA 5]}$$

$$c_2 = \sum_{i2,j2}(e22_{i2,j2} \cdot a2_{i2} \cdot b2_{j2}) + c_Z - r_Y$$

($e22_{i2,j2}$ represents any number) and outputs the values.

In the party-Z random number generation step, the party Z generates the number $r_Z$ and transmits the number to the party X.

In the party-Z first computation step, the party Z computes the value $c_Z$ according to $$c_Z = \sum_{i2,j0}(e20_{i2,j0} \cdot a2_{i2} \cdot b0_{j0}) + \sum_{i0,j2}(e02_{i0,j2} \cdot a0_{i0} \cdot b2_{j2}) + r_Z \quad \text{[FORMULA 2]}$$

($e20_{i2,j0}$ and $e02_{i0,j2}$ represent any numbers) and transmits the value to the party Y.

In the party-Z second computation step, the party Z receives the number $r_Y$ from the party Y and the value $c_X$ from the party X, computes the values $c_0$ and $c_2$ according to $$c_0 = \sum_{i0,j0}(e00_{i0,j0} \cdot a0_{i0} \cdot b0_{j0}) + c_X - r_Z \quad \text{[FORMULA 7]}$$

$$c_2 = \sum_{i2,j2}(e22_{i2,j2} \cdot a2_{i2} \cdot b2_{j2}) + c_Z - r_Y$$

and outputs the values.

Effects of the Invention

The secure sum-of-product computation methods, the secure sum-of-product computation systems, the computation apparatuses and the programs therefor according to the present invention can quickly perform a multiplication and a sum-of-product computation, and the programs can be readily implemented because the processings performed by the parties are symmetrical to each other.

DETAILED DESCRIPTION OF THE EMBODIMENTS

In the following, embodiments of the present invention will be described in detail.

First Embodiment

Figure 1:
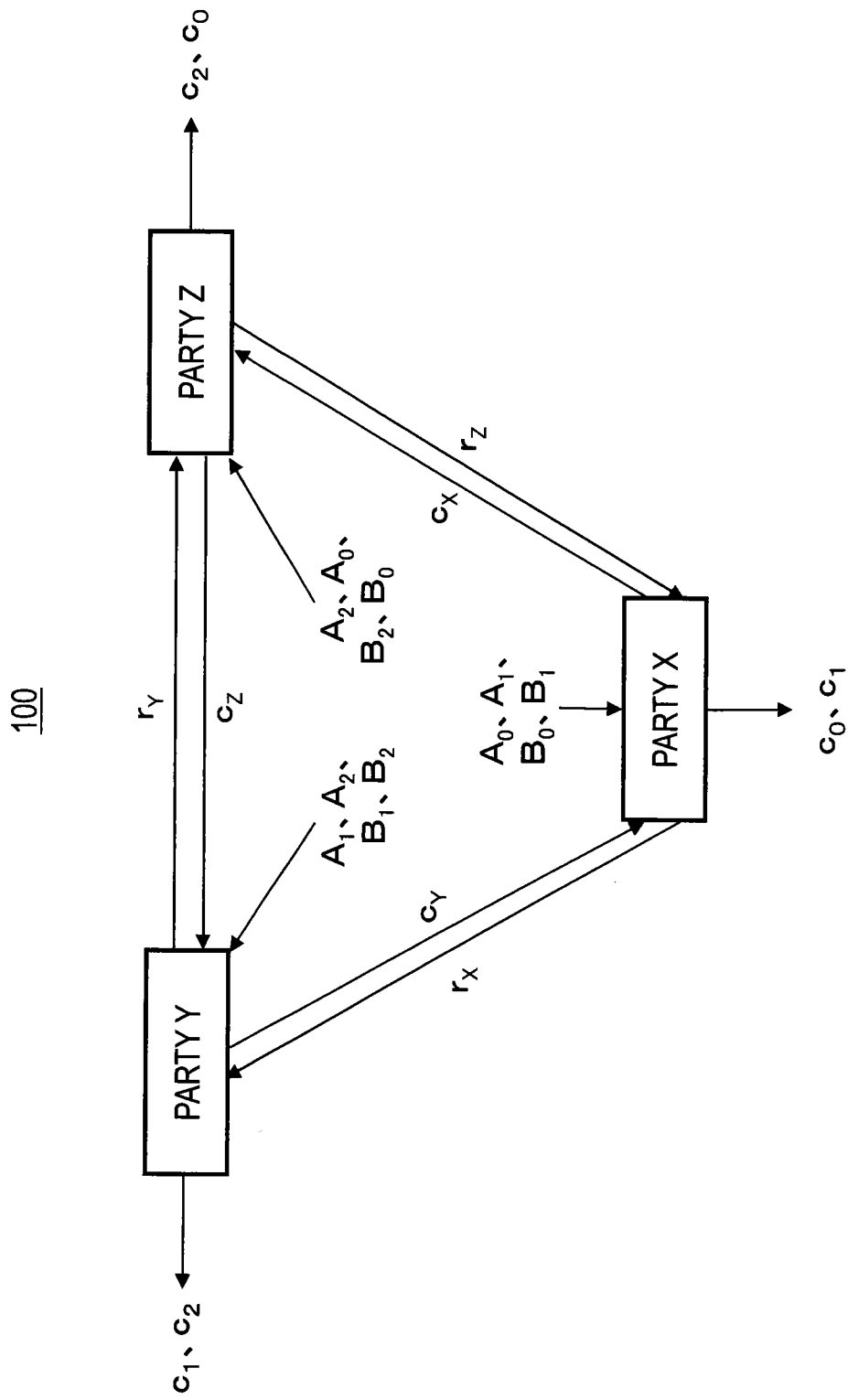
FIG. 1 is a diagram showing an example of a configuration of a secure sum-of-product computation system 100.
Figure 2:
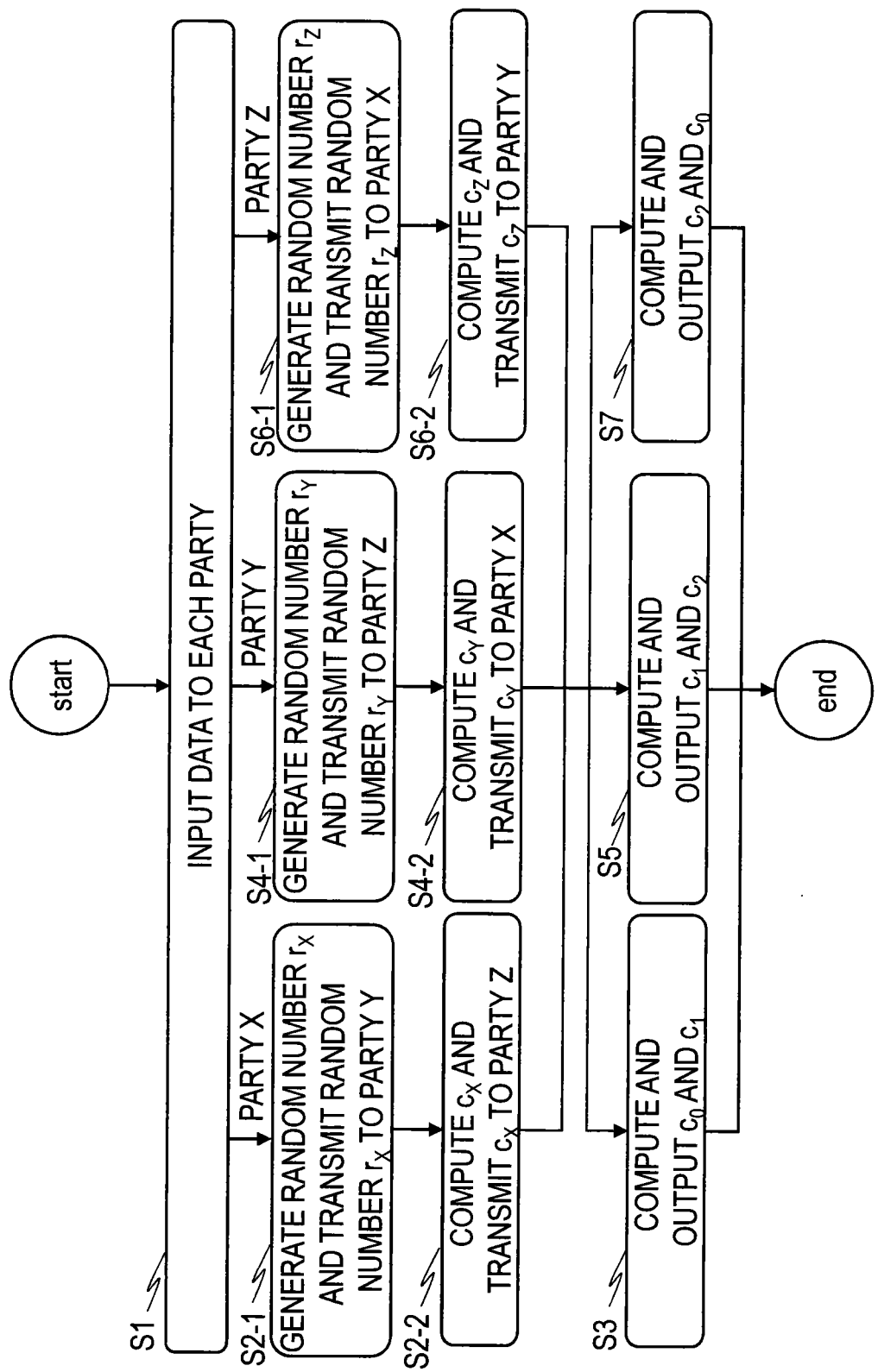
FIG. 2 is a diagram showing an example of a flow of a processing performed by the secure sum-of-product computation system 100.

FIG. 1 shows an example of a configuration of a secure sum-of-product computation system 100, and FIG. 2 shows an example of a flow of a processing performed by the secure sum-of-product computation system 100. The secure sum-of-product computation system 100 comprises a party X, a party Y and a party Z, which are computation apparatuses that perform symmetric computation processings.

A secure sum-of-product computation according to the present invention is achieved by the three computation apparatuses, the parties X, Y and Z, cooperating to perform sum-of-product computations of data strings $A_0 = (a0_0, \ldots, a0_{na0-1})$, $A_1 = (a1_0, \ldots, a1_{na1-1})$ and $A_2 = (a2_0, \ldots, a2_{na2-1})$ and data strings $B_0 = (b0_0, \ldots, b0_{nb0-1})$, $B_1 = (b1_0, \ldots, b1_{nb1-1})$ and $B_2 = (b2_0, \ldots, b2_{nb2-1})$. Note that na0, na1, na2, nb0, nb1 and nb2 represent natural numbers.

Figure 3:
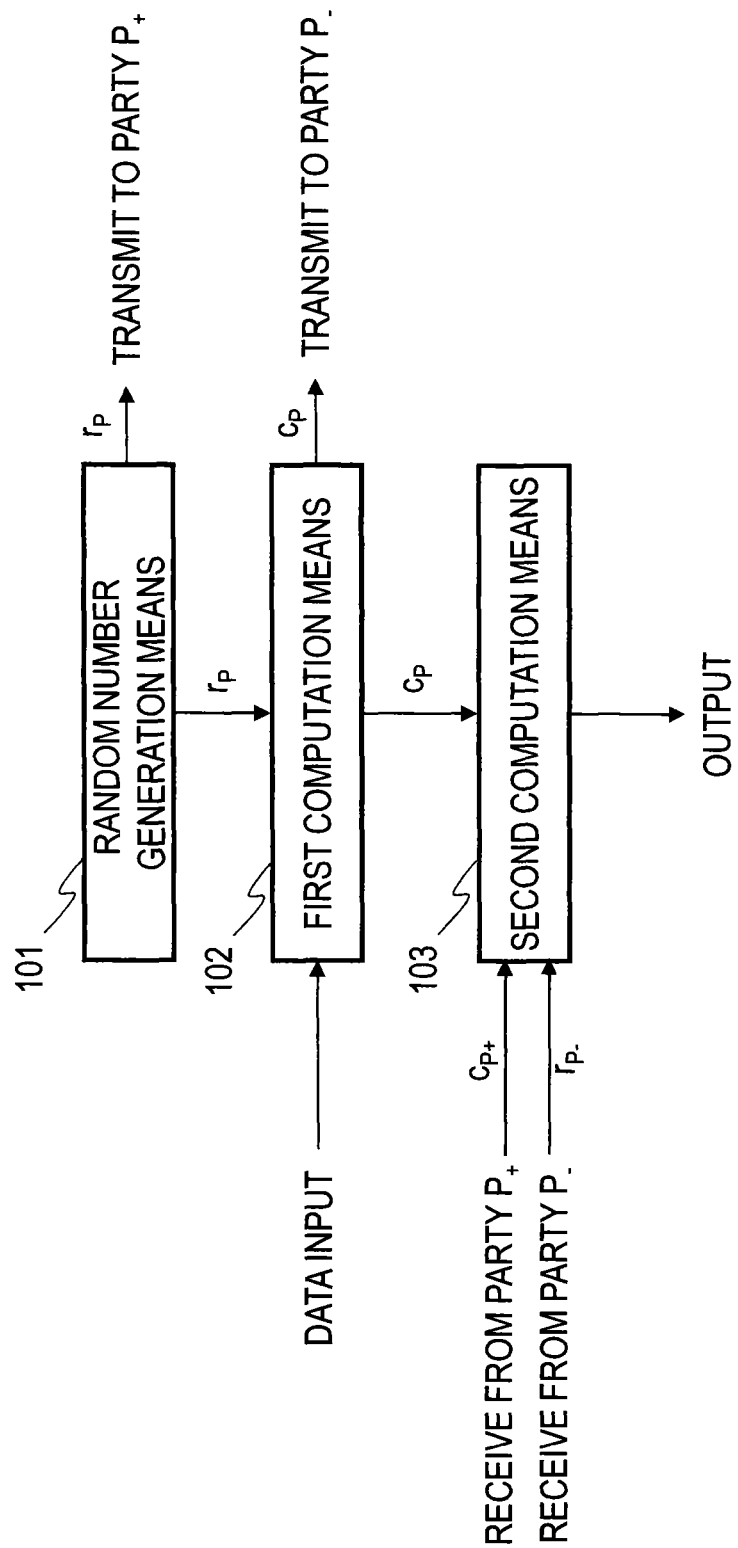
FIG. 3 is a diagram showing an example of an internal configuration of each party of the secure sum-of-product computation systems 100 and 200.

As shown in FIG. 3, each party has random number generation means 101, first computation means 102 and second computation means 103. In FIG. 3, a subject party is denoted as P, and other parties are denoted as P_ and P_+. Specifically, when the subject party is the party X, another party P_ is the party Z, and the remaining party P_+ is the party Y. When the subject party is the party Y, another party P_ is the party X, and the remaining party P_+ is the party Z. When the subject party is the party Z, another party P_ is the party Y, and the remaining party P_+ is the party X. In this specification, the relationship between the subject party P and the other parties P_ and P_+ that does not change depending on which of the parties serves as the subject party P is expressed as "symmetric (symmetrical)". And a processing performed by the parties in such a relationship is referred to as a "symmetric processing" or expressed as "symmetric (symmetrical)".

In the following, details of a cooperative computation processing performed by each party will be specifically described. First, data strings $A_0, A_1, B_0$ and $B_1$ are input to the party X, data strings $A_1, A_2, B_1$ and $B_2$ are input to the party Y, and data strings $A_2, A_0, B_2$ and $B_0$ are input to the party Z (S1).

Then, the party X performs the following processing. The random number generation means 101 first generates a random number $r_X$ and transmits the random number to the party Y (S2-1). Then, the first computation means 102 computes a value $c_X$ according to $$c_X = \sum_{i0,j1} (e01_{i0,j1} \cdot a0_{i0} \cdot b1_{j1}) + \sum_{i1,j0} (e10_{i1,j0} \cdot a1_{i1} \cdot b0_{j0}) + r_X \quad \text{[FORMULA 8]}$$

and transmits the value $c_X$ to the party Z (S2-2). Note that $i0=0, \ldots, na0-1$, $i1=0, \ldots, na1-1$, $j0=0, \ldots, nb0-1$, $j1=0, \ldots, nb1-1$, and $e01_{i0,j1}$ and $e10_{i1,j0}$ each represent any number. The second computation means 103 receives a random number $r_Z$ from the party Z and a value $c_Y$ from the party Y and computes values $c_0$ and $c_1$ according to $$c_0 = \sum_{i0,j0} (e00_{i0,j0} \cdot a0_{i0} \cdot b0_{j0}) + c_X - r_Z \quad \text{[FORMULA 9]}$$

$$c_1 = \sum_{i1,j1} (e11_{i1,j1} \cdot a1_{i1} \cdot b1_{j1}) + c_Y - r_X$$

and outputs the values $c_0$ and $c_1$ (S3). Note that $e00_{i0,j0}$ and $e11_{i1,j1}$ each represent any number.

The party Y performs the following processing. The random number generation means 101 first generates a random number $r_Y$ and transmits the random number to the party Z (S4-1). Then, the first computation means 102 computes the value $c_Y$ according to $$c_Y = \sum_{i1,j2} (e12_{i1,j2} \cdot a1_{i1} \cdot b2_{j2}) + \sum_{i2,j1} (e21_{i2,j1} \cdot a2_{i2} \cdot b1_{j1}) + r_Y \quad \text{[FORMULA 10]}$$

and transmits the value $c_Y$ to the party X (S4-2). Note that $i2=0, \ldots, na2-1$, $j2=0, \ldots, nb2-1$, and $e12_{i1,j2}$ and $e21_{i2,j1}$ each represent any number. The second computation means 103 receives the random number $r_X$ from the party X and a value $c_Z$ from the party Z and computes values $c_1$ and $c_2$ according to $$c_1 = \sum_{i1,j1} (e11_{i1,j1} \cdot a1_{i1} \cdot b1_{j1}) + c_Y - r_X \quad \text{[FORMULA 11]}$$

$$c_2 = \sum_{i2,j2} (e22_{i2,j2} \cdot a2_{i2} \cdot b2_{j2}) + c_Z - r_Y$$

and outputs the values $c_1$ and $c_2$ (S5). Note that $e22_{i2,j2}$ represents any number.

The party Z performs the following processing. The random number generation means 101 first generates the random number $r_Z$ and transmits the random number to the party X (S6-1). Then, the first computation means 102 computes the value $c_Z$ according to $$c_Z = \sum_{i2,j0} (e20_{i2,j0} \cdot a2_{i2} \cdot b0_{j0}) + \sum_{i0,j2} (e02_{i0,j2} \cdot a0_{i0} \cdot b2_{j2}) + r_Z$$ [FORMULA 12]

and transmits the value $c_Z$ to the party Y (S6-2). Note that $e20_{i2,j0}$ and $e02_{i0,j2}$ represent any numbers. The second computation means 103 receives the random number $r_Y$ from the party Y and the value $c_X$ from the party X and computes values $c_0$ and $c_2$ according to $$c_0 = \sum_{i0,j0} (e00_{i0,j0} \cdot a0_{i0} \cdot b0_{j0}) + c_X - r_Z$$ [FORMULA 13]

$$c_2 = \sum_{i2,j2} (e22_{i2,j2} \cdot a2_{i2} \cdot b2_{j2}) + c_Z - r_Y$$

and outputs the values $c_0$ and $c_2$ (S7). Note that the series of steps S2-1 and S2-2, the series of steps S4-1 and S4-2 and the series of steps S6-1 and S6-2 can be performed in parallel, and the steps S3, S5 and S7 can also be performed in parallel.

Then, the total sum of the values $c_0$, $c_1$, and $c_2$ output from the parties X, Y and Z can be computed to obtain a sum-of-product computation result as expressed by the following formula.

$$c_0 + c_1 + c_2 = \sum_{i0,j0} (e00_{i0,j0} \cdot a0_{i0} \cdot b0_{j0}) +$$ [FORMULA 14]

$$\sum_{i0,j1} (e01_{i0,j0} \cdot a0_{i0} \cdot b1_{j1}) + \sum_{i1,j0} (e10_{i1,j0} \cdot a1_{i1} \cdot b0_{j0}) +$$

$$\sum_{i1,j1} (e11_{i1,j1} \cdot a1_{i1} \cdot b1_{j1}) + \sum_{i1,j2} (e12_{i1,j2} \cdot a1_{i1} \cdot b2_{j2}) +$$

$$\sum_{i2,j1} (e21_{i2,j1} \cdot a2_{i2} \cdot b1_{j1}) + \sum_{i2,j2} (e22_{i2,j2} \cdot a2_{i2} \cdot b2_{j2}) +$$

$$\sum_{i2,j0} (e20_{i2,j0} \cdot a2_{i2} \cdot b0_{j0}) + \sum_{i0,j2} (e02_{i0,j2} \cdot a0_{i0} \cdot b2_{j2})$$

In the processing described above, hash values or other values can be substituted for the random numbers.

The effect of the method according to the present invention will be compared with that of the method described in Non-Patent literature 1. Most of the computations in Non-Patent literature 1 are involved with random number generation and encryption and decryption for communications in the case where no physical secure channels are available. The amount of computations for encryption and decryption agrees with the amount of communications, so that the efficiency can be evaluated by observing the number of random numbers generated and the amount of communications.

In the case where an addition is performed after repeatedly performing multiplications as described in Non-Patent literature 1, the number of random numbers generated and the amount of communications are proportional to the number of elements of the input data strings. In the method according to the present invention, the parties X, Y and Z each generate only one random number and transmit only two pieces of data to the other parties. In addition, the processings performed by the parties X, Y and Z are symmetrical to each other, so that common programs can be implemented in all the parties, and the implementation cost can be reduced.

Second Embodiment

Figure 4:
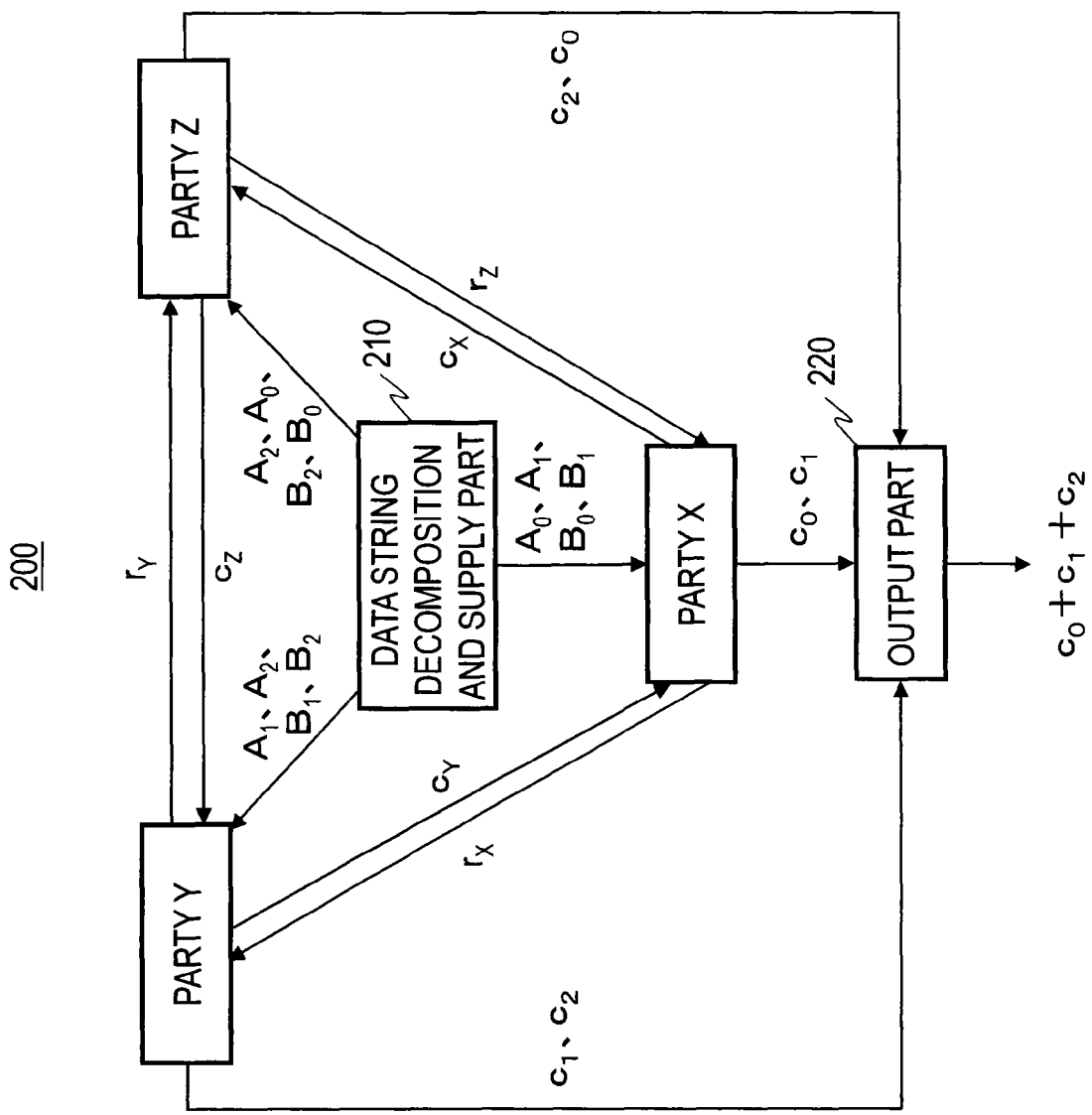
FIG. 4 is a diagram showing an example of a configuration of a secure sum-of-product computation system 200.
Figure 5:
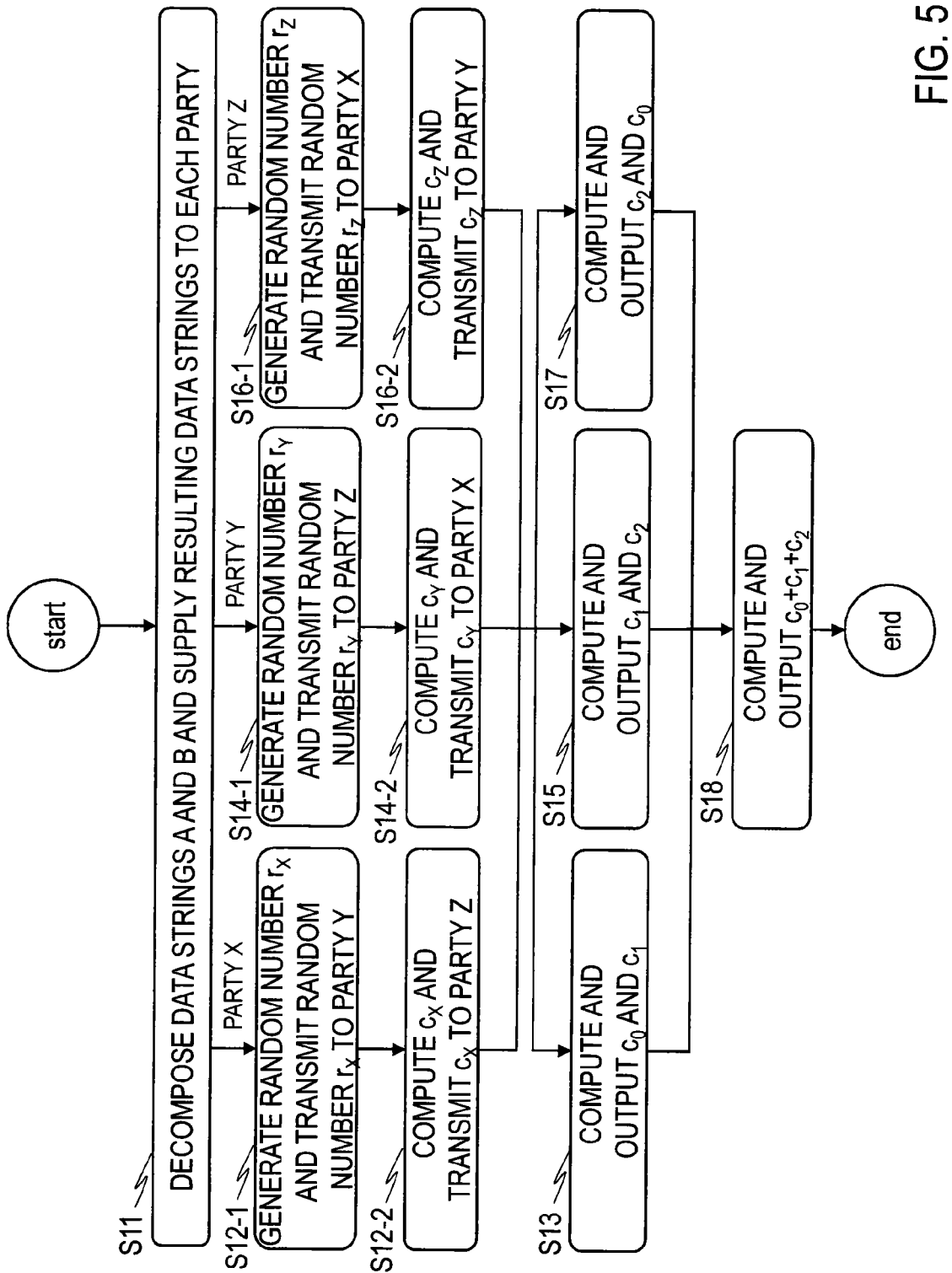
FIG. 5 is a diagram showing an example of a flow of a processing performed by the secure sum-of-product computation system 200.

A second embodiment is a specific example of the first embodiment, in which na0=na1=na2=nb0=nb1=nb2=n (n represents an integer equal to or greater than 1), and e00=e01=e10=e11=e12=e21=e22=e20=e02=1. FIG. 4 shows an example of a configuration of a secure sum-of-product computation system 200 according to this embodiment, and FIG. 5 shows an example of a flow of a processing performed by the secure sum-of-product computation system 200. The secure sum-of-product computation system 200 comprises a party X, a party Y, a party Z, a data string decomposition and supply part 210 and an output part 220. Each party has random number generation means 101, first computation means 102 and second computation means 103 as in the first embodiment as shown in FIG. 3.

The secure sum-of-product computation system 200 performs a sum-of-product computation $$\sum_{i}^{n-1} a_i \cdot b_i$$ [FORMULA 15]

for two data strings A=($a_0$, ..., $a_{n-1}$) and B=($b_0$, ..., $b_{n-1}$) comprising elements $a_i$ and $b_i$ (i=0, ..., n–1), which are natural numbers smaller than a prime number p while concealing the contents of the data strings through cooperative computation by the three computation apparatuses, the parties X, Y and Z (the sum-of-product computation is a multiplication of a and b in the case where n=1).

Specifically, the data string decomposition and supply part 210 decomposes the input data strings A and B in such a manner that each element $a_i$ and $b_i$ satisfy conditional formulas $a_i$=a0$_i$+a1$_i$+a2$_i$ mod p and $b_i$=b0$_i$+b1$_i$+b2$_i$ mod p (a0$_i$, a1$_i$, b0$_i$ and b1$_i$ represent random numbers, and p represents a prime number) and supplies data strings $A_0$=(a0$_0$, ..., a0$_{n-1}$), $A_1$=(a1$_0$, ..., a1$_{n-1}$), $B_0$=(b0$_0$, ..., b0$_{n-1}$) and $B_1$=(b1$_0$, ..., b1$_{n-1}$) to the party X, the data strings $A_1$, $A_2$=(a2$_0$, ..., a2$_{n-1}$), $B_1$ and $B_2$=(b2$_0$, ..., b2$_{n-1}$) to the party Y, and data strings $A_2$, $A_0$, $B_2$ and $B_0$ to the party Z (S11).

Then, the party X performs the following processing. The random number generation means 101 first generates a random number $r_X$ and transmits the random number to the party Y (S12-1). Then, the first computation means 102 computes a value $c_X$ according to $$c_X = \sum_{i} (a0_i \cdot b1_i + a1_i \cdot b0_i) + r_X$$ [FORMULA 16]

and transmits the value $c_X$ to the party Z (S12-2). Then, the second computation means 103 receives a random number $r_Z$ from the party Z and a value $c_Y$ from the party Y and computes values $c_0$ and $c_1$ according to $$c_0 = \sum_{i} (a0_i \cdot b0_i) + c_X - r_Z$$ [FORMULA 17]

-continued
$$c_1 = \sum_i (a1_i \cdot b1_i) + c_Y - r_X$$

and outputs the values $c_0$ and $c_1$ (S13).

The party Y performs the following processing. The random number generation means 101 first generates a random number $r_Y$ and transmits the random number to the party Z (S14-1). Then, the first computation means 102 computes the value $c_Y$ according to $$c_Y = \sum_i (a1_i \cdot b2_i + a2_i \cdot b1_i) + r_Y \qquad \text{[FORMULA 18]}$$

and transmits the value $c_Y$ to the party X (S14-2). Then, the second computation means 103 receives the random number $r_X$ from the party X and a value $c_Z$ from the party Z and computes values $c_1$ and $c_2$ according to $$c_1 = \sum_i (a1_i \cdot b1_i) + c_Y - r_X \qquad \text{[FORMULA 19]}$$
$$c_2 = \sum_i (a2_i \cdot b2_i) + c_Z - r_Y$$

and outputs the values $c_1$ and $c_2$ (S15).

The party Z performs the following processing. The random number generation means 101 first generates the random number $r_Z$ and transmits the random number to the party X (S16-1). Then, the first computation means 102 computes the value $c_Z$ according to $$c_Z = \sum_i (a2_i \cdot b0_i + a0_i \cdot b2_i) + r_Z \qquad \text{[FORMULA 20]}$$

and transmits the value $c_Z$ to the party Y (S16-2). Then, the second computation means 103 receives the random number $r_Y$ from the party Y and the value $c_X$ from the party X and computes values $c_0$ and $c_2$ according to $$c_0 = \sum_i (a0_i \cdot b0_i) + c_X - r_Z \qquad \text{[FORMULA 21]}$$
$$c_2 = \sum_i (a2_i \cdot b2_i) + c_Z - r_Y$$

and outputs the values $c_0$ and $c_2$ (S17). Note that the series of steps S12-1 and S12-2, the series of steps S14-1 and S14-2 and the series of steps S16-1 and S16-2 can be performed in parallel, and the steps S13, S15 and S17 can also be performed in parallel.

Then, the output part 220 computes the total sum ($c_0+c_1+c_2$) of the values $c_0$, $c_1$ and $c_2$ output from the parties X, Y and Z and outputs the total sum.

The following relation holds.

$$c_0 + c_1 + c_2 = \sum_i \begin{pmatrix} a0_i \cdot b0_i + a0_i \cdot b1_i + \\ a1_i \cdot b0_i \end{pmatrix} + \qquad \text{[FORMULA 22]}$$

$$\sum_i \begin{pmatrix} a1_i \cdot b1_i + a1_i \cdot b2_i + \\ a2_i \cdot b1_i \end{pmatrix} +$$
$$\sum_i \begin{pmatrix} a2_i \cdot b2_i + a2_i \cdot b0_i + \\ a0_i \cdot b2_i \end{pmatrix}$$
$$= \sum_i (a0_i + a1_i + a2_i) \begin{pmatrix} b0_i + b1_i + \\ b2_i \end{pmatrix}$$
$$= \sum_i a_i \cdot b_i$$

From the relation above, it can be seen that the sum-of-product computation (a multiplication of a and b in the case where i=1) has been correctly done.

In the processing described above, hash values or other values can be substituted for the random numbers. The data string decomposition and supply part 210 and the output part 220 can be provided in an apparatus other than the parties or provided in any one or more of the apparatuses serving as the parties.

The effect of the method according to the present invention will be compared with that of the method described in Non-Patent literature 1. Concerning the multiplications, in the method described in Non-Patent literature 1, two rounds of communications are required (the term "round" means the number of times that each of the parties X, Y and Z performing parallel processing needs to wait for the other parties to complete their respective processings), and the party X generates one random number and transmits four pieces of data, and the parties Y and Z generate no random number and transmit one piece of data. On the other hand, according to the present invention, one round of communications is required, and all the parties X, Y and Z generate one random number and transmit two pieces of data. That is, the number of rounds is reduced to a half. In addition, the number of random numbers generated and the number of pieces of data transmitted are the same as those in the method described in Non-Patent literature 1, it can be said that the bottleneck is reduced because the processings performed by the parties X, Y and Z are symmetrical to each other.

Concerning the sum-of-product computation, in the case of the method of performing an addition after repeatedly performing multiplications described in Non-Patent literature 1, the number of random numbers generated and the amount of communications are proportional to the number of elements of the input data strings. However, in the case of the method according to the present invention, the parties X, Y and Z each generate only one random number and transmit only two pieces of data to the other parties. Since the processings for any computations performed by the parties X, Y and Z are symmetrical to each other, the implementation cost can be reduced.

Third Embodiment

Figure 6:
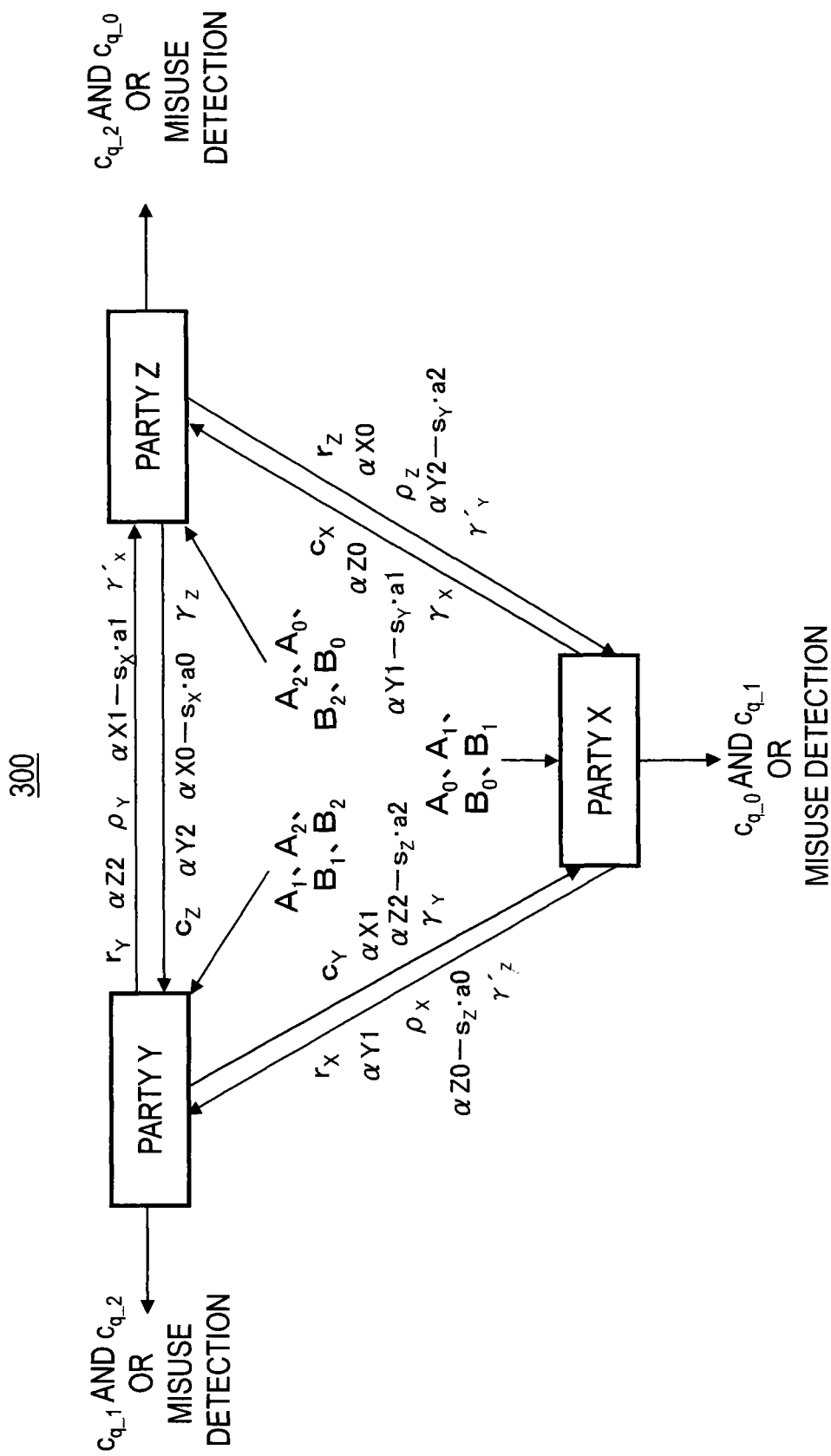
FIG. 6 is a diagram showing an example of a configuration of a secure sum-of-product computation system 300.
Figure 7:
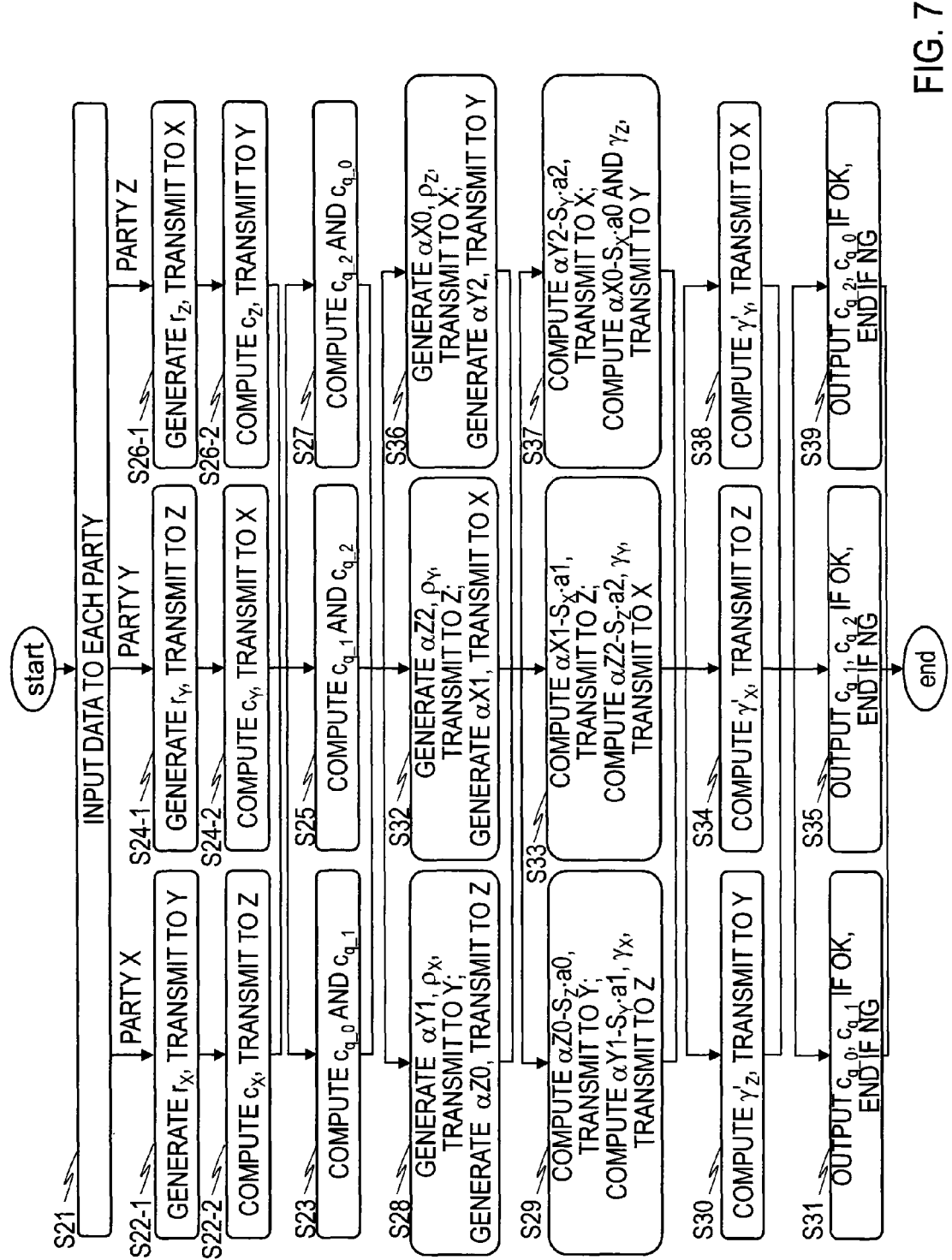
FIG. 7 is a diagram showing an example of a flow of a processing performed by the secure sum-of-product computation system 300.

According to a third embodiment, a misuse detection function is added to the configurations for performing a sum-of-product computation according to the first and second embodiments. FIG. 6 shows an example of a configuration of a secure sum-of-product computation system 300, and FIG. 7 shows an example of a flow of a processing performed by the secure sum-of-product computation system 300. The secure sum-of-product computation system 300 comprises a party X, a party Y and a party Z, which are computation apparatuses that perform symmetric computation processings.

A secure sum-of-product computation according to the present invention is achieved by the three computation apparatuses, the parties X, Y and Z, cooperating to perform a total of m sets of sum-of-product computations of data strings $A_{q\_0}=(a0_{q\_0}, \ldots, a0_{q\_na0-1})$, $A_{q\_1}=(a1_{q\_0}, \ldots, a1_{q\_na1-1})$ and $A_{q\_2}=(a2_{q\_0}, \ldots, a2_{q\_na2-1})$ and $B_{q\_0}=(b0_{q\_0}, \ldots, b0_{q\_nb0-1})$, $B_{q\_1}=(b1_{q\_0}, \ldots, b1_{q\_nb1-1})$ and $B_{q\_2}=(b2_{q\_0}, \ldots, b2_{q\_nb2-1})$ ($q=0, \ldots, m-1$, and m represents an integer equal to or greater than 1) (the sum-of-product computations are performed in parallel in the case where m is equal to or greater than 2). Note that na0, na1, na2, nb0, nb1 and nb2 represent natural numbers.

Figure 8:
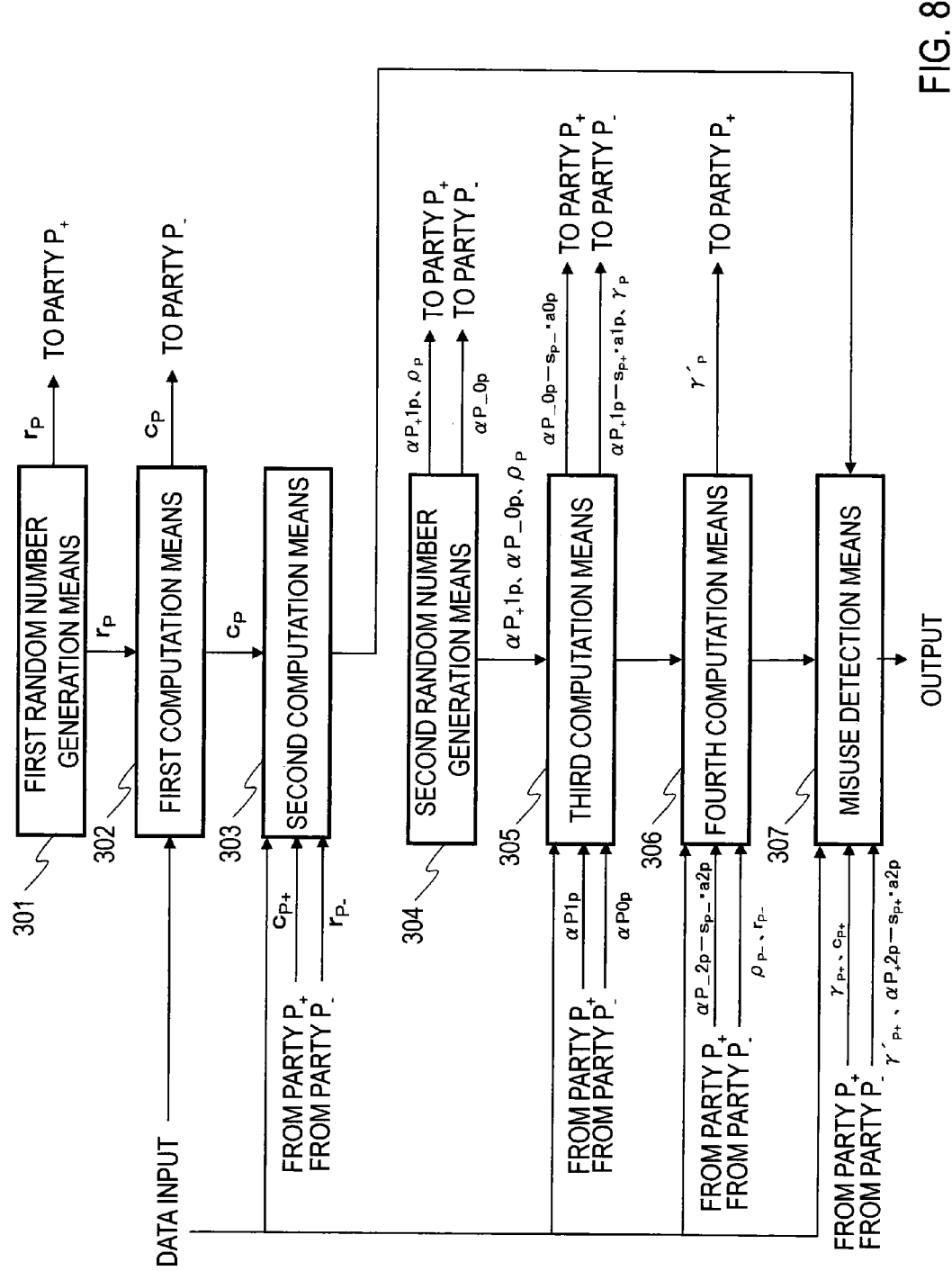
FIG. 8 is a diagram showing an example of an internal configuration of each party of the secure sum-of-product computation systems 300, 400 and 500.

As shown in FIG. 8, each party has first random number generation means 301, first computation means 302, second computation means 303, second random number generation means 304, third computation means 305, fourth computation means 306 and misuse detection means 307. In FIG. 8, provided that any of the apparatuses described above is a party P, when the party P is the party X, a party $P_-$ is the party Z, and a party $P_+$ is the party Y, and subscripts 0p, 1p and 2p correspond to numerals 0, 1 and 2, respectively. When the party P is the party Y, the party $P_-$ is the party X, and the party $P_+$ is the party Z, and the subscripts 0p, 1p and 2p correspond to numerals 1, 2 and 0, respectively. When the party P is the party Z, the party $P_-$ is the party Y, and the party $P_+$ is the party X, and the subscripts 0p, 1p and 2p correspond to numerals 2, 0 and 1, respectively.

In the following, details of a cooperative computation processing performed by each party will be specifically described. Steps S21 to S27 correspond to the sum-of-product computation processing according to the first embodiment, and steps S28 to S39 are involved in a misuse detection processing. It is assumed that the parties X and Y previously share a random number $s_{q\_Z}$, the parties Y and Z previously share a random number $s_{q\_X}$, and the parties Z and X previously share a random number $s_{q\_Y}$. First, data strings $A_{q\_0}$, $A_{q\_1}$, $B_{q\_0}$ and $B_{q\_1}$ are input to the party X, data strings $A_{q\_1}$, $A_{q\_2}$, $B_{q\_1}$ and $B_{q\_2}$ are input to the party Y, and data strings $A_{q\_2}$, $A_{q\_0}$, $B_{q\_2}$ and $B_{q\_0}$ are input to the party Z (S21).

Then, the party X performs the following processing. The first random number generation means 301 first generates a random number $r_{q\_X}$ and transmits the random number to the party Y (S22-1). Then, the first computation means 302 computes a value $c_{q\_X}$ according to $$c_{q\_X} = \sum_{q\_i0,q\_j1}(e01_{q\_i0,q\_j1} \cdot a0_{q\_i0} \cdot b1_{q\_j1}) + \sum_{q\_i1,q\_j0}(e10_{q\_i1,q\_j0} \cdot a1_{q\_i1} \cdot b0_{q\_j0}) + r_{q\_X} \quad \text{[FORMULA 23]}$$

and transmits the value $c_{q\_X}$ to the party Z (S22-2). Note that $i0=0, \ldots, na0-1$, $i1=0, \ldots, na1-1$, $j0=0, \ldots, nb0-1$, and $j1=0, \ldots, nb1-1$, and $e01_{q\_i0,q\_j1}$ and $e10_{q\_i1,q\_j0}$ each represent any number. The second computation means 303 receives a random number $r_{q\_Z}$ from the party Z and a value $c_{q\_Y}$ from the party Y and computes values $c_{q\_0}$ and $c_{q\_1}$ according to $$c_{q\_0} = \sum_{q\_i0,q\_j0}(e00_{q\_i0,q\_j0} \cdot a0_{q\_i0} \cdot b0_{q\_j0}) + c_{q\_X} - r_{q\_Z} \quad \text{[FORMULA 24]}$$

$$c_{q\_1} = \sum_{q\_i1,q\_j1}(e11_{q\_i1,q\_j1} \cdot a1_{q\_i1} \cdot b1_{q\_j1}) + c_{q\_Y} - r_{q\_X}$$

and outputs the values $c_{q\_0}$ and $c_{q\_1}$ (S23). Note that $e00_{q\_i0,q\_j0}$ and $e11_{q\_i1,q\_j1}$ represent any numbers.

The party Y performs the following processing. The random number generation means 301 first generates a random number $r_{q\_Y}$ and transmits the random number to the party Z (S24-1). Then, the first computation means 302 computes the value $c_{q\_Y}$ according to $$c_{q\_Y} = \sum_{q\_i1,q\_j2}(e12_{q\_i1,q\_j2} \cdot a1_{q\_i1} \cdot b2_{q\_j2}) + \sum_{q\_i2,q\_j1}(e21_{q\_i2,q\_j1} \cdot a2_{q\_i2} \cdot b1_{q\_j1}) + r_{q\_Y} \quad \text{[FORMULA 25]}$$

and transmits the value $c_{q\_Y}$ to the party X (S24-2). Note that $i2=0, \ldots, na2-1$ and $j2=0, \ldots, nb2-1$, and $e12_{q\_i1,q\_j2}$ and $e21_{q\_i2,q\_j1}$ represent any numbers. The second computation means 303 receives the random number $r_{q\_X}$ from the party X and a value $c_{q\_Z}$ from the party Z and computes values $c_{q\_1}$ and $c_{q\_2}$ according to the following formula (S25).

$$c_{q\_1} = \sum_{q\_i1,q\_j1}(e11_{q\_i1,q\_j1} \cdot a1_{q\_i1} \cdot b1_{q\_j1}) + c_{q\_Y} - r_{q\_X} \quad \text{[FORMULA 26]}$$

$$c_{q\_2} = \sum_{q\_i2,q\_j2}(e22_{q\_i2,q\_j2} \cdot a2_{q\_i2} \cdot b2_{q\_j2}) + c_{q\_Z} - r_{q\_Y}$$

Note that $e22_{q\_i2,q\_j2}$ represents any number.

The party Z performs the following processing. The random number generation means 301 first generates the random number $r_{q\_Z}$ and transmits the random number to the party X (S26-1). Then, the first computation means 302 computes the value $c_{q\_Z}$ according to $$c_{q\_Z} = \sum_{q\_i2,q\_j0}(e20_{q\_i2,q\_j0} \cdot a2_{q\_i2} \cdot b0_{q\_j0}) + \sum_{q\_i0,q\_j2}(e02_{q\_i0,q\_j2} \cdot a2_{q\_i2} \cdot b0_{q\_i0}) + r_{q\_Z} \quad \text{[FORMULA 27]}$$

and transmits the value $c_{q\_Z}$ to the party Y (S26-2). Note that $e20_{q\_i2,q\_j0}$ and $e02_{q\_i0,q\_j2}$ represent any multipliers. The second computation means 303 receives the random number $r_{q\_Y}$ from the party Y and the value $c_{q\_X}$ from the party X and computes values $c_{q\_0}$ and $c_{q\_2}$ according to the following formula (S27).

$$c_{q\_0} = \sum_{q\_i0,q\_j0}(e00_{q\_i0,q\_j0} \cdot a0_{q\_i0} \cdot b0_{q\_j0}) + c_{q\_X} - r_{q\_Z} \quad \text{[FORMULA 28]}$$

$$c_{q\_2} = \sum_{q\_i2,q\_j2}(e22_{q\_i2,q\_j2} \cdot a2_{q\_i2} \cdot b2_{q\_j2}) + c_{q\_Z} - r_{q\_Y}$$

Note that the series of steps S22-1 and S22-2, the series of steps S24-1 and S24-2 and the series of steps S26-1 and S26-2 can be performed in parallel, and the steps S23, S25 and S27 can also be performed in parallel.

Following the steps S21 to S27, each party performs a misuse detection processing as described below.

A processing performed by the party X will be described. First, the second random number generation means 304 generates a random number sequence $(\alpha Y1_{q\_0}, \ldots, \alpha Y1_{q\_na1-1})$ and a random number $\rho_X$ and transmits the random number sequence and the random number to the party Y, and generates a random number sequence $(\alpha Z0_{q\_0}, \ldots, \alpha Z0_{q\_na0-1})$ and transmits the random number sequence to the party Z (S28). Then, the third computation means 305 computes a random number sequence $(\alpha Z0_{q\_0}-s_{q\_Z}\cdot a0_{q\_0}, \ldots, \alpha Z0_{q\_na0-1}-s_{q\_Z}\cdot a0_{q\_na0-1})$, transmits the random number sequence to the party Y, receives a random number sequence $(\alpha X1_{q\_0}, \ldots, \alpha X1_{q\_na1-1})$ from the party Y and a random number sequence $(\alpha X0_{q\_0}, \ldots, \alpha X0_{q\_na0-1})$ from the party Z, computes a random number sequence $(\alpha Y1_{q\_0}-s_{q\_Y}\cdot a1_{q\_0}, \ldots, \alpha Y1_{q\_na1-1}-s_{q\_Y}\cdot a1_{q\_na1-1})$ and a value $\gamma_X$ according to $$\gamma_X = \sum_{i0,j1,q} (e01_{q\_i0,q\_j1} \cdot \alpha X0_{q\_i0} \cdot b1_{q\_j1}) + \quad \text{[FORMULA 29]}$$
$$\sum_{i1,j0,q} (e10_{q\_i1,q\_j0} \cdot \alpha X1_{q\_j1} \cdot b0_{q\_j0}) + \rho_X$$

and transmits the random number sequence and the value to the party Z (S29). Then, the fourth computation means 306 receives a random number sequence $(\alpha Z2_{q\_0}-s_{q\_Z}\cdot a2_{q\_0}, \ldots, \alpha Z2_{q\_na2-1}-s_{q\_Z}\cdot a2_{q\_na2-1})$ from the party Y and a value $\rho_Z$ from the party Z, computes a value $$\gamma'_Z = \sum_{i2,j0,q} \{e20_{q\_i2,q\_j0} \cdot (\alpha Z2_{q\_i2} - s_{q\_Z} \cdot a2_{q\_i2}) \cdot b0_{q\_j0} - \quad \text{[FORMULA 30]}$$
$$s_{q\_Z} \cdot r_{q\_Z}\} + \rho_Z$$

and transmits the value to the party Y (S30). Then, the misuse detection means 307 receives a value $\gamma_Y$ from the party Y, a value $\gamma'_Y$ and a random number sequence $(\alpha Y2_{q\_0}-s_{q\_Y}\cdot a2_{q\_0}, \ldots, \alpha Y2_{q\_na2-1}-s_{q\_Y}\cdot a2_{q\_na2-1})$ from the party Z, computes $$\sum_{i2,j1,q} \{e21_{q\_i2,q\_j1} \cdot (\alpha Y2_{q\_i2} - s_{q\_Y} \cdot a2_{q\_i2}) \cdot b1_{q\_j1} + \quad \text{[FORMULA 31]}$$
$$s_{q\_Y} \cdot c_{q\_Y}\} - \gamma_Y + \gamma'_Y,$$

ends the processing by outputting data indicating a misuse detection if the computation result is not 0, and outputs values $c_{q\_0}$ and $c_{q\_1}$ if the computation result is 0 (S31).

Next, a processing performed by the party Y will be described. First, the second random number generation means 304 generates a random number sequence $(\alpha Z2_{q\_0}, \ldots, \alpha Z2_{q\_na2-1})$ and a random number $\rho_Y$ and transmits the random number sequence and the random number to the party Z, and generates a random number sequence $(\alpha X1_{q\_0}, \ldots, \alpha X1_{q\_na1-1})$ and transmits the random number sequence to the party X (S32). Then, the third computation means 305 computes a random number sequence $(\alpha X1_{q\_0}-s_{q\_X}\cdot a1_{q\_0}, \ldots, \alpha X1_{q\_na1-1}-s_{q\_X}\cdot a1_{q\_na1-1})$, transmits the random number sequence to the party Z, receives a random number sequence $(\alpha Y1_{q\_0}, \ldots, \alpha Y1_{q\_na1-1})$ from the party X and a random number sequence $(\alpha Y2_{q\_0}, \ldots, \alpha Y2_{q\_na2-1})$ from the party Z, computes a random number sequence $(\alpha Z2_{q\_0}-s_{q\_Z}\cdot a2_{q\_0}, \ldots, \alpha Z2_{q\_na2-1}-s_{q\_Z}\cdot a2_{q\_na2-1})$ and a value $$\gamma_Y = \sum_{i1,j2,q} (e12_{q\_i1,q\_j2} \cdot \alpha Y1_{q\_i1} \cdot b2_{q\_j2}) + \quad \text{[FORMULA 32]}$$
$$\sum_{i2,j1,q} (e21_{q\_i2,q\_j1} \cdot \alpha Y2_{q\_i2} \cdot b1_{q\_j1}) + \rho_Y$$

and transmits the random number sequence and the value to the party X (S33). Then, the fourth computation means 306 receives the random number $\rho_X$ from the party X and a random number sequence $(\alpha X0_{q\_0}-s_{q\_X}\cdot a0_{q\_0}, \ldots, \alpha X0_{q\_na0-1}-s_{q\_X}\cdot a0_{q\_na0-1})$ from the party Z, computes a value $$\gamma'_X = \sum_{i0,j1,q} \{e01_{q\_i0,q\_j1} \cdot (\alpha X0_{q\_i0} - s_{q\_X} \cdot a0_{q\_i0}) \cdot b1_{q\_j1} - \quad \text{[FORMULA 33]}$$
$$s_{q\_X} \cdot r_{q\_X}\} + \rho_X$$

and transmits the value to the party Z (S34). Then, the misuse detection means 307 receives a value $\gamma'_Z$ and a random number sequence $(\alpha Z0_{q\_0}-s_{q\_Z}\cdot a0_{q\_0}, \ldots, \alpha Z0_{q\_na0-1}-s_{q\_Z}\cdot a0_{q\_na0-1})$ from the party X and a value $\gamma_Z$ from the party Z, computes $$\sum_{i0,j2,q} \{e02_{q\_i0,q\_j2} \cdot (\alpha Z0_{q\_i0} - s_{q\_Z} \cdot a0_{q\_i0}) \cdot b2_{q\_j2} + \quad \text{[FORMULA 34]}$$
$$s_{q\_Z} \cdot c_{q\_Z}\} - \gamma_Z + \gamma'_Z,$$

ends the processing by outputting data indicating a misuse detection if the computation result is not 0, and outputs values $c_{q\_1}$ and $c_{q\_2}$ if the computation result is 0 (S35).

Next, a processing performed by the party Z will be described. First, the second random number generation means 304 generates a random number sequence $(\alpha X0_{q\_0}, \ldots, \alpha X0_{q\_na0-1})$ and a random number $\rho_Z$ and transmits the random number sequence and the random number to the party X, and generates a random number sequence $(\alpha Y2_{q\_0}, \ldots, \alpha Y2_{q\_na2-1})$ and transmits the random number sequence to the party Y (S36). Then, the third computation means 305 computes a random number sequence $(\alpha Y2_{q\_0}-s_{q\_Y}\cdot a2_{q\_0}, \ldots, \alpha Y2_{q\_na2-1}-s_{q\_Y}\cdot a2_{q\_na2-1})$, transmits the random number sequence to the party X, receives a random number sequence $(\alpha Z0_{q\_0}, \ldots, \alpha Z0_{q\_na0-1})$ from the party X and a random number sequence $(\alpha Z2_{q\_0}, \ldots, \alpha Z2_{q\_na2-1})$ from the party Y, computes a random number sequence $(\alpha X0_{q\_0}-s_{q\_X}\cdot a0_{q\_0}, \ldots, \alpha X0_{q\_na0-1}-s_{q\_X}\cdot a0_{q\_na0-1})$ and a value $\gamma_Z$ according to $$\gamma_Z = \sum_{i2,j0,q} (e20_{q\_i2,q\_j0} \cdot \alpha Z2_{q\_i2} \cdot b0_{q\_j0}) + \quad \text{[FORMULA 35]}$$
$$\sum_{i0,j2,q} (e02_{q\_i0,q\_j2} \cdot \alpha Z0_{q\_i0} \cdot b2_{q\_j2}) + \rho_Z$$

and transmits the random number sequence and the value to the party Y (S37). Then, the fourth computation means 306 receives a random number sequence $(\alpha Y1_{q\_0}-$ $s_{q\_Y} \cdot a1_{q\_0}, \ldots, \alpha Y1_{q\_na1-1} - s_{q\_Y} \cdot a1_{q\_na1-1}$) from the party X and a value $\rho_Y$ from the party Y, computes a value $\gamma'_Y$ according to $$\gamma'_Y = \sum_{i1,j2,q} \{e12_{q\_i1,q\_j2} \cdot (\alpha Y1_{q\_i1} - s_{q\_Y} \cdot a1_{q\_i1}) \cdot b2_{q\_j2} - \quad \text{[FORMULA 36]}$$
$$s_{q\_Y} \cdot r_{q\_Y}\} + \rho_Y$$

and transmits the value to the party X (S38). Then, the misuse detection means 307 receives the value $\gamma_X$ from the party X and the value $\gamma'_X$ and a random number sequence ($\alpha X1_{q\_0} - s_{q\_X} \cdot a1_{q\_0}, \ldots, \alpha X1_{q\_na1-1} - s_{q\_X} \cdot a1_{q\_na1-1}$) from the party Y, computes $$\sum_{i1,j0,q} \{e10_{q\_i1,q\_j0} \cdot (\alpha X1_{q\_i1} - s_{q\_X} \cdot a1_{q\_i1}) \cdot b0_{q\_j0} + \quad \text{[FORMULA 37]}$$
$$s_{q\_X} \cdot c_{q\_X}\} - \gamma_X + \gamma'_X,$$

ends the processing by outputting data indicating a misuse detection if the computation result is not 0, and outputs values $c_{q\_2}$ and $c_{q\_0}$ if the computation result is 0 (S39).

If no misuse detection occurs, the total sum of the values $c_{q\_0}$, $c_{q\_1}$ and $c_{q\_2}$ output from the parties X, Y and Z can be computed to obtain a sum-of-product computation result as expressed by the following formula.

$$c_{q\_0} + c_{q\_1} + c_{q\_2} = \sum_{q\_i0,q\_j0} (e00_{q\_i0,q\_j0} \cdot a0_{q\_i0} \cdot b0_{q\_j0}) + \quad \text{[FORMULA 38]}$$
$$\sum_{q\_i0,q\_j1} (e01_{q\_i0,q\_j1} \cdot a0_{q\_i0} \cdot b1_{q\_j1}) +$$
$$\sum_{q\_i1,q\_j0} (e10_{q\_i1,q\_j0} \cdot a1_{q\_i1} \cdot b0_{q\_j0}) +$$
$$\sum_{q\_i1,q\_j1} (e11_{q\_i1,q\_j1} \cdot a1_{q\_i1} \cdot b1_{q\_j1}) +$$
$$\sum_{q\_i1,q\_j2} (e12_{q\_i1,q\_j2} \cdot a1_{q\_i1} \cdot b2_{q\_j2}) +$$
$$\sum_{q\_i2,q\_j1} (e21_{q\_i2,q\_j1} \cdot a2_{q\_i2} \cdot b1_{q\_j1}) +$$
$$\sum_{q\_i2,q\_j2} (e22_{q\_i2,q\_j2} \cdot a2_{q\_i2} \cdot b2_{q\_j2}) +$$
$$\sum_{q\_i2,q\_j0} (e20_{q\_i2,q\_j0} \cdot a2_{q\_i2} \cdot b0_{q\_j0}) +$$
$$\sum_{q\_i0,q\_j2} (e02_{q\_i0,q\_j2} \cdot a2_{q\_i2} \cdot b0_{q\_i0})$$

In the processing described above, hash values or other values can be substituted for the random numbers.

The misuse detection according to the present invention is performed once for one multiplication, one sum-of-product computation or a set of multiplications or sum-of-product computations performed in parallel. The values $\alpha P_+ 0_{q\_j0}$, $\alpha P_+ 1_{q\_j1}$ and $\alpha P_+ 2_{q\_j2}$ (q=0, ..., m−1) included in the value $\gamma_{P+}$ transmitted by the party $P_+$ involved with the misuse detection function are fragments of the respective values $a_{q\_i}$ multiplied by different random numbers. Thus, if any of the values is not correct, the party $P_+$ cannot predict the random numbers. Therefore, if the modulo is a prime number p, the probability that any misuse can be made agree with the misuse in the sum-of-product computation processing is only 1/(p−1).

Fourth Embodiment

Figure 9:
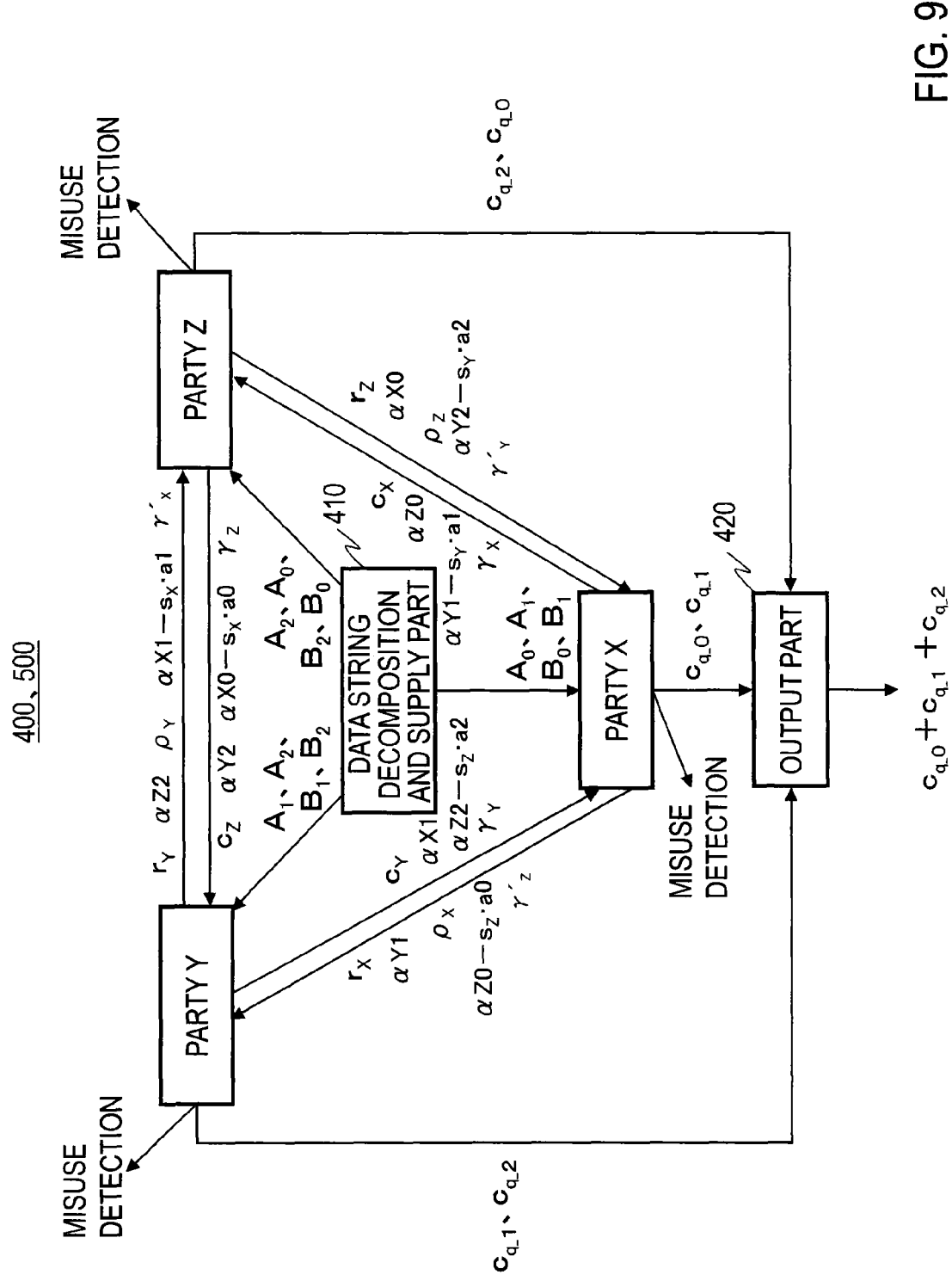
FIG. 9 is a diagram showing an example of a configuration of secure sum-of-product computation systems 400 and 500.
Figure 10:
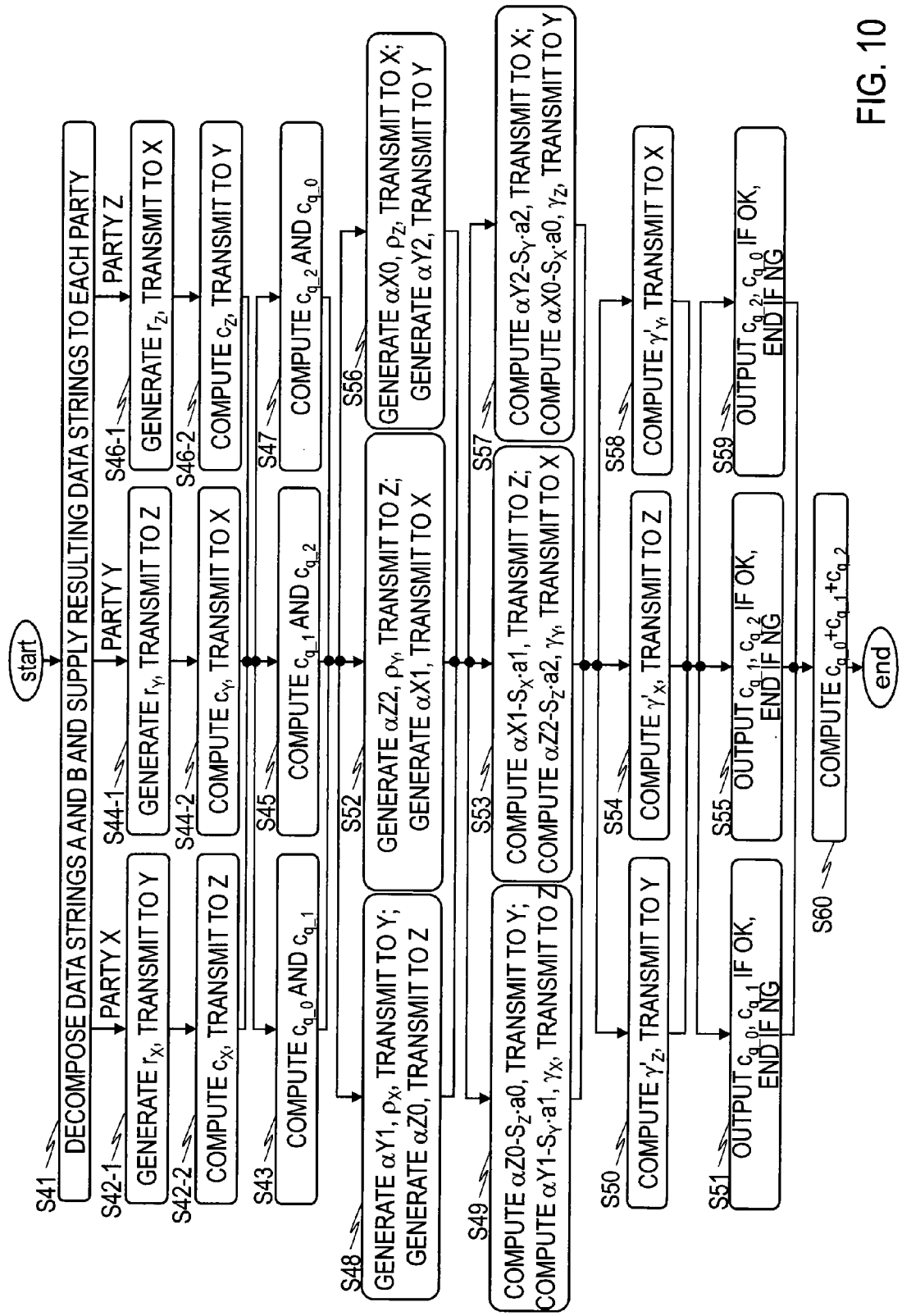
FIG. 10 is a diagram showing an example of a flow of a processing performed by the secure sum-of-product computation systems 400 and 500.

A fourth embodiment is a specific example of the third embodiment, in which na0=na1=na2=nb0=nb1=nb2=n (n represents an integer equal to or greater than 1), and e00=e01=e10=e11=e12=e21=e22=e20=e02=1. FIG. 9 shows an example of a configuration of a secure sum-of-product computation system 400 according to this embodiment, and FIG. 10 shows an example of a flow of a processing performed by the secure sum-of-product computation system 400. The secure sum-of-product computation system 400 comprises a party X, a party Y, a party Z, a data string decomposition and supply part 410 and an output part 420. As in the third embodiment, each party has first random number generation means 301, first computation means 302, second computation means 303, second random number generation means 304, third computation means 305, fourth computation means 306 and misuse detection means 307.

The secure sum-of-product computation system 400 performs a sum-of-product computation $$\sum_{i=0}^{n-1} a_{q\_i} \cdot b_{q\_i} \quad \text{[FORMULA 39]}$$

for m sets of data strings $A_q = (a_{q\_0}, \ldots, a_{q\_n-1})$ and $B_q = (b_{q\_0}, \ldots, b_{q\_n-1})$ (m represents an integer equal to or greater than 1, and q=0, ..., m−1) comprising elements $a_{q\_i}$ and $b_{q\_i}$ (i=0, ..., n−1 (n represents an integer equal to or greater than 1)), which are natural numbers smaller than a prime number p, through cooperative computation by the three computation apparatuses, the parties X, Y and Z (the sum-of-product computation is a multiplication of a and b in the case where n=1). As in the third embodiment, it is assumed that the parties X and Y previously share a random number $s_{q\_Z}$, the parties Y and Z previously share a random number $s_{q\_X}$, and the parties Z and X previously share a random number $s_{q\_Y}$.

Specifically, the data string decomposition and supply part 410 first decomposes the m sets of input data strings $A_q$ and $B_q$ in such a manner that each element $a_{q\_i}$ and $b_{q\_i}$ satisfy conditional formulas $a_{q\_i} = a0_{q\_i} + a1_{q\_i} + a2_{q\_i}$ mod p and $b_{q\_i} = b0_{q\_i} + b1_{q\_i} + b2_{q\_i}$ mod p ($a0_{q\_i}$, $a1_{q\_i}$, $b0_{q\_i}$ and $b1_{q\_i}$ represent random numbers, and p represents a prime number) and supplies data strings $A_{q\_0} = (a0_{q\_0}, \ldots, a0_{q\_n-1})$, $A_{q\_1} = (a1_{q\_0}, \ldots, a1_{q\_n-1})$, $B_{q\_0} = (b0_{q\_0}, \ldots, b0_{q\_n-1})$ and $B_{q\_1} = (b1_{q\_0}, \ldots, b1_{q\_n-1})$ to the party X, the data strings $A_{q\_1}$, $A_{q\_2} = (a2_{q\_0}, \ldots, a2_{q\_n-1})$, $B_{q\_1}$ and $B_{q\_2} = (b2_{q\_0}, \ldots, b2_{q\_n-1})$ to the party Y, and data strings $A_{q\_2}$, $A_{q\_0}$, $B_{q\_2}$ and $B_{q\_0}$ to the party Z (S41).

Then, the party X performs the following processing. The first random number generation means 301 first generates a random number $r_{q\_X}$ and transmits the random number to the party Y (S42-1). Then, the first computation means 302 computes a value $c_{q\_X}$ according to $$c_{q\_X} = \sum_i (a0_{q\_i} \cdot b1_{q\_i} + a1_{q\_i} \cdot b0_{q\_i}) + r_{q\_X} \quad \text{[FORMULA 40]}$$

and transmits the value $c_{q\_X}$ to the party Z (S42-2). Then, the second computation means 303 receives a random number $r_{q\_Z}$ from the party Z and a value $c_{q\_Y}$ from the party Y and computes values $c_{q\_0}$ and $c_{q\_1}$ according to the following formula (S43).

$$c_{q\_0} = \sum_i (a0_{q\_i} \cdot b0_{q\_i}) + c_{q\_X} - r_{q\_Z} \quad \text{[FORMULA 41]}$$

$$c_{q\_1} = \sum_i (a1_{q\_i} \cdot b1_{q\_i}) + c_{q\_Y} - r_{q\_X}$$

The party Y performs the following processing. The first random number generation means 301 first generates a random number $r_{q\_Y}$ and transmits the random number to the party Z (S44-1). Then, the first computation means 302 computes the value $c_{q\_Y}$ according to $$c_{q\_Y} = \sum_i (a1_{q\_i} \cdot b2_{q\_i} + a2_{q\_i} \cdot b1_{q\_i}) + r_{q\_Y} \quad \text{[FORMULA 42]}$$

and transmits the value $c_{q\_Y}$ to the party X (S44-2). Then, the second computation means 306 receives the random number $r_{q\_X}$ from the party X and a value $c_{q\_Z}$ from the party Z and computes values $c_{q\_1}$ and $c_{q\_2}$ according to the following formula (S45).

$$c_{q\_1} = \sum_i (a1_{q\_i} \cdot b1_{q\_i}) + c_{q\_Y} - r_{q\_X} \quad \text{[FORMULA 43]}$$

$$c_{q\_2} = \sum_i (a2_{q\_i} \cdot b2_{q\_i}) + c_Z - r_Y$$

The party Z performs the following processing. The first random number generation means 301 first generates the random number $r_{q\_Z}$ and transmits the random number to the party X (S46-1). Then, the first computation means 302 computes the value $c_{q\_Z}$ according to $$c_{q\_Z} = \sum_i (a2_{q\_i} \cdot b0_{q\_i} + a0_{q\_i} \cdot b2_{q\_i}) + r_{q\_Z} \quad \text{[FORMULA 44]}$$

and transmits the value $c_{q\_Z}$ to the party Y (S46-2). Then, the second computation means 303 receives the random number $r_{q\_Y}$ from the party Y and the value $c_{q\_X}$ from the party X and computes values $c_{q\_0}$ and $c_{q\_2}$ according to the following formula (S47).

$$c_0 = \sum_i (a0_i \cdot b0_i) + c_X - r_Z \quad \text{[FORMULA 45]}$$

$$c_2 = \sum_i (a2_i \cdot b2_i) + c_Z - r_Y$$

Note that the series of steps S42-1 and S4-2, the series of steps S44-1 S44-2 and the series of steps S46-1 and S46-2 can be performed in parallel, and the steps S43, S45 and S47 can also be performed in parallel.

Following the steps S41 to S47, each party performs a misuse detection processing as described below. A processing performed by the party X will be described. First, the second random number generation means 304 generates a random number sequence $(\alpha Y1_{q\_0}, \ldots, \alpha Y1_{q\_n-1})$ and a random number $\rho_X$ and transmits the random number sequence and the random number to the party Y, and generates a random number sequence $(\alpha Z0_{q\_0}, \ldots, \alpha Z0_{q\_n-1})$ and transmits the random number sequence to the party Z (S48). Then, the third computation means 305 computes a random number sequence $(\alpha Z0_{q\_0}-s_{q\_Z} \cdot a0_{q\_0}, \ldots, \alpha Z0_{q\_n-1}-s_{q\_Z} \cdot a0_{q\_n-1})$, transmits the random number sequence to the party Y, receives a random number sequence $(\alpha X1_{q\_0}, \ldots, \alpha X1_{q\_n-1})$ from the party Y and a random number sequence $(\alpha X0_{q\_0}, \ldots, \alpha X0_{q\_n-1})$ from the party Z, computes a random number sequence $(\alpha Y1_{q\_0}-s_{q\_Y} \cdot a1_{q\_0}, \ldots, \alpha Y1_{q\_n-1}-s_{q\_Y} \cdot a1_{q\_n-1})$ and a value $\gamma_X$ according to $$\gamma_X = \sum_{i,q} (\alpha X0_{q\_i} \cdot b1_{q\_i} + \alpha X1_{q\_i} \cdot b0_{q\_i}) + \rho_X \quad \text{[FORMULA 46]}$$

and transmits the random number sequence and the value to the party Z (S49). Then, the fourth computation means 306 receives a random number sequence $(\alpha Z2_{q\_0}-s_{q\_Z} \cdot a2_{q\_0}, \ldots, \alpha Z2_{q\_n-1}-s_{q\_Z} \cdot a2_{q\_n-1})$ from the party Y and a value $\rho_Z$ from the party Z, computes a value $\gamma'_Z$ according to $$\gamma'_Z = \sum_{i,q} \{(\alpha Z2_{q\_i} - s_{q\_Z} \cdot a2_{q\_i}) \cdot b0_{q\_i} - s_{q\_Z} \cdot r_{q\_Z}\} + \rho_Z \quad \text{[FORMULA 47]}$$

and transmits the value to the party Y (S50). Then, the misuse detection means 307 receives a value $\gamma_Y$ from the party Y, a value $\gamma'_Y$ and a random number sequence $(\alpha Y2_{q\_0}-s_{q\_Y} \cdot a2_{q\_0}, \ldots, \alpha Y2_{q\_n-1}-s_{q\_Y} \cdot a2_{q\_n-1})$ from the party Z, computes $$\sum_{i,q} \{(\alpha Y2_{q\_i} - s_{q\_Y} \cdot a2_{q\_i}) \cdot b1_{q\_i} + s_{q\_Y} \cdot c_{q\_Y}\} - \gamma_Y + \gamma'_Y, \quad \text{[FORMULA 48]}$$

ends the processing by outputting data indicating a misuse detection if the computation result is not 0, and outputs values $c_{q\_0}$ and $c_{q\_1}$ if the computation result is 0 (S51).

Next, a processing performed by the party Y will be described.

First, the second random number generation means 304 generates a random number sequence $(\alpha Z2_{q\_0}, \ldots, \alpha Z2_{q\_n-1})$ and a random number $\rho_Y$ and transmits the random number sequence and the random number to the party Z, and generates a random number sequence $(\alpha X1_{q\_0}, \ldots, \alpha X1_{q\_n-1})$ and transmits the random number sequence to the party X (S52). Then, the third computation means 305 computes a random number sequence $(\alpha X1_{q\_0}-s_{q\_X} \cdot a1_{q\_0}, \ldots, \alpha X1_{q\_n-1}-s_{q\_X} \cdot a1_{q\_n-1})$, transmits the random number sequence to the party Z, receives a random number sequence $(\alpha Y1_{q\_0}, \ldots, \alpha Y1_{q\_n-1})$ from the party X and a random number sequence $(\alpha Y2_{q\_0}, \ldots, \alpha Y2_{q\_n-1})$ from the party Z, computes a random number sequence $(\alpha Z2_{q\_0}-s_{q\_Z} \cdot a2_{q\_0}, \ldots, \alpha Z2_{q\_n-1}-s_{q\_Z} \cdot a2_{q\_n-1})$ and a value $\gamma_Y$ according to $$\gamma_Y = \sum_{i,q} (\alpha Y1_{q\_i} \cdot b2_{q\_i} + \alpha Y2_{q\_i} \cdot b1_{q\_i}) + \rho_Y \quad \text{[FORMULA 49]}$$

and transmits the random number sequence and the value to the party X (S53). Then, the fourth computation means 306 receives the random number $\rho_X$ from the party X and a random number sequence $(\alpha X0_{q\_0} - s_{q\_X} \cdot a0_{q\_0}, \ldots, \alpha X0_{q\_n-1} - s_{q\_X} \cdot a0_{q\_n-1})$ from the party Z, computes a value $\gamma'_X$ according to $$\gamma'_X = \sum_{i,q}\{(\alpha X0_{q\_i} - s_{q\_X} \cdot a0_{q\_i}) \cdot b1_{q\_i} - s_{q\_X} \cdot r_{q\_X}\} + \rho_X \quad \text{[FORMULA 50]}$$

and transmits the value to the party Z (S54). Then, the misuse detection means 307 receives a value $\gamma'_Z$ and a random number sequence $(\alpha Z0_{q\_0} - s_{q\_Z} \cdot a0_{q\_0}, \ldots, \alpha Z0_{q\_n-1} - s_{q\_Z} \cdot a0_{q\_n-1})$ from the party X and a value $\gamma_Z$ from the party Z, computes $$\sum_{i,q}\{(\alpha Z0_{q\_i} - s_{q\_Z} \cdot a0_{q\_i}) \cdot b2_{q\_i} + s_{q\_Z} \cdot c_{q\_Z}\} - \gamma_Z + \gamma'_Z, \quad \text{[FORMULA 51]}$$

ends the processing by outputting data indicating a misuse detection if the computation result is not 0, and outputs values $c_{q\_1}$ and $c_{q\_2}$ if the computation result is 0 (S55).

Next, a processing performed by the party Z will be described. First, the second random number generation means 304 generates a random number sequence $(\alpha X0_{q\_0}, \ldots, \alpha X0_{q\_n-1})$ and a random number $\rho_Z$ and transmits the random number sequence and the random number to the party X, and generates a random number sequence $(\alpha Y2_{q\_0}, \ldots, \alpha Y2_{q\_n-1})$ and transmits the random number sequence to the party Y (S56). Then, the third computation means 305 computes a random number sequence $(\alpha Y2_{q\_0} - s_{q\_Y} \cdot a2_{q\_0}, \ldots, \alpha Y2_{q\_n-1} - s_{q\_Y} \cdot a2_{q\_n-1})$, transmits the random number sequence to the party X, receives a random number sequence $(\alpha Z0_{q\_0}, \ldots, \alpha Z0_{q\_n-1})$ from the party X and a random number sequence $(\alpha Z2_{q\_0}, \ldots, \alpha Z2_{q\_n-1})$ from the party Y, computes a random number sequence $(\alpha X0_{q\_0} - s_{q\_X} \cdot a0_{q\_0}, \ldots, \alpha X0_{q\_n-1} - s_{q\_X} \cdot a0_{q\_n-1})$ and a value $\gamma_Z$ according to $$\gamma_Z = \sum_{i,q}(\alpha Z2_{q\_i} \cdot b0_{q\_i} + \alpha Z0_{q\_i} \cdot b2_{q\_i}) + \rho_Z \quad \text{[FORMULA 52]}$$

and transmits the random number sequence and the value to the party Y (S57). Then, the fourth computation means 306 receives a random number sequence $(\alpha Y1_{q\_0} - s_{q\_Y} \cdot a1_{q\_0}, \ldots, \alpha Y1_{q\_n-1} - s_{q\_Y} \cdot a1_{q\_n-1})$ from the party X and a value $\rho_Y$ from the party Y, computes a value $\gamma'_Y$ according to $$\gamma'_Y = \sum_{i,q}\{(\alpha Y1_{q\_i} - s_{q\_Y} \cdot a1_{q\_i}) \cdot b2_{q\_i} - s_{q\_Y} \cdot r_{q\_Y}\} + \rho_Y \quad \text{[FORMULA 53]}$$

and transmits the value to the party X (S58). Then, the misuse detection means 307 receives the value $\gamma_X$ from the party X and the value $\gamma'_X$ and a random number sequence $(\alpha X1_{q\_0} - s_{q\_X} \cdot a1_{q\_0}, \ldots, \alpha X1_{q\_n-1} - s_{q\_X} \cdot a1_{q\_n-1})$ from the party Y, computes $$\sum_{i,q}\{(\alpha X1_{q\_i} - s_{q\_X} \cdot a1_{q\_i}) \cdot b0_{q\_i} + s_{q\_X} \cdot c_{q\_X}\} - \quad \text{[FORMULA 54]}$$

$$\gamma_X + \gamma'_X,$$

ends the processing by outputting data indicating a misuse detection if the computation result is not 0, and outputs values $c_{q\_2}$ and $c_{q\_0}$ if the computation result is 0 (S59).

Then, the output part 420 computes the total sum $(c_{q\_0} + c_{q\_1} + c_{q\_2})$ of the values $c_{q\_0}$, $c_{q\_1}$ and $c_{q\_2}$ output from the parties X, Y and Z and outputs the total sum (S60).

The following relation holds.

[FORMULA 55]

$$\begin{aligned}c_{q\_0} + c_{q\_1} + c_{q\_2} &= \sum_i (a0_{q\_i} \cdot b0_{q\_i} + a0_{q\_i} \cdot b1_{q\_i} + a1_{q\_i} \cdot b0_{q\_i}) + \\ &\quad \sum_i (a1_{q\_i} \cdot b1_{q\_i} + a1_{q\_i} \cdot b2_{q\_i} + a2_{q\_i} \cdot b1_{q\_i}) + \\ &\quad \sum_i (a2_{q\_i} \cdot b2_{q\_i} + a2_{q\_i} \cdot b0_{q\_i} + a0_{q\_i} \cdot b2_{q\_i}) \\ &= \sum_i (a0_{q\_i} + a1_{q\_i} + a2_{q\_i})(b0_{q\_i} + b1_{q\_i} + b2_{q\_i}) \\ &= \sum_i a_{q\_i} \cdot b_{q\_i}\end{aligned}$$

From the relation above, it can be seen that the sum-of-product computation (a multiplication of $a_q$ and $b_q$ in the case where i=1 (in the case where n=1)) has been correctly done. In the processing described above, hash values or other values can be substituted for the random numbers.

The data string decomposition and supply part 410 and the output part 420 can be provided in an apparatus other than the parties or provided in any one or more of the apparatuses serving as the parties.

The effect of the method according to the present invention will be compared with that of the method described in Non-Patent literature 1. Provided that m=1, according to the present invention, the number of rounds is 2, the number of pieces of data transmitted by each party is 10, and the number of random numbers generated by each party is 5. In addition, since the value $s_P$ can be repeatedly used once it is shared among the parties, the actual number of rounds is 2, the actual number of pieces of data transmitted is 9, and the number of random numbers generated is 4. On the other hand, according to the method described in Non-Patent literature 1, the number of rounds is 4, the number of pieces of data transmitted by the party X is 20, the number of random numbers generated by the party X is 12, the number of pieces of data transmitted by the parties Y and Z is 17, and the number of random numbers generated by the parties Y and Z is 9. Therefore, the method according to the present invention is about twice as efficient as the method described in Non-Patent literature 1.

In the case where m≥2, the efficiency is further improved. According to the present invention, the number of rounds is 2, the number of pieces of data transmitted by each party is 6 m+3, and the number of random numbers generated by each party is 3 m+1. On the other hand, according to the method described in Non-Patent literature 1, the number of rounds is 4, the number of pieces of data transmitted by the party X is 20m, the number of random numbers generated by the party X is 12m, the number of pieces of data transmitted by the parties Y and Z is 17m, and the number of random numbers generated by the parties Y and Z is 9m. Therefore, the method according to the present invention is about three times as efficient as the method described in Non-Patent literature 1.

Fifth Embodiment

While the secure sum-of-product computation system 400 according to the fourth embodiment is configured to perform a sum-of-product computation expressed as $$\sum_{i=0}^{n-1} a_{q\_i} \cdot b_{q\_i},$$ [FORMULA 56]

a secure sum-of-product computation system 500 according to a fifth embodiment has a configuration in which one of the values involved in the multiplication is fixed, for example. More specifically, the secure sum-of-product computation system 500 performs the following m sum-of-product computations of a data string $A_q=(a_{q\_0}, \ldots, a_{q\_n-1})$ (m represents an integer equal to or greater than 1, and $q=0, \ldots, m-1$) comprising elements $a_{q\_i}$ ($q=0, \ldots, m-1$ (m represents an integer equal to or greater than 1), and $i=0, \ldots, n-1$ (n represents an integer equal to or greater than 1)), which are natural numbers smaller than a prime number p, and a value b, which is a natural number smaller than the prime number p, through cooperative computation by three computation apparatuses, the parties X, Y and Z.

$$\sum_{i=0}^{n-1} a_{q\_i} \cdot b$$ [FORMULA 57]

The functional configuration and the process flow are the same as those in the fourth embodiment and therefore will be described below with reference to them (that is, FIG. 9 (and FIG. 8) showing the configuration and FIG. 10 showing the process flow). As in the fourth embodiment, it is assumed that the parties X and Y previously share a random number $s_{q\_Z}$, the parties Y and Z previously share a random number $s_{q\_X}$, and the parties Z and X previously share a random number $s_{q\_Y}$.

Specifically, the data string decomposition and supply part 410 first decomposes the input data string $A_q$ and the value b in such a manner that each element $a_{q\_i}$ of the data string satisfies a conditional formula $a_{q\_i}=a0_{q\_i}+a1_{q\_i}+a2_{q\_i}$ mod p and the value satisfies a conditional formula $b=b0+b1+b2$ mod p ($a0_{q\_i}, a1_{q\_i}, b0$ and b1 represent random numbers, and p represents a prime number) and supplies data strings $A_{q\_0}=(a0_{q\_0}, \ldots, a0_{q\_n-1})$ and $A_{q\_1}=(a1_{q\_0}, \ldots, a1_{q\_n-1})$ and values b0 and b1 to the party X, data strings $A_{q\_1}$ and $A_{q\_2}=(a2_{q\_0}, \ldots, a2_{q\_n-1})$ and values b1 and b2 to the party Y, and data strings $A_{q\_2}$ and $A_{q\_0}$ and values b2 and b0 to the party Z (S41).

Then, the party X performs the following processing. The first random number generation means 301 first generates a random number $r_{q\_X}$ and transmits the random number to the party Y (S42-1). Then, the first computation means 302 computes a value $c_{q\_X}$ according to $$c_{q\_X} = \sum_i (a0_{q\_i} \cdot b1 + a1_{q\_i} \cdot b0) + r_{q\_X}$$ [FORMULA 58]

and transmits the value $c_{q\_X}$ to the party Z (S42-2). Then, the second computation means 303 receives a random number $r_{q\_Z}$ from the party Z and a value $c_{q\_Y}$ from the party Y and computes values $c_{q\_0}$ and $c_{q\_1}$ according to the following formula (S43).

$$c_{q\_0} = \sum_i (a0_{q\_i} \cdot b0) + c_{q\_X} - r_{q\_Z}$$ [FORMULA 59]

$$c_{q\_1} = \sum_i (a1_{q\_i} \cdot b1) + c_{q\_Y} - r_{q\_X}$$

The party Y performs the following processing. The random number generation means 304 first generates a random number $r_{q\_Y}$ and transmits the random number to the party Z (S44-1). Then, the first computation means 305 computes the value $c_{q\_Y}$ according to $$c_{q\_Y} = \sum_i (a1_{q\_i} \cdot b2 + a2_{q\_i} \cdot b1) + r_{q\_Y}$$ [FORMULA 60]

and transmits the value $c_{q\_Y}$ to the party X (S44-2). Then, the second computation means 306 receives the random number $r_{q\_X}$ from the party X and a value $c_{q\_Z}$ from the party Z and computes values $c_{q\_1}$ and $c_{q\_2}$ according to the following formula (S45).

$$c_{q\_1} = \sum_i (a1_{q\_i} \cdot b1) + c_{q\_Y} - r_{q\_X}$$ [FORMULA 61]

$$c_{q\_2} = \sum_i (a2_{q\_i} \cdot b2) + c_{q\_Z} - r_{q\_Y}$$

The party Z performs the following processing. The first random number generation means 301 first generates the random number $r_{q\_Z}$ and transmits the random number to the party X (S46-1). Then, the first computation means 302 computes the value $c_{q\_Z}$ according to $$c_{q\_Z} = \sum_i (a2_{q\_i} \cdot b0 + a0_{q\_i} \cdot b2) + r_{q\_Z}$$ [FORMULA 62]

and transmits the value $c_{q\_Z}$ to the party Y (S46-2). Then, the second computation means 303 receives the random number $r_{q\_Y}$ from the party Y and the value $c_{q\_X}$ from the party X and computes values $c_{q\_0}$ and $c_{q\_2}$ according to the following formula (S47).

$$c_{q\_0} = \sum_i (a0_{q\_i} \cdot b0) + c_{q\_X} - r_{q\_Z}$$ [FORMULA 63]

$$c_{q\_2} = \sum_i (a2_{q\_i} \cdot b2) + c_{q\_Z} - r_{q\_Y}$$

Note that the series of steps S42-1 and S42-2, the series of steps S44-1 and S44-2 and the series of steps S46-1 and S46-2 can be performed in parallel, and the steps S43, S45 and S47 can also be performed in parallel.

Following the steps S41 to S47, each party performs a misuse detection processing as described below. A processing performed by the party X will be described. First, the second random number generation means 304 generates random numbers $\alpha Y1$ and $\rho_X$ and transmits the random numbers to the party Y, and generates a random number $\alpha Z0$ and transmits the random number to the party Z (S48). Then, the third computation means 305 computes a value $$\alpha Z0 - \sum_{i,q}(s_{q\_Z} \cdot a0_{q\_i}), \qquad \text{[FORMULA 64]}$$

transmits the value to the party Y, receives a random number $\alpha X1$ from the party Y and a random number $\alpha 0$ from the party Z, computes values $$\alpha Y1 - \sum_{i,q}(s_{q\_Y} \cdot a1_{q\_i}) \qquad \text{[FORMULA 65]}$$

and $$\gamma_X = \alpha X0 \cdot b1 + \alpha X1 \cdot b0 + \rho_X \qquad \text{[FORMULA 66]}$$

and transmits the values to the party Z (S49). Then, the fourth computation means 306 receives a value $$\alpha Z2 - \sum_{i,q}(s_{q\_Z} \cdot a2_{q\_i}) \qquad \text{[FORMULA 67]}$$

from the party Y and a value $\rho_Z$ from the party Z, computes a value $$\gamma'_Z = \left(\alpha Z2 - \sum_{i,q}(s_{q\_Z} \cdot a2_{q\_i})\right) \cdot b0 - \sum_q s_{q\_Z} \cdot r_{q\_Z} \cdot \rho_Z \qquad \text{[FORMULA 68]}$$

and outputs the value to the party Y (S50).

Then, the misuse detection means 307 receives a value $\gamma_Y$ from the party Y, a value $\gamma'_Y$ and a value $$\alpha Y2 - \sum_{i,q}(s_{q\_Y} \cdot a2_{q\_i})$$

from the party Z, computes $$\left(\alpha Y2 - \sum_{i,q}(s_{q\_Y} \cdot a2_{q\_i})\right) \cdot b1 + \sum_q s_{q\_Y} \cdot c_{q\_Y} - \gamma_Y + \gamma'_Y, \qquad \text{[FORMULA 70]}$$

ends the processing by outputting data indicating a misuse detection if the computation result is not 0, and outputs values $c_{q\_0}$ and $c_{q\_1}$ if the computation result is 0 (S51).

Next, a processing performed by the party Y will be described. First, the second random number generation means 304 generates random numbers $\alpha Z2$ and $\rho_Y$ and transmits the random numbers to the party Z, and generates a random number $\alpha X1$ and transmits the random number to the party X (S52). Then, the third computation means 305 computes a value $$\alpha X1 - \sum_{i,q}(s_{q\_X} \cdot a1_{q\_i}) \qquad \text{[FORMULA 71]}$$

transmits the value to the party Z, receives a random number $\alpha Y1$ from the party X and a random number $\alpha Y2$ from the party Z, computes $$\alpha Z2 - \sum_{i,q}(s_{q\_Z} \cdot a2_{q\_i}) \qquad \text{[FORMULA 72]}$$

and $$\gamma_Y = \alpha Y1 \cdot b2 + \alpha Y2 \cdot b1 + \rho_Y \qquad \text{[FORMULA 73]}$$

and transmits the values to the party X (S53). Then, the fourth computation means 306 receives the random number $\rho_X$ from the party X and a value $$\alpha X0 - \sum_{i,q}(s_{q\_X} \cdot a0_{q\_i}) \qquad \text{[FORMULA 74]}$$

from the party Z, computes a value $\gamma'_X$ according to $$\gamma'_X = \left(\alpha X0 - \sum_{i,q}(s_{q\_X} \cdot a0_{q\_i})\right) \cdot b1 - \sum_q s_{q\_X} \cdot r_{q\_X} + \rho_X \qquad \text{[FORMULA 75]}$$

and transmits the value to the party Z (S54). Then, the misuse detection means 307 receives a value $\gamma'_Z$ and a value $$\alpha Z0 - \sum_{i,q}(s_{q\_Z} \cdot a0_{q\_i}) \qquad \text{[FORMULA 76]}$$

from the party X and a value $\gamma_Z$ from the party Z, computes $$\left(\alpha Z0 - \sum_{i,q}(s_{q\_Z} \cdot a0_{q\_i})\right) \cdot b2 + \sum_q s_{q\_Z} \cdot c_{q\_Z} - \gamma_Z + \gamma'_Z, \qquad \text{[FORMULA 77]}$$

ends the processing by outputting data indicating a misuse detection if the computation result is not 0, and outputs values $c_{q\_1}$ and $c_{q\_2}$ if the computation result is 0 (S55).

Next, a processing performed by the party Z will be described. First, the second random number generation means 304 generates random numbers $\alpha X0$ and $\rho_Z$ and transmits the random numbers to the party X, and generates a random number $\alpha Y2$ and transmits the random number to the party Y (S56). Then, the third computation means 305 computes a value $$\alpha Y2 - \sum_{i,q}(s_{q\_Y} \cdot a2_{q\_i}), \qquad \text{[FORMULA 78]}$$

transmits the value to the party X, receives a random number $\alpha Z0$ from the party X and a random number $\alpha Z2$ from the party Y, computes values $$\alpha X0 - \sum_{i,q}(s_{q\_X} \cdot a0_{q\_i})$$ [FORMULA 79]

and $$\gamma_Z = \alpha Z2 \cdot b0 + \alpha Z0 \cdot b2 + \rho_Z$$ [FORMULA 80]

and transmits the values to the party Y (S57). Then, the fourth computation means 306 receives a value $$\alpha Y1 - \sum_{i,q}(s_{q\_Y} \cdot a1_{q\_i})$$ [FORMULA 81]

from the party X and a value $\rho_Y$ from the party Y, computes a value $\gamma'_Y$ according to $$\gamma'_Y = \left(\alpha Y1 - \sum_{i,q}(s_{q\_Y} \cdot a1_{q\_i})\right) \cdot b2 - \sum_q s_{q\_Y} \cdot r_{q\_Y} + \rho_Y$$ [FORMULA 82]

and transmits the value to the party X (S58). Then, the misuse detection means 307 receives the value $\gamma_X$ from the party X and the value $\gamma'_X$ and a value $$\alpha X1 - \sum_{i,q}(s_{q\_X} \cdot a1_{q\_i})$$ [FORMULA 83]

from the party Y, computes $$\left(\alpha X1 - \sum_{i,q}(s_{q\_X} \cdot a1_{q\_i})\right) \cdot b0 + \sum_q s_{q\_X} \cdot c_{q\_X} - \gamma_X + \gamma'_X,$$ [FORMULA 84]

ends the processing by outputting data indicating a misuse detection if the computation result is not 0, and outputs values $c_{q\_2}$ and $c_{q\_0}$ if the computation result is 0 (S59).

Then, the output part 420 computes the total sum ($c_{q\_0} + c_{q\_1} + c_{q\_2}$) of the values $c_{q\_0}$, $c_{q\_1}$ and $c_{q\_2}$ output from the parties X, Y and Z and outputs the total sum (S60).

$$c_{q\_0} + c_{q\_1} + c_{q\_2} = \sum_i \begin{pmatrix} a0_{q\_i} \cdot b0 + a0_{q\_i} \cdot \\ b1 + a1_{q\_i} \cdot b0 \end{pmatrix} +$$ [FORMULA 85]

$$\sum_i \begin{pmatrix} a1_{q\_i} \cdot b1 + a1_{q\_i} \cdot \\ b2 + a2_{q\_i} \cdot b1 \end{pmatrix} +$$

$$\sum_i \begin{pmatrix} a2_{q\_i} \cdot b2 + a2_{q\_i} \cdot \\ b0 + a0_{q\_i} \cdot b2 \end{pmatrix}$$

$$= \sum_i (a0_{q\_i} + a1_{q\_i} + a2_{q\_i})$$

$$(b0 + b1 + b2)$$

$$= \sum_i a_{q\_i} \cdot b$$

From the relation above, it can be seen that the sum-of-product computation has been correctly done. In the processing described above, hash values or other values can be substituted for the random numbers. The data string decomposition and supply part 410 and the output part 420 can be provided in an apparatus other than the parties or provided in any one or more of the apparatuses serving as the parties.

The effect of the method according to the present invention will be compared with that of the method described in Non-Patent literature 1. According to the present invention, the number of rounds is 2, the number of pieces of data transmitted by each party is 2m, and the number of random numbers generated by each party is 3. Therefore, the method according to the present invention is about nine times as efficient as the method described in Non-Patent literature 1. An improvement is that the number of random numbers generated is constant and therefore does not depend on the value m, rather than increasing with the value m.

Sixth Embodiment

In the multiplication protocol for a and b, the secure sum-of-product computation system 300 with a misuse detection function shown in the third embodiment uses values $\alpha_{P0p}$ and $\alpha_{PP-}$ indicating fragment values of a value $s_P \cdot a_{0p}$ to compare $(\alpha_{P0p} - \alpha_{PP-}) \cdot b_{1p}$ and $s_P \cdot a_{0p} \cdot b_{1p}$ and uses values $\alpha_{P1p}$ and $\alpha_{PP+}$ indicating fragment values of a value $s_P \cdot a_{1p}$ to compare $(\alpha_{P1p} - \alpha_{PP+}) \cdot b_{0p}$ and $s_P \cdot a_{1p} \cdot b_{0p}$ in order to check the validity of $a_{0p} \cdot b_{1p} + a_{1p} \cdot b_{0p}$. However, in the former comparison, the multiplication protocol of the secure sum-of-product computation system 300 involves a procedure of round-trip transmission of computed values between the parties. Specifically, the value $\alpha Z2_{q\_i2} - s_{q\_Z} \cdot a2_{q\_i2}$ needs to be transmitted from the party Y to the party X and then transmitted from the party X back to the party Y, the value $\alpha X0_{q\_i0} - s_{q\_X} \cdot a0_{q\_i0}$ needs to be transmitted from the party Z to the party Y and then transmitted from the party Y back to the party Z, and the value $\alpha Y1_{q\_i1} - s_{q\_Y} \cdot a1_{q\_i1}$ needs to be transmitted from the party X to the party Z and then transmitted from the party Z back to the party X. Therefore, a computed value may leak during the transmission, and a server may perform a misuse (acquisition of information concerning data to be concealed) without causing a change of the computation result. That is, the third embodiment can be said to provide a configuration capable of perfect concealment as far as the server perform no misuse.

Figure 11:
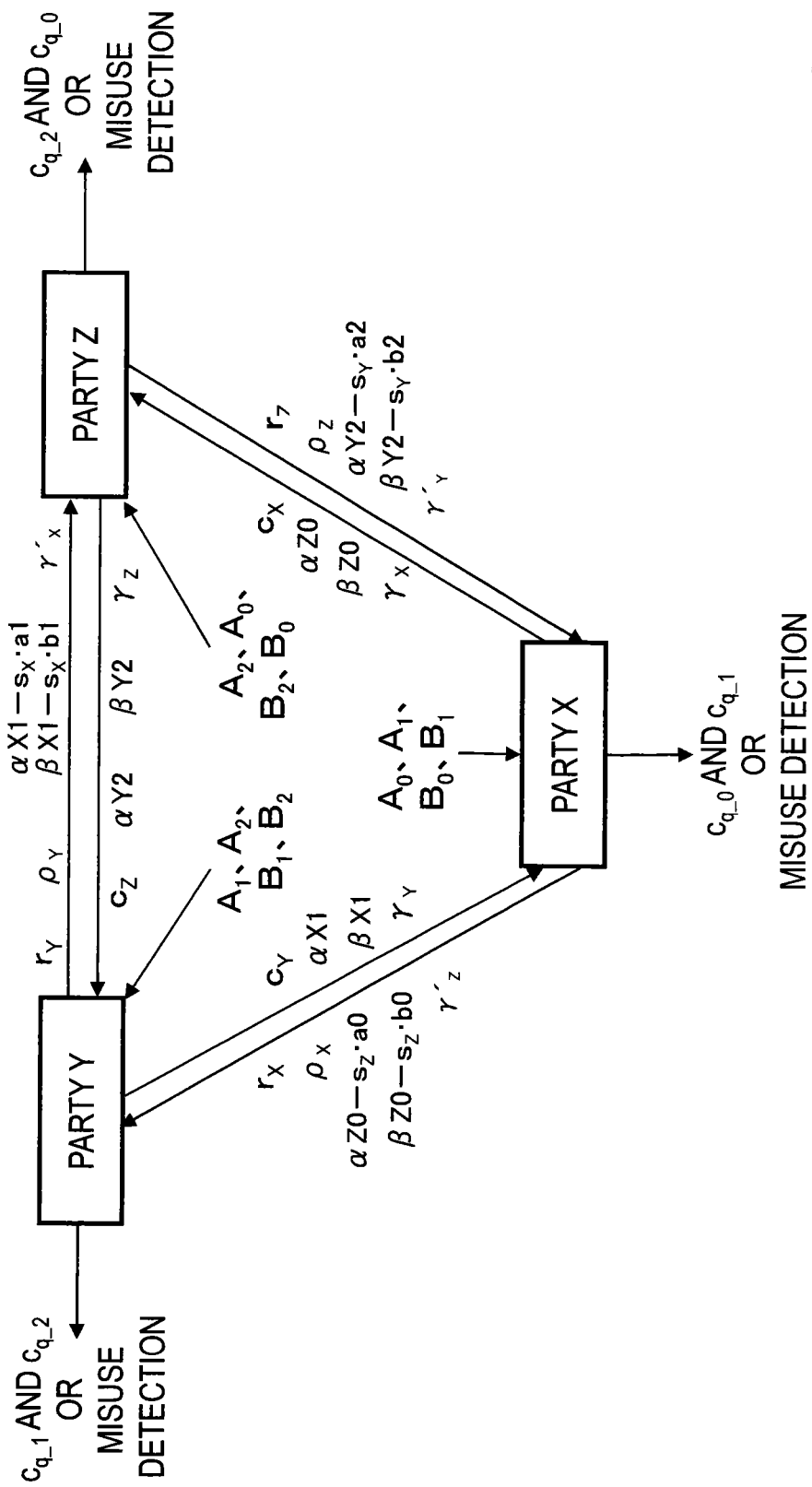
FIG. 11 is a diagram showing an example of a configuration of a secure sum-of-product computation system 600.
Figure 12:
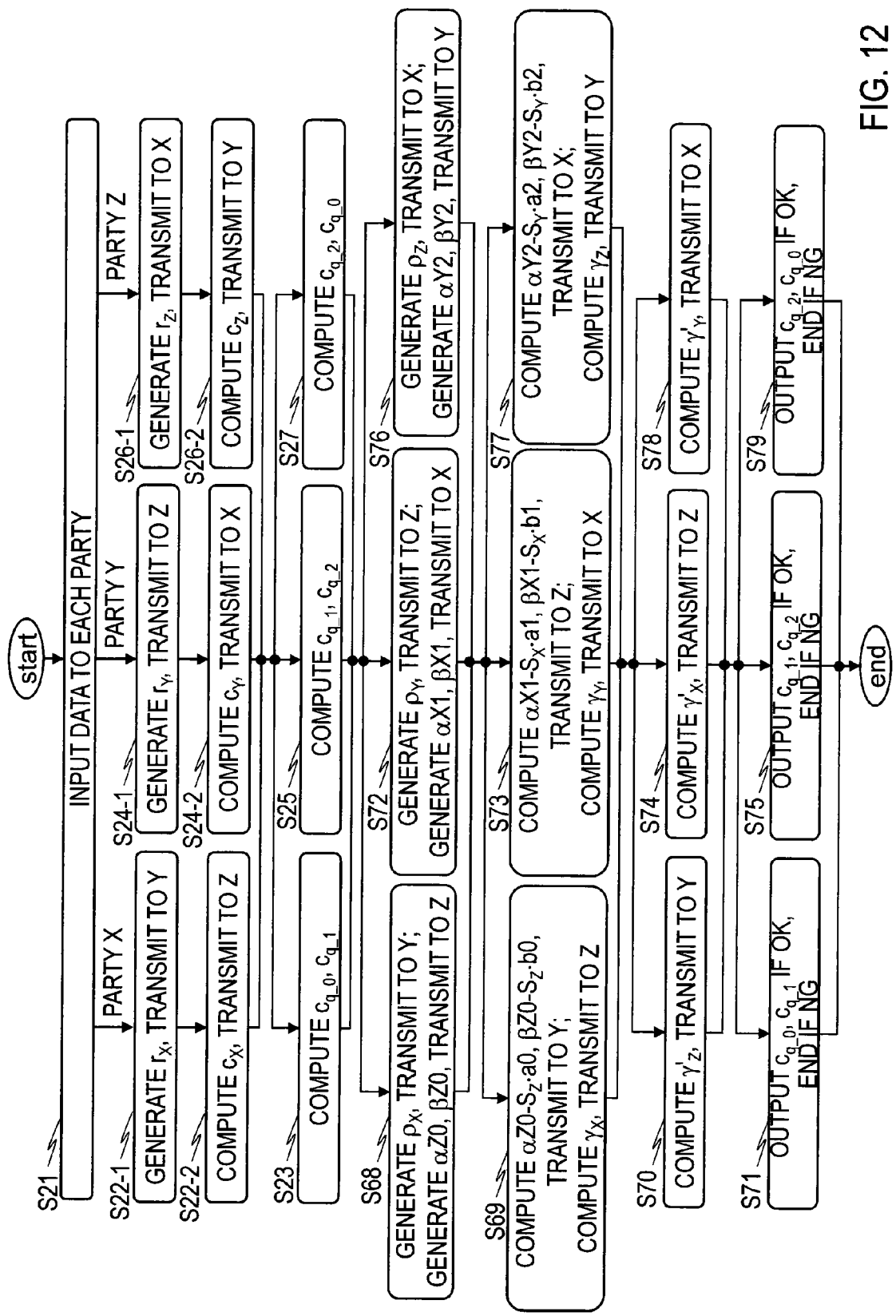
FIG. 12 is a diagram showing an example of a flow of a processing performed by the secure sum-of-product computation system 600.
Figure 13:
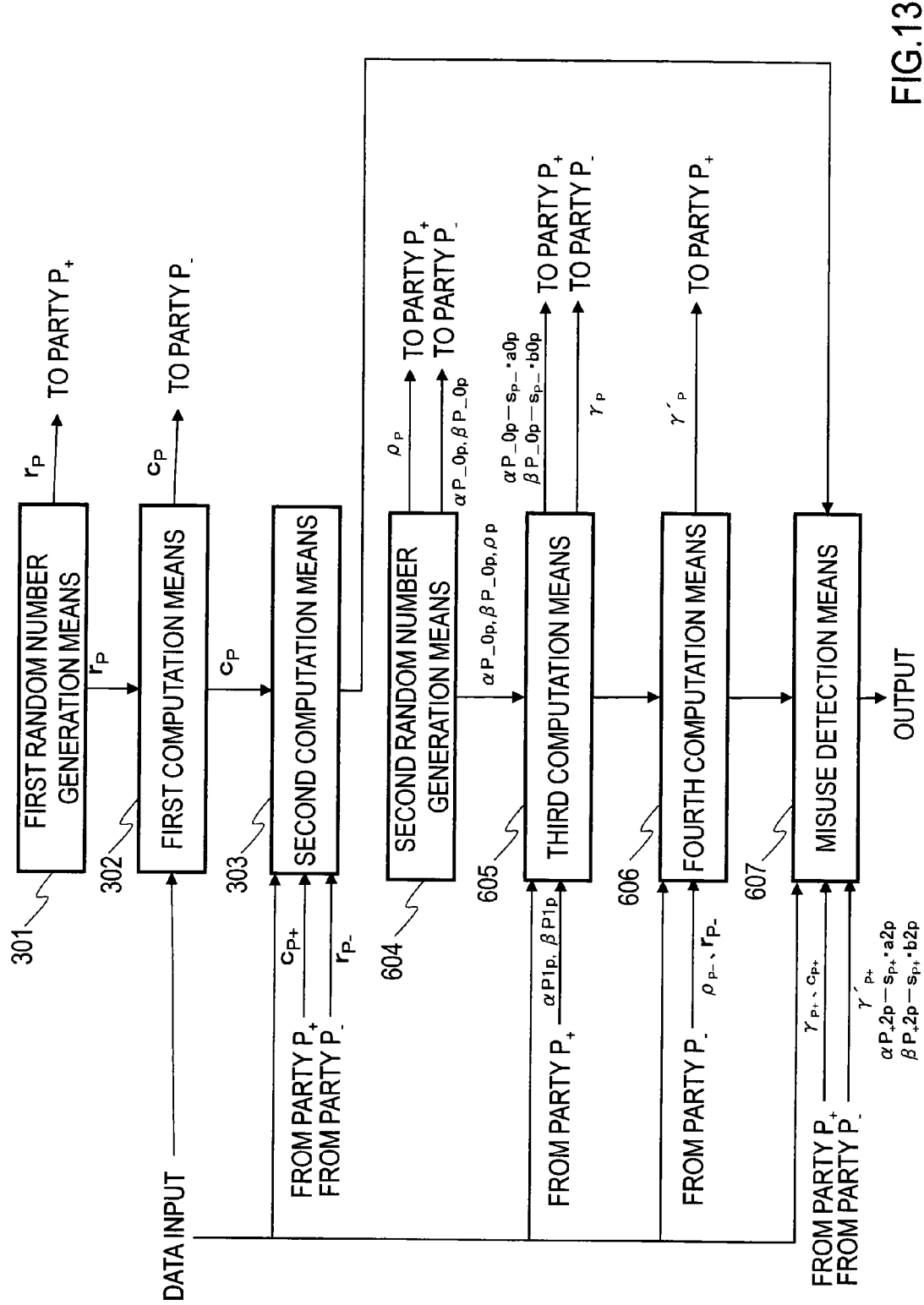
FIG. 13 is a diagram showing an example of an internal configuration of each party of the secure sum-of-product computation systems 600, 700 and 800.

A sixth embodiment provides a configuration capable of perfect concealment even if the server performs a misuse. More specifically, the sixth embodiment provides a configuration whose protocol does not involve a round-trip transmission of a computed value that can lead to a misuse. FIG. 11 shows an example of a configuration of a secure sum-of-product computation system 600, and FIG. 12 shows an example of a flow of a processing performed by the secure sum-of-product computation system 600. The secure sum-of-product computation system 600 comprises a party X, a party Y and a party Z. As shown in FIG. 13, each party has first random number generation means 301, first computation means 302 and second computation means 303, which are the same as those of the secure sum-of-product computation system 300, as well as second random number generation means 604, third computation means 605, fourth computation means 606 and misuse detection means 607.

In the following specific description, the functions of the first random number generation means 301, the first computation means 302 and the second computation means 303 and the secure sum-of-product computation processing (steps S21 to S27) implemented by these functions are the same as those of the secure sum-of-product computation system 300 and therefore will not be further described, and the misuse detection processing, which differs from that of the secure sum-of-product computation system 300, will be particularly described.

Following the steps S21 to S27, each party performs a misuse detection processing as described below. As in the third embodiment, it is assumed that the parties X and Y previously share a random number $s_{q\_Z}$, the parties Y and Z previously share a random number $s_{q\_X}$, and the parties Z and X previously share a random number $s_{q\_Y}$.

A processing performed by the party X will be described. First, the second random number generation means 604 generates a random number $\rho_X$ and transmits the random number to the party Y, and generates random number sequences $(\alpha Z0_{q\_0}, \ldots, \alpha Z0_{q\_na0-1})$ and $(\beta Z0_{q\_0}, \ldots, \beta Z0_{q\_nb0-1})$ and transmits the random number sequences to the party Z (S68). Then, the third computation means 605 computes random number sequences $(\alpha Z0_{q\_0}-s_{q\_Z}\cdot a0_{q\_0}, \ldots, \alpha Z0_{q\_na0-1}-s_{q\_Z}\cdot a0_{q\_na0-1})$ and $(\beta Z0_{q\_0}-s_{q\_Z}\cdot b0_{q\_0}, \ldots, \beta Z0_{q\_nb0-1}-s_{q\_Z}\cdot b0_{q\_nb0-1})$, transmits the random number sequences to the party Y, receives random number sequences $(\alpha X1_{q\_0}, \ldots, \alpha X1_{q\_na1-1})$ and $(\beta X1_{q\_0}, \ldots, \beta X1_{q\_nb1-1})$ from the party Y, computes a value $\gamma_X$ according to $$\gamma_X = \sum_{i1,j0,q}(e10_{q\_i1,q\_j0}\cdot \alpha X1_{q\_i1}\cdot b0_{q\_j0}) + \sum_{i0,j1,q}(e01_{q\_i0,q\_j1}\cdot a0_{q\_i0}\cdot \beta X1_{q\_j1}) + \rho_X \quad \text{[FORMULA 86]}$$

and transmits the value to the party Z (S69). Then, the fourth computation means 606 receives a random number $\rho_Z$ from the party Z, computes a value $\gamma'_Z$ according to $$\gamma'_Z = \sum_q(-s_{q\_Z}\cdot r_{q\_Z}) + \rho_Z \quad \text{[FORMULA 87]}$$

and transmits the value to the party Y (S70). Then, the misuse detection means 607 receives a value $\gamma_Y$ from the party Y, a value $\gamma'_Y$ and random number sequences $(\alpha Y2_{q\_0}-s_{q\_Y}\cdot a2_{q\_0}, \ldots, \alpha Y2_{q\_na2-1}-s_{q\_Y}\cdot a2_{q\_na2-1})$ and $(\beta Y2_{q\_0}-s_{q\_Y}\cdot b2_{q\_0}, \ldots, \beta Y2_{q\_nb2-1}-s_{q\_Y}\cdot b2_{q\_nb2-1})$ from the party Z, computes $$\sum_{i1,i2,j1,j2,q}\left\{ \begin{array}{c} e21_{q\_i2,q\_j1}\cdot(\alpha Y2_{q\_i2}-s_{q\_Y}\cdot a2_{q\_i2})\cdot \\ b1_{q\_j1}+e12_{q\_i1,q\_j2}\cdot\left(\begin{array}{c}\beta Y2_{q\_j2}-s_{q\_Y}\cdot\\ b2_{q\_j2}\end{array}\right)\cdot \\ a1_{q\_i1}+s_{q\_Y}\cdot c_{q\_Y} \end{array}\right\} - \quad \text{[FORMULA 88]}$$

$$\gamma_Y + \gamma'_Y,$$

ends the processing by outputting data indicating a misuse detection if the computation result is not 0, and outputs values $c_{q\_0}$ and $c_{q\_1}$ if the computation result is 0 (S71).

Next, a processing performed by the party Y will be described. First, the second random number generation means 604 generates a random number $\rho_Y$ and transmits the random number to the party Z, and generates random number sequences $(\alpha X1_{q\_0}, \ldots, \alpha X1_{q\_na1-1})$ and $(\beta X1_{q\_0}, \ldots, \beta X1_{q\_nb1-1})$ and transmits the random number sequences to the party X (S72). Then, the third computation means 605 computes random number sequences $(\alpha X1_{q\_0}-s_{q\_X}\cdot a1_{q\_0}, \ldots, \alpha X1_{q\_na1-1}-s_{q\_X}\cdot a1_{q\_na1-1})$ and $(\beta X1_{q\_0}-s_{q\_X}\cdot b1_{q\_0}, \ldots, \beta X1_{q\_nb1-1}-s_{q\_X}\cdot b1_{q\_nb1-1})$, transmits the random number sequences to the party Z, receives random number sequences $(\alpha Y2_{q\_0}, \ldots, \alpha Y2_{q\_na2-1})$ and $(\beta Y2_{q\_0}, \ldots, \beta Y2_{q\_nb2-1})$ from the party Z, computes a value $\gamma_Y$ according to $$\gamma_Y = \sum_{i2,j1,q}(e21_{q\_i2,q\_j1}\cdot \alpha Y2_{q\_i2}\cdot b1_{q\_j1}) + \sum_{i1,j2,q}(e12_{q\_i1,q\_j2}\cdot a1_{q\_i1}\cdot \beta Y2_{q\_j2}) + \rho_Y \quad \text{[FORMULA 89]}$$

and transmits the value to the party X (S73). Then, the fourth computation means 606 receives the random number $\rho_X$ from the party X, computes a value $\gamma'_X$ according to $$\gamma'_X = \sum_q(-s_{q\_X}\cdot r_{q\_X}) + \rho_X \quad \text{[FORMULA 90]}$$

and transmits the value to the party Z (S74). Then, the misuse detection means 607 receives a value $\gamma'_Z$ and random number sequences $(\alpha Z0_{q\_0}-s_{q\_Z}\cdot a0_{q\_0}, \ldots, \alpha Z0_{q\_na0-1}-s_{q\_Z}\cdot a0_{q\_na0-1})$ and $(\beta Z0-s_{q\_Z}\cdot b0_{q\_0}, \ldots, \beta Z0_{q\_nb0-1}-s_{q\_Z}\cdot b0_{q\_nb0-1})$ from the party X and a value $\gamma_Z$ from the party Z, computes $$\sum_{i0,i2,j0,j2,q}\left\{ \begin{array}{c} e02_{q\_i0,q\_j2}\cdot(\alpha Z0_{q\_i0}-s_{q\_Z}\cdot a0_{q\_i0})\cdot \\ b2_{q\_j2}+e20_{q\_i2,q\_j0}\cdot \\ (\beta Z0_{q\_j0}-s_{q\_Z}\cdot b0_{q\_j0})\cdot \\ a2_{q\_i2}+s_{q\_Z}\cdot c_{q\_Z} \end{array}\right\} - \quad \text{[FORMULA 91]}$$

$$\gamma_Z + \gamma'_Z,$$

ends the processing by outputting data indicating a misuse detection if the computation result is not 0, and outputs values $c_{q\_1}$ and $c_{q\_2}$ if the computation result is 0 (S75).

Next, a processing performed by the party Z will be described. First, the second random number generation means 604 generates a random number $\rho_Z$ and transmits the random number to the party X, and generates random number sequences $(\alpha Y2_{q\_0}, \ldots, \alpha Y2_{q\_na2-1})$ and $(\beta Y2_{q\_0}, \ldots, \beta Y2_{q\_nb2-1})$ and transmits the random number sequences to the party Y (S76). Then, the third computation means 605 computes random number sequences $(\alpha Y2_{q\_0}-s_{q\_Y}\cdot a2_{q\_0}, \ldots, \alpha Y2_{q\_na2-1}-s_{q\_Y}\cdot a2_{q\_na2-1})$ and $(\beta Y2_{q\_0}-s_{q\_Y}\cdot b2_{q\_0}, \ldots, \beta Y2_{q\_nb2-1}-s_{q\_Y}\cdot b2_{q\_nb2-1})$, transmits the random number sequences to the party X, receives random number sequences $(\alpha Z0_{q\_0}, \ldots, \alpha Z0_{q\_na0-1})$ and $(\beta Z0_{q\_0}, \ldots, \beta Z0_{q\_nb0-1})$ from the party X, computes a value $\gamma_Z$ according to $$\gamma_Z = \sum_{i0,j2,q}(e02_{q\_i0,q\_j2}\cdot \alpha Z0_{q\_i0}\cdot b2_{q\_j0}) + \sum_{i2,j0,q}(e20_{q\_i2,q\_j0}\cdot a2_{q\_i2}\cdot \beta Z0_{q\_j0}) + \rho_Z \quad \text{[FORMULA 92]}$$

and transmits the value to the party Y (S77). Then, the fourth computation means 606 receives a random number $\rho_Y$ from the party Y, computes a value $\gamma'_Y$ according to $$\gamma'_Y = \sum_q (-s_{q\_Y} \cdot r_{q\_Y}) + \rho_Y \qquad \text{[FORMULA 93]}$$

and transmits the value to the party X (S78). Then, the misuse detection means 607 receives the value $\gamma_X$ from the party X and the value $\gamma'_X$ and random number sequences $(\alpha X1_{q\_0} - s_{q\_X} \cdot a1_{q\_0}, \ldots, \alpha X1_{q\_na1-1} - s_{q\_X} \cdot a1_{q\_na1-1})$ and $(\beta X1_{q\_0} - s_{q\_X} \cdot b1_{q\_0}, \ldots, \beta X1_{q\_nb1} - s_{q\_X} \cdot b1_{q\_nb1-1})$ from the party Y, computes $$\sum_{i0,i1,j0,j1,q} \left\{ \begin{array}{c} e10_{q\_i1,q\_j0} \cdot (\alpha X1_{q\_i1} - s_{q\_X} \cdot a1_{q\_i1}) \cdot \\ b0_{q\_j0} + e01_{q\_i0,q\_j1} \cdot \\ (\beta X1_{q\_j1} - s_{q\_X} \cdot b1_{q\_j1}) \cdot \\ a0_{q\_i0} + s_{q\_X} \cdot c_{q\_X} \end{array} \right\} - \qquad \text{[FORMULA 94]}$$

$$\gamma_X + \gamma'_X,$$

ends the processing by outputting data indicating a misuse detection if the computation result is not 0, and outputs values $c_{q\_2}$ and $c_{q\_0}$ if the computation result is 0 (S79). In the processing described above, hash values or other values can be substituted for the random numbers.

In the multiplication protocol for a and b, the secure sum-of-product computation system 600 described above uses values $\beta_{P1p}$ and $\beta_{PP+}$ indicating fragment values of a value $s_F \cdot b_{1p}$ to compare $(\beta_{P1p} + a_{0p} \cdot \beta_{PP+})$ and $s_F \cdot a_{1p} \cdot b_{0p}$ and uses values $\alpha_{P1p}$ and $\alpha_{PP+}$ indicating fragment values of a value $s_F \cdot a_{1p}$ to compare $(\alpha_{P1p} - a_{PP+}) \cdot b_{0p}$ and $s_F \cdot a_{1p} \cdot b_{0p}$ in order to check the validity of $a_{0p} \cdot b_{1p} + a_{1p} \cdot b_{0p}$. With such a configuration, the protocol involves no round-trip transmission of computed values among the parties. Therefore, leakage of a computed value can be prevented, and therefore, the server cannot perform a misuse. In addition, the number of processing steps is the same as that of the secure sum-of-product computation system 300, the secure sum-of-product computation system 600 can maintain approximately the same level of efficiency.

Seventh Embodiment

Figure 14:
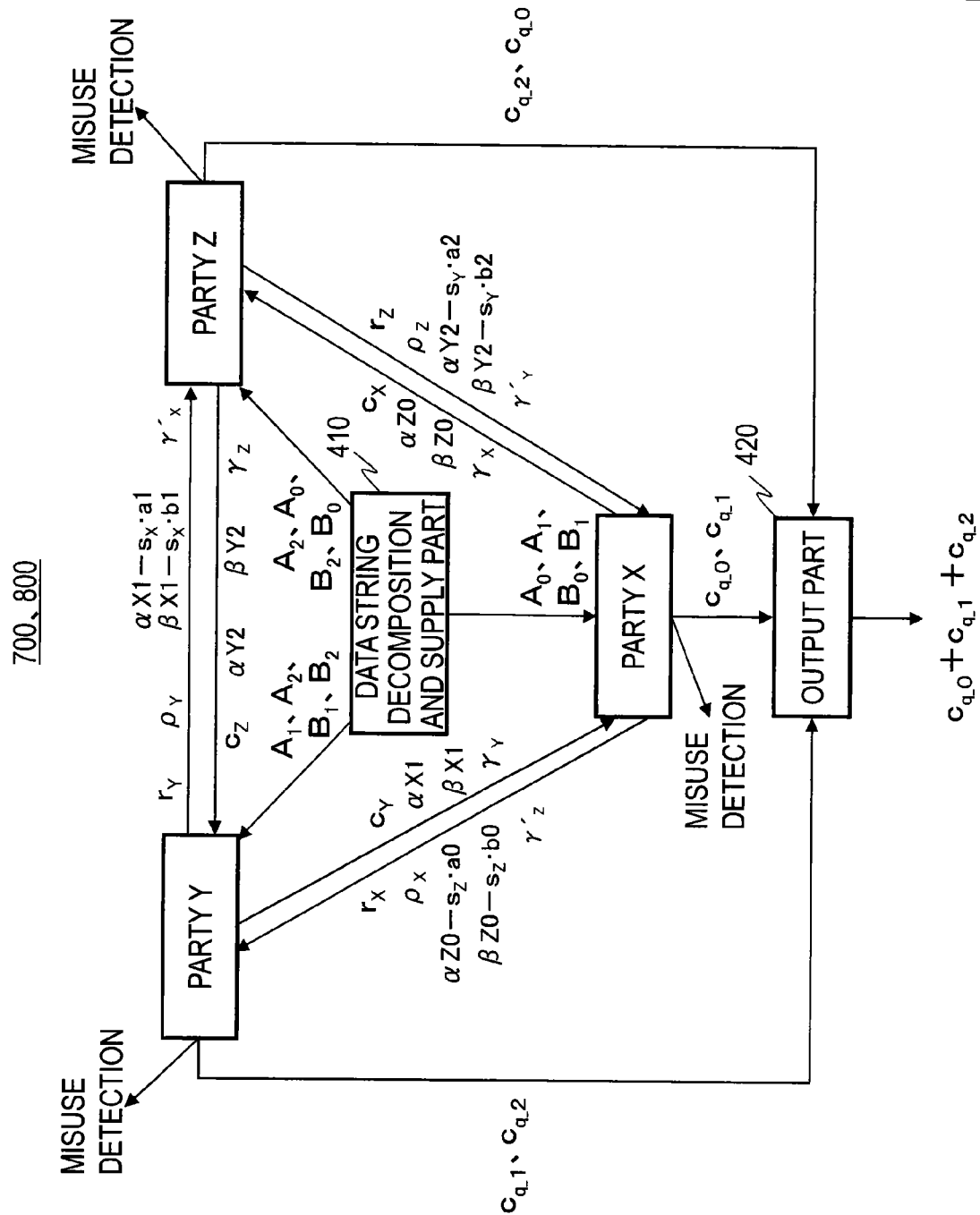
FIG. 14 is a diagram showing an example of a configuration of secure sum-of-product computation systems 700 and 800.
Figure 15:
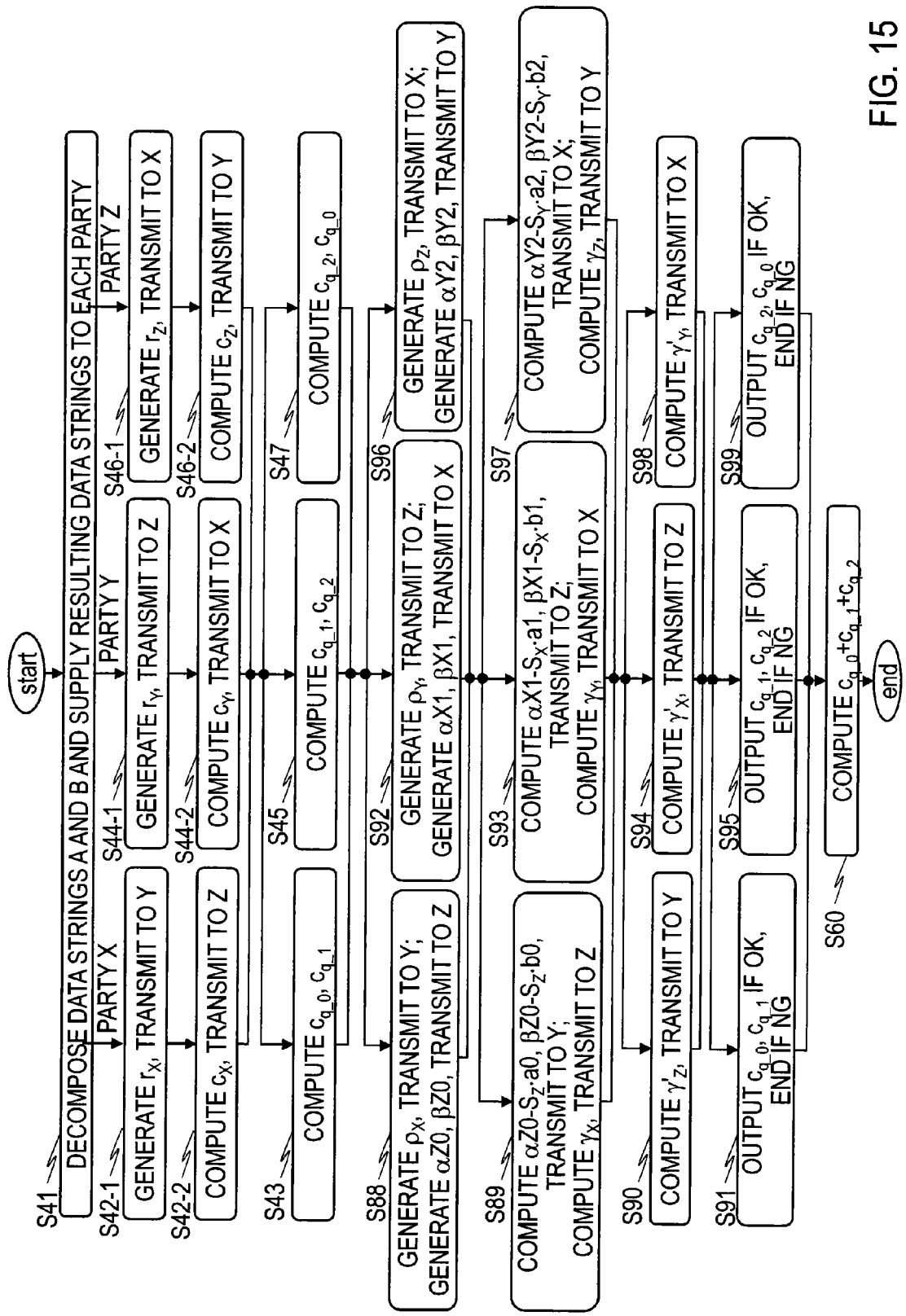
FIG. 15 is a diagram showing an example of a flow of a processing performed by the secure sum-of-product computation systems 700 and 800.

A seventh embodiment is a specific example of the sixth embodiment, in which na0=na1=na2=nb0=nb1=nb2=n, and e00=e01=e10=e11=e12=e21=e22=e20=e02=1. FIG. 14 shows an example of a configuration of a secure sum-of-product computation system 700 according to this embodiment, and FIG. 15 shows an example of a flow of a processing performed by the secure sum-of-product computation system 700. The secure sum-of-product computation system 700 comprises a party X, a party Y, a party Z, a data string decomposition and supply part 410 and an output part 420. The data string decomposition and supply part 410 and the output part 420 are the same as those of the secure sum-of-product computation system 400 according to the fourth embodiment. As shown in FIG. 13, each party has first random number generation means 301, first computation means 302 and second computation means 303, which are the same as those of the secure sum-of-product computation system 400, as well as second random number generation means 604, third computation means 605, fourth computation means 606 and misuse detection means 607.

As with the secure sum-of-product computation system 400 according to the fourth embodiment, the secure sum-of-product computation system 700 performs each set of sum-of-product computations $$\sum_{i=0}^{n-1} a_{q\_i} \cdot b_{q\_i} \qquad \text{[FORMULA 95]}$$

for m sets of data strings $A_q = (a_{q\_0}, \ldots, a_{q\_n-1})$ and $B_q = (b_{q\_0}, \ldots, b_{q\_n-1})$ comprising elements $a_{q\_j}$ and $b_{q\_j}$, which are natural numbers smaller than a prime number p, through cooperative computation by the three computation apparatuses, the parties X, Y and Z (the sum-of-product computation is a multiplication of $a_q$ and $b_q$ in the case where n=1).

In the following specific description, the functions of the data string decomposition and supply part 410, the first random number generation means 301, the first computation means 302, the second computation means 303 and the output part 420 and the secure sum-of-product computation processing (steps S41 to S47 and S60) implemented by these functions are the same as those of the secure sum-of-product computation system 400 according to the fourth embodiment and therefore will not be further described, and the misuse detection processing, which differs from that of the secure sum-of-product computation system 400, will be particularly described.

Following the steps S41 to S47, each party performs a misuse detection processing as described below. As in the sixth embodiment, it is assumed that the parties X and Y previously share a random number $s_{q\_Z}$, the parties Y and Z previously share a random number $s_{q\_X}$, and the parties Z and X previously share a random number $s_{q\_Y}$.

A processing performed by the party X will be described. First, the second random number generation means 604 generates a random number $\rho_X$, and transmits the random number to the party Y, and generates random number sequences $(\alpha Z0_{q\_0}, \ldots, \alpha Z0_{q\_n-1})$ and $(\beta Z0_{q\_0}, \ldots, \beta Z0_{q\_n-1})$ and transmits the random number sequences to the party Z (S88). Then, the third computation means 605 computes random number sequences $(\alpha Z0_{q\_0} - s_{q\_Z} \cdot a0_{q\_0}, \ldots, \alpha Z0_{q\_n-1} - s_{q\_Z} \cdot a0_{q\_n-1})$ and $(\beta Z0_{q\_0} - s_{q\_Z} \cdot b0_{q\_0}, \ldots, \beta Z0_{q\_n-1} - s_{q\_Z} \cdot b0_{q\_n-1})$, transmits the random number sequences to the party Y, receives random number sequences $(\alpha X1_{q\_0}, \ldots, \alpha X1_{q\_n-1})$ and $(\beta X1_{q\_0}, \ldots, \beta X1_{q\_n-1})$ from the party Y, computes a value $\gamma_X$ according to $$\gamma_X = \sum_{i,q} (\alpha X1_{q\_i} \cdot b0_{q\_i} + a0_{q\_i} \cdot \beta X1_{q\_i}) + \rho_X \qquad \text{[FORMULA 96]}$$

and transmits the value to the party Z (S89). Then, the fourth computation means 606 receives a random number $\rho_Z$ from the party Z, computes a value $\gamma'_Z$ according to $$\gamma'_Z = \sum_q (-s_{q\_Z} \cdot r_{q\_Z}) + \rho_Z \qquad \text{[FORMULA 97]}$$

and transmits the value to the party Y (S90). Then, the misuse detection means 607 receives a value $\gamma_Y$ from the party Y, a value $\gamma'_Y$ and random number sequences $(\alpha Y2_{q\_0} - s_{q\_Y} \cdot a2_{q\_0}, \ldots, \alpha Y2_{q\_n-1} - s_{q\_Y} \cdot a2_{q\_n-1})$ and $(\beta Y2_{q\_0} - s_{q\_Y} \cdot b2_{q\_0}, \ldots, \beta Y2_{q\_n-1} - s_{q\_Y} \cdot b2_{q\_n-1})$ from the party Z, computes $$\sum_{i,q} \left\{ \begin{array}{l} (\alpha Y2_{q\_i} - s_{q\_Y} \cdot a2_{q\_i}) \cdot b1_{q\_i} + \\ (\beta Y2_{q\_i} - s_{q\_Y} \cdot b2_{q\_i}) \cdot a1_{q\_i} + \\ s_{q\_Y} \cdot c_{q\_Y} \end{array} \right\} - \gamma_Y + \gamma'_Y, \quad \text{[FORMULA 98]}$$

ends the processing by outputting data indicating a misuse detection if the computation result is not 0, and outputs values $c_{q\_0}$ and $c_{q\_1}$ if the computation result is 0 (S91).

Next, a processing performed by the party Y will be described. First, the second random number generation means 604 generates a random number $\rho_Y$ and transmits the random number to the party Z, and generates random number sequences $(\alpha X1_{q\_0}, \ldots, \alpha X1_{q\_n-1})$ and $(\beta X1_{q\_0}, \ldots, \beta X1_{q\_n-1})$ and transmits the random number sequences to the party X (S92). Then, the third computation means 605 computes random number sequences $(\alpha X1_{q\_0}-s_{q\_X}\cdot a1_{q\_0}, \ldots, \alpha X1_{q\_n-1}-s_{q\_X}\cdot a1_{q\_n-1})$ and $(\beta X1_{q\_0}-s_{q\_X}\cdot b1_{q\_0}, \ldots, \beta X1_{q\_n-1}-s_{q\_X}\cdot b1_{q\_n-1})$, transmits the random number sequences to the party Z, receives random number sequences $(\alpha Y2_{q\_0}, \ldots, \alpha Y2_{q\_n-1})$ and $(\beta Y2_{q\_0}, \ldots, \beta Y2_{q\_n-1})$ from the party Z, computes a value $\gamma_Y$ according to $$\gamma_Y = \sum_{i,q} (\alpha Y2_{q\_i} \cdot b1_{q\_i} + a1_{q\_i} \cdot \beta Y2_{q\_i}) + \rho_Y \quad \text{[FORMULA 99]}$$

and transmits the value to the party X (S93). Then, the fourth computation means 606 receives the random number $\rho_X$ from the party X, computes a value $\gamma'_X$ according to $$\gamma'_X = \sum_q (-s_{q\_X} \cdot r_{q\_X}) + \rho_X \quad \text{[FORMULA 100]}$$

and transmits the value to the party Z (S94). Then, the misuse detection means 607 receives a value $\gamma'_Z$ and random number sequences $(\alpha Z0_{q\_0}-s_{q\_Z}\cdot a0_{q\_0}, \ldots, \alpha Z0_{q\_n-1}-s_{q\_Z}\cdot a0_{q\_n-1})$ and $(\beta Z0_{q\_0}-s_{q\_Z}\cdot b0_{q\_0}, \ldots, \beta Z0_{q\_n-1}-s_{q\_Z}\cdot b0_{q\_n-1})$ from the party X and a value $\gamma_Z$ from the party Z, computes $$\sum_{i,q} \left\{ \begin{array}{l} (\alpha Z0_{q\_i} - s_{q\_Z} \cdot a0_{q\_i}) \cdot b2_{q\_i} + \\ (\beta Z0_{q\_i} - s_{q\_Z} \cdot b0_{q\_i}) \cdot a2_{q\_i} + \\ s_{q\_Z} \cdot c_{q\_Z} \end{array} \right\} - \gamma_Z + \gamma'_Z, \quad \text{[FORMULA 101]}$$

ends the processing by outputting data indicating a misuse detection if the computation result is not 0, and outputs values $c_{q\_1}$ and $c_{q\_2}$ if the computation result is 0 (S95).

Next, a processing performed by the party Z will be described.

First, the second random number generation means 604 generates a random number $\rho_Z$ and transmits the random number to the party X, and generates random number sequences $(\alpha Y2_{q\_0}, \ldots, \alpha Y2_{q\_n-1})$ and $(\beta Y2_{q\_0}, \ldots, \beta Y2_{q\_n-1})$ and transmits the random number sequences to the party Y (S96). Then, the third computation means 605 computes random number sequences $(\alpha Y2_{q\_0}-s_{q\_Y}\cdot a2_{q\_0}, \ldots, \alpha Y2_{q\_n-1}-s_{q\_Y}\cdot a2_{q\_n-1})$ and $(\beta Y2_{q\_0}-s_{q\_Y}\cdot b2_{q\_0}, \ldots, \beta Y2_{q\_n-1}-s_{q\_Y}\cdot b2_{q\_n-1})$, transmits the random number sequences to the party X, receives random number sequences $(\alpha Z0_{q\_0}, \ldots, \alpha Z0_{q\_n-1})$ and $(\beta Z0_{q\_0}, \ldots, \beta Z0_{q\_n-1})$ from the party X, computes a value $\gamma_Z$ according to $$\gamma_Z = \sum_{i,q} (\alpha Z0_{q\_i} \cdot b2_{q\_i} + a2_{q\_i} \cdot \beta Z0_{q\_i}) + \rho_Z \quad \text{[FORMULA 102]}$$

and transmits the value to the party Y (S97). Then, the fourth computation means 606 receives a random number $\rho_Y$ from the party Y, computes a value $\gamma'_Y$ according to $$\gamma'_Y = \sum_q (-s_{q\_Y} \cdot r_{q\_Y}) + \rho_Y \quad \text{[FORMULA 103]}$$

and transmits the value to the party X (S98). Then, the misuse detection means 607 receives the value $\gamma_X$ from the party X and the value $\gamma'_X$ and random number sequences $(\alpha X1_{q\_0}-s_{q\_X}\cdot a1_{q\_0}, \ldots, \alpha X1_{q\_n-1}-s_{q\_X}\cdot a1_{q\_n-1})$ and $(\beta X1_{q\_0}-s_{q\_X}\cdot b1_{q\_0}, \ldots, \beta X1_{q\_n-1}-s_{q\_X}\cdot b1_{q\_n-1})$ from the party Y, computes $$\sum_{i,q} \left\{ \begin{array}{l} (\alpha X1_{q\_i} - s_{q\_X} \cdot a1_{q\_i}) \cdot b0_{q\_i} + \\ (\beta X1_{q\_i} - s_{q\_X} \cdot b1_{q\_i}) \cdot a0_{q\_i} + \\ s_{q\_X} \cdot c_{q\_X} \end{array} \right\} - \gamma_X + \gamma'_X, \quad \text{[FORMULA 104]}$$

ends the processing by outputting data indicating a misuse detection if the computation result is not 0, and outputs values $c_{q\_2}$ and $c_{q\_0}$ if the computation result is 0 (S99). In the processing described above, hash values or other values can be substituted for the random numbers.

Eighth Embodiment

While the secure sum-of-product computation system 700 according to the seventh embodiment is configured to perform a sum-of-product computation expressed as $$\sum_{i=0}^{n-1} a_{q\_i} \cdot b_{q\_i} \quad \text{[FORMULA 105]}$$

as with the secure sum-of-product computation system 400 according to the fourth embodiment and apply the method according to the embodiment 6 to the misuse detection processing for the sum-of-product computation, a secure sum-of-product computation system 800 according to an eighth embodiment has a configuration in which one of the values involved in the multiplication in the sum-of-product computation is fixed. More specifically, the secure sum-of-product computation system 800 is configured to perform the following m sum-of-product computations of a data string $A_q = (a_{q\_0}, \ldots, a_{q\_n-1})$ comprising elements $a_{q\_i}$, which are natural numbers smaller than a prime number p, and a value b, which is a natural number smaller than the prime number p, through cooperative computation by three computation apparatuses, the parties X, Y and Z, as with the secure sum-of-product computation system 500 according to the fifth embodiment and apply the misuse detection method according to the sixth embodiment to the misuse detection processing for the sum-of-product computation.

$$\sum_{i=0}^{n-1} a_{q\_i} \cdot b \qquad \text{[FORMULA 106]}$$

In the following specific description, the functions of the data string decomposition and supply part 410, the first random number generation means 301, the first computation means 302, the second computation means 303 and the output part 420 and the secure sum-of-product computation processing (steps S41 to S47 and S60) implemented by these functions are the same as those of the secure sum-of-product computation system 500 according to the fifth embodiment and therefore will not be further described, and the misuse detection processing, which differs from that of the secure sum-of-product computation system 500, will be particularly described. The functional configuration and the process flow are the same as those in the seventh embodiment and therefore will be described below with reference to them (that is, FIG. 14 (and FIG. 13) showing the configuration and FIG. 15 showing the process flow).

Following the steps S41 to S47, each party performs a misuse detection processing as described below. As in the seventh embodiment, it is assumed that the parties X and Y previously share a random number $s_{q\_Z}$, the parties Y and Z previously share a random number $s_{q\_X}$, and the parties Z and X previously share a random number $s_{q\_Y}$.

A processing performed by the party X will be described. First, the second random number generation means 604 generates a random number $\rho_X$ and transmits the random number to the party Y, and generates random numbers $\alpha Z0$ and $\beta Z0_q$ and transmits the random numbers to the party Z (S88). Then, the third computation means 605 computes random numbers $$\alpha Z0 - \sum_{i,q}(s_{q\_Z} \cdot a0_{q\_i}), \qquad \text{[FORMULA 107]}$$

$$\beta Z0_q - s_{q\_Z} \cdot b0$$

transmits the random numbers to the party Y, receives random numbers $\alpha X1$ and $\beta X1_q$ from the party Y, computes a value $\gamma_X$ according to $$\gamma_X = \alpha X1 \cdot b0 + \sum_{i,q}(a0_{q\_i} \cdot \beta X1_q) + \rho_X \qquad \text{[FORMULA 108]}$$

and transmits the value to the party Z (S89). Then, the fourth computation means 606 receives a random number $\rho_Z$ from the party Z, computes a value $\gamma'_Z$ according to $$\gamma'_Z = -\sum_q (s_{q\_Z} \cdot r_{q\_Z}) + \rho_Z \qquad \text{[FORMULA 109]}$$

and transmits the value to the party Y (S90). Then, the misuse detection means 607 receives a value $\gamma_Y$ from the party Y, a value $\gamma'_Y$ and values $$\alpha Y2 - \sum_{i,q}(s_{q\_Y} \cdot a2_{q\_i}) \qquad \text{[FORMULA 110]}$$

and $$\beta Y2_q - s_{q\_Y} \cdot b2 \qquad \text{[FORMULA 111]}$$

from the party Z, computes $$\left(\alpha Y2 - \sum_{i,q}(s_{q\_Y} \cdot a2_{q\_i})\right) \cdot b1 + \qquad \text{[FORMULA 112]}$$

$$\sum_q \left\{ \frac{\sum_i (a1_{q\_i}(\beta Y2_q - s_{q\_Y} \cdot b2)) +}{s_{q\_Y} \cdot c_{q\_Y}} \right\} - \gamma_Y + \gamma'_Y,$$

ends the processing by outputting data indicating a misuse detection if the computation result is not 0, and outputs values $c_{q\_0}$ and $c_{q\_1}$ if the computation result is 0 (S91).

Next, a processing performed by the party Y will be described. First, the second random number generation means 604 generates a random number $\rho_Y$ and transmits the random number to the party Z, and generates random numbers $\alpha X1$ and $\beta X1_q$ and transmits the random numbers to the party X (S92). Then, the third computation means 605 computes random numbers $$\alpha X1 - \sum_{i,q}(s_{q\_X} \cdot a1_{q\_i}), \qquad \text{[FORMULA 113]}$$

$$\beta X1_q - s_{q\_X} \cdot b1$$

transmits the random numbers to the party Z, receives random numbers $\alpha Y2$ and $\beta Y2_q$ from the party Z, computes a value $\gamma_Y$ according to $$\gamma_Y = \alpha Y2 \cdot b1 + \sum_{i,q}(a1_{q\_i} \cdot \beta Y2_q) + \rho_Y \qquad \text{[FORMULA 114]}$$

and transmits the value to the party X (S93). Then, the fourth computation means 606 receives the random number $\rho_X$ from the party X, computes a value $\gamma'_X$ according to $$\gamma'_X = -\sum_q (s_{q\_X} \cdot r_{q\_X}) + \rho_X \qquad \text{[FORMULA 115]}$$

and transmits the value to the party Z (S94). Then, the misuse detection means 607 receives a random number $\gamma_Z$ from the party Z and random numbers $\gamma'_Z$, $$\alpha Z0 - \sum_{i,q}(s_{q\_Z} \cdot a0_{q\_i}) \qquad \text{[FORMULA 116]}$$

and $$\beta Z0_q - s_{q\_Z} \cdot b0 \qquad \text{[FORMULA 117]}$$

from the party X, computes $$\left(\alpha Z0 - \sum_{i,q}(s_{q\_Z} \cdot a0_{q\_i})\right) \cdot b2 + \sum_{q}\left\{\frac{\sum_i(a2_{q\_i}(\beta Z0_q - s_{q\_Z} \cdot b0))+}{s_{q\_Z} \cdot c_{q\_Z}}\right\} - \gamma_Z + \gamma'_Z,$$ [FORMULA 118]

ends the processing by outputting data indicating a misuse detection if the computation result is not 0, and outputs values $c_{q\_1}$ and $c_{q\_2}$ if the computation result is 0 (S95).

Next, a processing performed by the party Z will be described. First, the second random number generation means 604 generates a random number $\rho_Z$ and transmits the random number to the party X, and generates random numbers $\alpha Y2$ and $\beta Y2_q$ and transmits the random numbers to the party Y (S96). Then, the third computation means 605 computes random numbers $$\alpha Y2 - \sum_{i,q}(s_{q\_Y} \cdot a2_{q\_i}),$$ [FORMULA 119]

$$\beta Y2_q - s_{q\_Y} \cdot b2$$

transmits the random numbers to the party X, receives random numbers $\alpha Z0$ and $\beta Z0_q$ from the party X, computes a value $\gamma_Z$ according to $$\gamma_Z = \alpha Z0 \cdot b2 + \sum_{i,q}(a2_{q\_i} \cdot \beta Z0_q) + \rho_Z$$ [FORMULA 136]

and transmits the value to the party Y (S97). Then, the fourth computation means 606 receives a random number $\rho_Y$ from the party Y, computes a value $\gamma'_Y$ according to $$\gamma'_Y = -\sum_q(s_{q\_Y} \cdot r_{q\_Y}) + \rho_Y$$ [FORMULA 121]

and transmits the value to the party X (S98). Then, the misuse detection means 607 receives the value $\gamma_X$ from the party X and random numbers $\gamma'_X$, $$\alpha X1 - \sum_{i,q}(s_{q\_X} \cdot a1_{q\_i})$$ [FORMULA 122]

and $$\beta X1_q - s_{q\_X} \cdot b1$$ [FORMULA 123]

from the party Y, computes $$\left(\alpha X1 - \sum_{i,q}(s_{q\_X} \cdot a1_{q\_i})\right) \cdot b0 + \sum_q\left\{\sum_i(a0_{q\_i}(\beta X1_q - s_{q\_X} \cdot b1)) + s_{q\_X} \cdot c_{q\_X}\right\} - \gamma_X + \gamma'_X,$$ [FORMULA 124]

ends the processing by outputting data indicating a misuse detection if the computation result is not 0, and outputs values $c_{q\_2}$ and $c_{q\_0}$ if the computation result is 0 (S99). In the processing described above, hash values or other values can be substituted for the random numbers.

Ninth Embodiment

According to the sixth and seventh embodiments, two data strings $A=(a_{q\_0}, \ldots, a_{q\_n-1})$ and $B=(b_{q\_0}, \ldots, b_{q\_n-1})$ are divided into three fragment data strings $A_0, A_1$ and $A_2$ and $B_0$, $B_1$ and $B_2$, respectively, in such a manner that the fragments satisfy conditions that $A=A_0+A_1+A_2$ mod p and $B=B_0+B_1+B_2$ mod p, the data strings $A_0=(a0_{q\_0}, \ldots, a0_{q\_na0-1})$, $A_1=(a1_{q\_0}, \ldots, a1_{q\_na1-1})$, $B_0=(b0_{q\_0}, \ldots, b0_{q\_nb0-1})$ and $B_1=(b1_{q\_0}, \ldots, b1_{q\_nb1-1})$ are supplied to the party X as values to be concealed, the data strings $A_1, A_2=(a2_{q\_0}, \ldots, a2_{q\_na2-1})$, $B_1$ and $B_2=(b2_{q\_0}, \ldots, b2_{q\_nb2-1})$ are supplied to the party Y as values to be concealed, the data strings $A_2, A_0$, $B_2$ and $B_0$ are supplied to the party Z as valued to be concealed, and thus, the secure sum-of-product of these values expressed by the following formula can be securely computed by determining the value $c_{q\_0}+c_{q\_1}+c_{q\_2}$ from the values $c_{q\_0}$ and $c_{q\_1}$, which are the results of the computation performed by the party X, the values $c_{q\_1}$ and $c_{q\_2}$, which are the results of the computation performed by the party Y, and the values $c_{q\_2}$ and $c_{q\_0}$, which are the results of the computation performed by the party Z.

$$\sum_{q\_i0,q\_j0}(e00_{q\_i0,q\_j0} \cdot a0_{q\_i0} \cdot b0_{q\_j0}) +$$ [FORMULA 125]

$$\sum_{q\_i0,q\_j1}(e01_{q\_i0,q\_j1} \cdot a0_{q\_i0} \cdot b1_{q\_j1}) +$$

$$\sum_{q\_i1,q\_j0}(e10_{q\_i1,q\_j0} \cdot a1_{q\_i1} \cdot b0_{q\_j0}) +$$

$$\sum_{q\_i1,q\_j1}(e11_{q\_i1,q\_j1} \cdot a1_{q\_i1} \cdot b1_{q\_j1}) +$$

$$\sum_{q\_i1,q\_j2}(e12_{q\_i1,q\_j2} \cdot a1_{q\_i1} \cdot b2_{q\_j2}) +$$

$$\sum_{q\_i2,q\_j1}(e21_{q\_i2,q\_j1} \cdot a2_{q\_i2} \cdot b1_{q\_j1}) +$$

$$\sum_{q\_i2,q\_j2}(e22_{q\_i2,q\_j2} \cdot a2_{q\_i2} \cdot b2_{q\_j2}) +$$

$$\sum_{q\_i2,q\_j0}(e20_{q\_i2,q\_j0} \cdot a2_{q\_i2} \cdot b0_{q\_j0}) +$$

$$\sum_{q\_i0,q\_j2}(e02_{q\_i0,q\_j2} \cdot a2_{q\_i2} \cdot b0_{q\_i0})$$

Focusing on the six terms $\Sigma a0_{q\_i0} \cdot b1_{q\_j1}$, $\Sigma a1_{q\_i1} \cdot b0_{q\_j0}$, $\Sigma a1_{q\_i1} \cdot b2_{q\_j2}$, $\Sigma a2_{q\_i2} \cdot b1_{q\_j1}$, $\Sigma a2_{q\_i2} \cdot b0_{q\_j0}$ and $\Sigma a0_{q\_i0} \cdot b2_{q\_j2}$ in the above formula of the secure sum-of-product computation, one party has both the two fragment values of each term, another party has one of the two fragment values, and the remaining party has the other of the two fragment values. For example, concerning the fragment values $a0_{q\_i0}$ and $b1_{q\_j1}$ of the term $\Sigma a0_{q\_i0} \cdot b1_{q\_j1}$, the party X has both the fragment values $a0_{q\_i0}$ and $b1_{q\_j1}$, the party Y has only the fragment value $b1_{q\_j1}$, and the party Z has only the fragment value $a0_{q\_i0}$. The same holds true for the term $\Sigma a1_{q\_i1} \cdot b0_{q\_j0}$. A secure sum-of-product computation system 900 according to a ninth embodiment implements a method of determining a sum-of-product of two fragment values in the case where any one of three parties has both the two fragment values, another of the three parties has one of the two fragment values, and the remaining one of the three parties has the other of the two fragment values, that is, a sum-of-product computation method on which the secure sum-of-product computation according to the sixth and seventh embodiments is based.

In the following, an example in which the party X has both the fragment values, the party Y has one of the two fragment values, and the party Z has the other of the two fragment values will be described. However, the computation can also be achieved in the same manner in the cases where the party Y has both the fragment values, the party X has one of the two fragment values, and the party Z has the other of the two fragment values and where the party Z has both the fragment values, the party X has one of the two fragment values, and the party Y has the other of the two fragment values.

Figure 16:
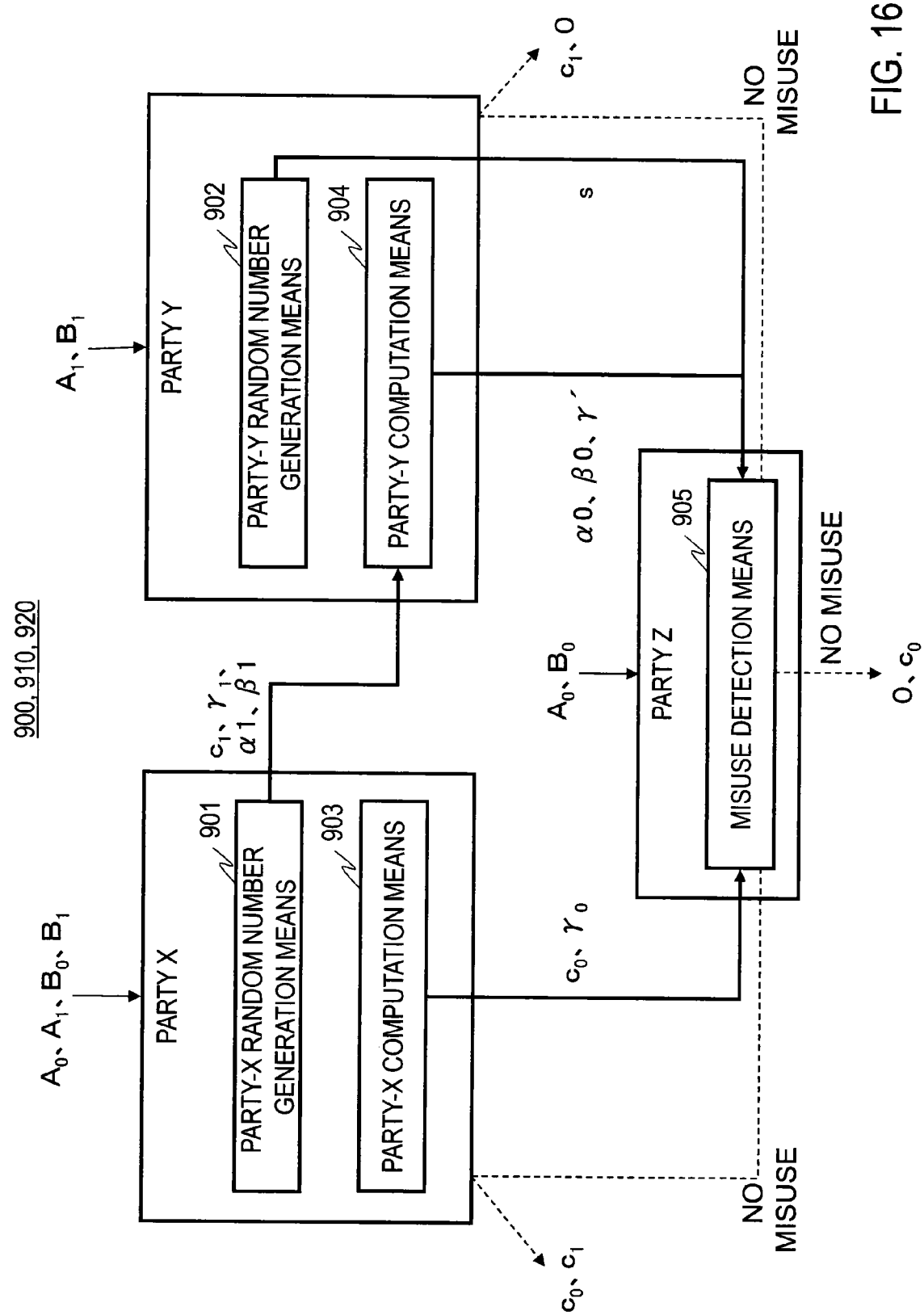
FIG. 16 is a diagram showing an example of a configuration of secure sum-of-product computation system 900, 910 and 920.
Figure 17:
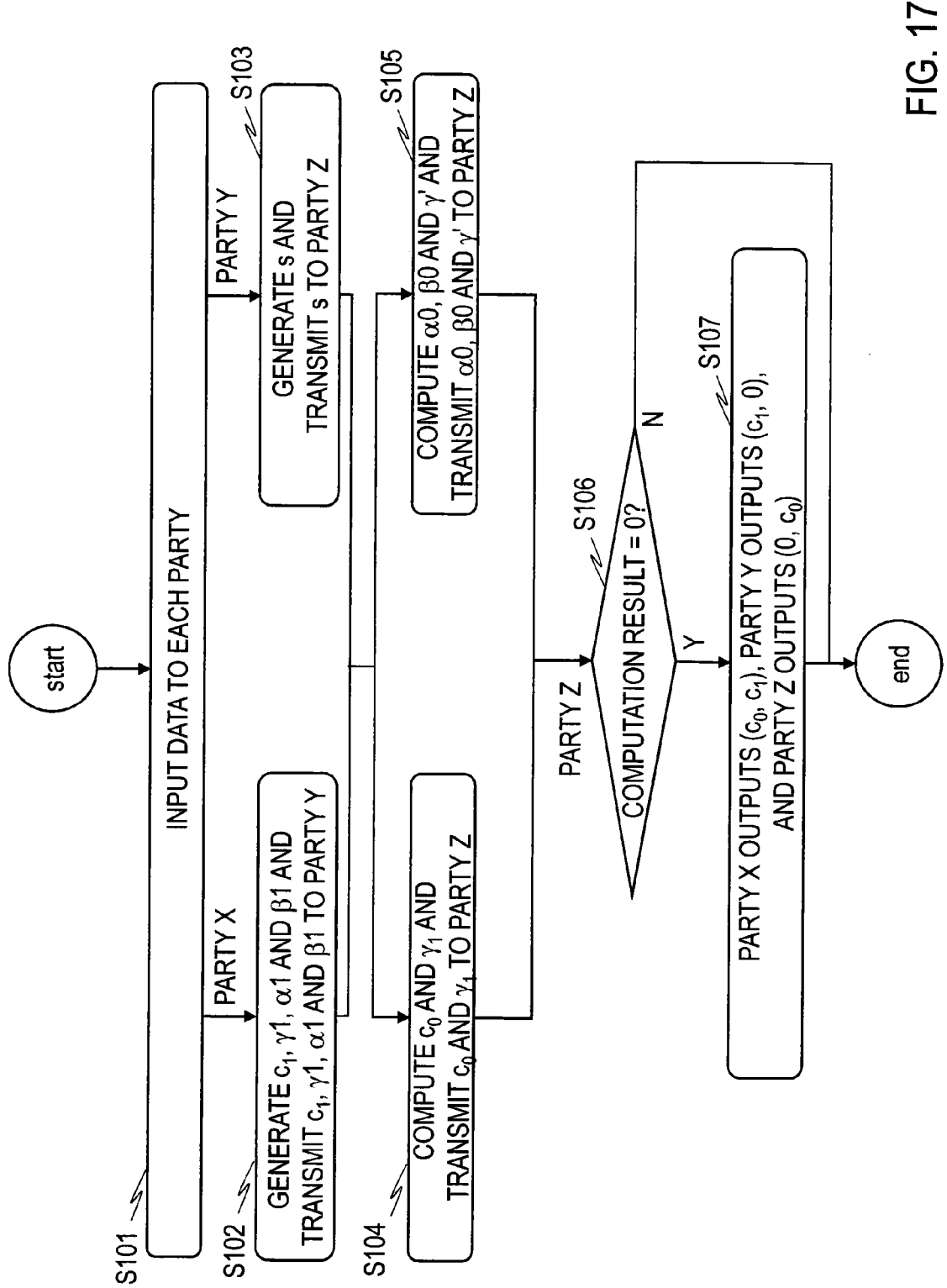
FIG. 17 is a diagram showing an example of a flow of a processing performed by the secure sum-of-product computation system 900, 910 and 920.

FIG. 16 shows an example of a configuration of the secure sum-of-product computation system 900, and FIG. 17 shows an example of a flow of a processing performed by the secure sum-of-product computation system 900. The secure sum-of-product computation system 900 comprises a party X, a party Y and a party Z, which are computation apparatuses. The party X has party-X random number generation means 901 and party-X computation means 903, the party Y has party-Y random number generation means 902 and party-Y computation means 904, and the party Z has misuse detection means 905.

The secure sum-of-product computation system 900 performs a total of m sets of sum-of-product computations of data strings $A_{q\_0}=(a0_{q\_0}, \ldots, a0_{q\_na0-1})$ and $A_{q\_1}=(a1_{q\_0}, \ldots, a1_{q\_na1-1})$ and data strings $B_{q\_0}=(b0_{q\_0}, \ldots, b0_{q\_nb0-1})$ and $B_{q\_1}=(b1_{q\_0}, \ldots, b1_{q\_nb1-1})$ expressed as the following formula by cooperative computation by the three computation apparatuses, the parties X, Y and Z (i0=0, ..., na0-1, i1=0, ..., na1-1, j0=0, ..., nb0-1, j1=0, ..., nb1-1, na0, na1, nb0 and nb1 represent natural numbers, $e01_{q\_i0,q\_j1}$ and $e10_{q\_i1,q\_j0}$ represent any numbers, q=0, ..., m−1, and m represents an integer equal to or greater than 1) (the computations are performed in parallel in the case where m is equal to or greater than 2).

$$\sum_{q\_i0,q\_j1} (e01_{q\_i0,q\_j1} \cdot a0_{q\_i0} \cdot b1_{q\_j1}) + \qquad \text{[FORMULA 126]}$$

$$\sum_{q\_i1,q\_j0} (e10_{q\_i1,q\_j0} \cdot a1_{q\_i1} \cdot b0_{q\_j0})$$

Data strings $A_{q\_0}, A_{q\_1}, B_{q\_0}$ and $B_{q\_1}$ are input to the party X, data strings $A_{q\_1}$ and $B_{q\_1}$ are input to the party Y, and data strings $A_{q\_0}$ and $B_{q\_0}$ are input to the party Z (S101).

First, the party-X random number generation means 901 in the party X generates random numbers $c_{q\_1}$ and $\gamma_1$ and random number sequences $(\alpha 1_{q\_0}, \ldots, \alpha 1_{q\_nb0-1})$ and $(\beta 1_{q\_0}, \ldots, \beta 1_{q\_na0-1})$ and transmits the random numbers and the random number sequences to the party Y (S102). In addition, the party-Y random number generation means 902 in the party Y generates a random number $s_q$ and transmits the random number to the party Z (S103).

Then, the party-X computation means 903 in the party X computes random numbers $c_{q\_0}$ and $\gamma_0$ according to $$c_{q\_0} = \sum_{q\_i0,q\_j1} (e01_{q\_i0,q\_j1} \cdot a0_{q\_i0} \cdot b1_{q\_j1}) + \qquad \text{[FORMULA 127]}$$

$$\sum_{q\_i1,q\_j0} (e10_{q\_i1,q\_j0} \cdot a1_{q\_i1} \cdot b0_{q\_j0}) - c_{q\_1}$$

$$\gamma_0 = \sum_{i0,j0,q} (a0_{q\_i0} \cdot b1_{q\_j0} + b0_{q\_j0} \cdot \alpha 1_{q\_j0}) - \gamma_1$$

and transmits the random numbers to the party Z (S104).

In addition, the party-Y computation means 904 in the party Y receives the random numbers $c_{q\_1}$ and $\gamma_1$ and the random number sequences $(\alpha 1_{q\_0}, \ldots, \alpha 1_{q\_nb0-1})$ and $(\beta 1_{q\_0}, \ldots, \beta 1_{q\_na0-1})$ from the party X, computes number sequences $(\alpha 0_{q\_0}, \ldots, \alpha 0_{q\_nb0-1})$ and $(\beta 0_{q\_0}, \ldots, \beta 0_{q\_na0-1})$ and a value $\gamma'$ according to $$\alpha 0_{q\_j0} = \sum_{q,q\_i1} s_q \cdot e10_{q\_i1,q\_j0} \cdot a1_{q\_i1} - \alpha 1_{q\_j0} \qquad \text{[FORMULA 128]}$$

$$\beta 0_{q\_i0} = \sum_{q,q\_j1} s_q \cdot e01_{q\_i0,q\_j1} \cdot b1_{q\_j1} - \beta 1_{q\_i0}$$

$$\gamma' = \sum_q s_q \cdot c_{q\_1} - \gamma_1,$$

and transmits the number sequences and the value to the party Z (S105).

Then, the misuse detection means 905 in the party Z receives the random numbers $c_{q\_0}$ and $\gamma_0$ from the party X and the random number $s_q$, the number sequences $(\alpha 0_{q\_0}, \ldots, \alpha 0_{q\_nb0-1})$ and $(\beta 0_{q\_0}, \ldots, \beta 0_{q\_na0-1})$ and the value $\gamma'$ from the party Y, computes $$\sum_q s_q \cdot c_{q\_0} - \gamma_0 - \qquad \text{[FORMULA 129]}$$

$$\sum_{i0,j0,q} (a0_{q\_i0} \cdot \beta 0_{q\_i0} + b0_{q\_j0} \cdot \alpha 0_{q\_j0}) + \gamma',$$

and ends the processing by outputting data indicating a misuse detection if the computation result is not 0 (S106).

If the result of the computation by the misuse detection means 905 is 0, the party X outputs the random numbers $c_{q\_0}$ and $c_{q\_1}$, the party Y outputs the random number $c_{q\_1}$ and 0, and the party Z outputs 0 and the random number $c_{q\_0}$ (S107). In the processing described above, hash values or other values can be substituted for the random numbers.

Tenth Embodiment

A tenth embodiment is a specific example of the ninth embodiment, in which na0=na1=na2=nb0=nb1=nb2=n, and e00=e01=e10=e11=e12=e21=e22=e20=e02=1. The configuration and the process flow are the same as those according to the ninth embodiment (an example of the configuration is shown in FIG. 16, and an example of the process flow is shown in FIG. 17). A secure sum-of-product computation system 910 according to the tenth embodiment performs a total of m sets of sum-of-product computations of data strings $A_{q\_0}=(a0_{q\_0}, \ldots, a0_{q\_n-1})$ and $A_{q\_1}=(a1_{q\_0}, \ldots, a1_{q\_n-1})$ and data strings $B_{q\_0}=(b0_{q\_0}, \ldots, b0_{q\_n-1})$ and $B_{q\_1}=(b1_{q\_0}, \ldots, b1_{q\_n-1})$ expressed as the following formula by cooperative computation by the three computation apparatuses, the parties X, Y and Z (i=0, ..., n−1, n represents a natural number, q=0, ..., m−1, and m represents an integer equal to or greater than 1) (the computations are performed in parallel in the case where m is equal to or greater than 2).

$$\sum_{q\_i} a0_{q\_i} \cdot b1_{q\_i} + \sum_{q\_i} a1_{q\_i} \cdot b0_{q\_i}$$ [FORMULA 130]

Data strings $A_{q\_0}$, $A_{q\_1}$, $B_{q\_0}$ and $B_{q\_1}$ are input to the party X, data strings $A_{q\_1}$ and $B_{q\_1}$ are input to the party Y, and data strings $A_{q\_0}$ and $B_{q\_0}$ are input to the party Z (S101).

First, the party-X random number generation means 901 in the party X generates random numbers $c_{q\_1}$ and $\gamma_1$ and random number sequences $(\alpha 1_{q\_0}, \ldots, \alpha 1_{q\_n-1})$ and $(\beta 1_{q\_0}, \ldots, \beta 1_{q\_n-1})$ and transmits the random numbers and the random number sequences to the party Y (S102). In addition, the party-Y random number generation means 902 in the party Y generates a random number $s_q$ and transmits the random number to the party Z (S103).

Then, the party-X computation means 903 in the party X computes random numbers $c_{q\_0}$ and $\gamma_0$ according to $$c_{q\_0} = \sum_{q\_i} a0_{q\_i} \cdot b1_{q\_i} + \sum_{q\_i} a1_{q\_i} \cdot b0_{q\_i} - c_{q\_1}$$ [FORMULA 131]

$$\gamma_0 = \sum_{i,q} (a0_{q\_i} \cdot \beta 1_{q\_i} + b0_{q\_i} \cdot \alpha 1_{q\_i}) - \gamma_1$$

and transmits the random numbers to the party Z (S104).

In addition, the party-Y computation means 904 in the party Y receives the random numbers $c_{q\_1}$ and $\gamma_1$ and the random number sequences $(\alpha 1_{q\_0}, \ldots, \alpha 1_{q\_n-1})$ and $(\beta 1_{q\_0}, \ldots, \beta 1_{q\_n-1})$ from the party X, computes number sequences $(\alpha 0_{q\_0}, \ldots, \alpha 0_{q\_n-1})$ and $(\beta 0_{q\_0}, \ldots, \beta 0_{q\_n-1})$ and a value $\gamma'$ according to $$\alpha 0_{q\_i} = s_q \cdot a1_{q\_i} - \alpha 1_{q\_i}$$ [FORMULA 132]

$$\beta 0_{q\_i} = s_q \cdot b1_{q\_i} - \beta 1_{q\_i}$$

$$\gamma' = \sum_q s_q \cdot c_{q\_1} - \gamma_1,$$

and transmits the number sequences and the value to the party Z (S105).

Then, the misuse detection means 905 in the party Z receives the random numbers $c_{q\_0}$ and $\gamma_0$ from the party X and the random number $s_q$, the number sequences $(\alpha 0_{q\_0}, \ldots, \alpha 0_{q\_n-1})$ and $(\beta 0_{q\_0}, \ldots, \beta 0_{q\_n-1})$ and the value $\gamma'$ from the party Y, computes $$\sum_q s_q \cdot c_{q\_0} - \gamma_0 - \sum_{i,q} (a0_{q\_i} \cdot \beta 0_{q\_i} + b0_{q\_i} \cdot \alpha 0_{q\_i}) + \gamma',$$ [FORMULA 133]

and ends the processing by outputting data indicating a misuse detection if the computation result is not 0 (S106).

If the result of the computation by the misuse detection means 905 is 0, the party X outputs the random numbers $c_{q\_0}$ and $c_{q\_1}$, the party Y outputs the random number $c_{q\_1}$ and 0, and the party Z outputs 0 and the random number $c_{q\_0}$ (S107). In the processing described above, hash values or other values can be substituted for the random numbers.

Eleventh Embodiment

A secure sum-of-product computation system 920 according to an eleventh embodiment is the secure sum-of-product computation system 910 according to the tenth embodiment that is improved so as to be able to more efficiently and securely perform the sum-of-product computation $$\sum_{q\_i} a0_{q\_i} \cdot b1_{q\_i} + \sum_{q\_i} a1_{q\_i} \cdot b0_{q\_i}$$ [FORMULA 134]

with one of the multipliers in each term being fixed regardless of the values i and q, that is, $$\sum_{q\_i} a0 \cdot b1_{q\_i} + \sum_{q\_i} a1 \cdot b0_{q\_i}.$$ [FORMULA 135]

The configuration and the process flow of the secure sum-of-product computation system 920 are the same as those according to the ninth and tenth embodiment (an example of the configuration is shown in FIG. 16, and an example of the process flow is shown in FIG. 17). However, data a0 and a1 and data strings $B_{q\_0}=(b0_{q\_0}, \ldots, b0_{q\_n-1})$ and $B_{q\_1}=(b1_{q\_0}, \ldots, b1_{q\_n-1})$ are input to the party X, the data a1 and the data string $B_{q\_1}$ are input to the party Y, and the data a0 and the data string $B_{q\_0}$ are input to the party Z (S101).

First, the party-X random number generation means 901 in the party X generates random numbers $c_{q\_1}$ and $\gamma_1$, a random number sequence $(\alpha 1_{q\_0}, \ldots, a1_{q\_n-1})$ and a random number $\beta 1$ and transmits the random numbers and the random number sequence to the party Y (S102).

In addition, the party-Y random number generation means 902 in the party Y generates a random number $s_q$ and transmits the random number to the party Z (S103).

Then, the party-X computation means 903 in the party X computes random numbers $c_{q\_0}$ and $\gamma_0$ according to $$c_{q\_0} = \sum_{q\_i} a0 \cdot b1_{q\_i} + \sum_{q\_i} a1 \cdot b0_{q\_i} - c_{q\_1}$$ [FORMULA 136]

$$\gamma_0 = a0 \cdot \beta 1 + \sum_{i,q} b0_{q\_i} \cdot \alpha 1_{q\_i} - \gamma_1$$

and transmits the random numbers to the party Z (S104).

In addition, the party-Y computation means 904 in the party Y receives the random numbers $c_{q\_1}$ and $\gamma_1$, the random number sequence $(\alpha 1_{q\_0}, \ldots, \alpha 1_{q\_n-1})$ and the random number $\beta 1$ from the party X, computes a number sequence $(\alpha 0_{q\_0}, \ldots, \alpha 0_{q\_n-1})$ and value $\beta 0$ and $\gamma'$ according to $$\alpha 0_{q\_i} = \sum_q s_q \cdot a1 - \alpha 1_{q\_i}$$ [FORMULA 137]

$$\beta 0 = \sum_{i,q} s_q \cdot b1_{q\_i} - \beta 1$$

$$\gamma' = \sum_q s_q \cdot c_{q\_1} - \gamma_1,$$

and transmits the number sequence and the values to the party Z (S105).

Then, the misuse detection means 905 in the party Z receives the random numbers $c_{q\_0}$ and $\gamma_0$ from the party X and the random number $s_q$, the number sequence ($\alpha 0_{q\_0}, \ldots, \alpha 0_{q\_n-1}$) and the values $\beta 0$ and $\gamma'$ from the party Y, computes $$\sum_q s_q \cdot c_{q\_0} - \gamma_0 - a0 \cdot \beta 0 - \sum_{i,q} b0_{q\_i} \cdot \alpha 0_{q\_i} + \gamma', \quad \text{[FORMULA 138]}$$

and ends the processing by outputting data indicating a misuse detection if the computation result is not 0 (S106).

If the result of the computation by the misuse detection means 905 is 0, the party X outputs the random numbers $c_{q\_0}$ and $c_{q\_1}$, the party Y outputs the random number $c_{q\_1}$ and 0, and the party Z outputs 0 and the random number $c_{q\_0}$ (S107). In the processing described above, hash values or other values can be substituted for the random numbers.

The processings in the secure sum-of-product computation methods according to the present invention performed by the secure sum-of-product computation systems according to the present invention described above can be performed not only sequentially in the order described above but also in parallel with each other or individually as required or depending on the processing power of the apparatus that performs the processings. The functions of components of the secure sum-of-product computation systems according to the present invention can be combined or divided as required. Furthermore, other various modifications can be appropriately made without departing form the spirit of the present invention. In the case where the secure sum-of-product computation systems according to the embodiments of the present invention are implemented by computers, the specific processings of the functions of the apparatuses and the components thereof are described in programs. The programs are stored in a hard disk drive, for example, and a required program or data is loaded into a random access memory (RAM) for execution. The computer implements the specific processing by the CPU executing the loaded program.

What is claimed is:

1. A secure sum-of-product computation method used for performing a sum-of-product computation of data strings $A_0=(a0_0, \ldots, a0_{na0-1})$, $A_1=(a1_0, \ldots, a1_{na1-1})$ and $A_2=(a2_0, \ldots a2_{na2-1})$ and $B_0=(b0_0, \ldots, b0_{nb0-1})$, $B_1=(b1_0, \ldots, b1_{nb1-1})$ and $B_2=(b2_0, \ldots, b2_{nb2-1})$ by cooperative computation by three computation apparatuses, which are a party X, a party Y and a party Z, the sum-of-product computation being expressed as $$\sum_{i0,j0} (e00_{i0,j0} \cdot a0_{i0} \cdot b0_{j0}) + $$
$$\sum_{i0,j1} (e01_{i0,j0} \cdot a0_{i0} \cdot b1_{j1}) + \sum_{i1,j0} (e10_{i1,j0} \cdot a1_{i1} \cdot b0_{j0}) + $$
$$\sum_{i1,j1} (e11_{i1,j1} \cdot a1_{i1} \cdot b1_{j1}) + \sum_{i1,j2} (e12_{i1,j2} \cdot a1_{i1} \cdot b2_{j2}) + $$
$$\sum_{i2,j1} (e21_{i2,j1} \cdot a2_{i2} \cdot b1_{j1}) + \sum_{i2,j2} (e22_{i2,j2} \cdot a2_{i2} \cdot b2_{j2}) + $$
$$\sum_{i2,j0} (e20_{i2,j0} \cdot a2_{i2} \cdot b0_{j0}) + \sum_{i0,j2} (e02_{i0,j2} \cdot a0_{i0} \cdot b2_{j2})$$

where na0, na1, na2, nb0, nb1 and nb2 represent natural numbers, i0=0, . . . , na0-1, i1=0, . . . , na1-1, i2=0, . . . , na2-1, j0=0, . . . , nb0-1, j1=0, . . . , nb1-1, and j2=0, . . . , nb2-1, and $e01_{i0,j1}$, $e10_{i1,j0}$, $e00_{i0,j0}$, $e11_{i1,j1}$, $e12_{i1,j2}$, $e21_{i2,j1}$, $e22_{i2,j2}$, $e20_{i2,j0}$ and $e02_{i0,j2}$ represent any numbers, and the data strings $A_0$, $A_1$, $B_0$ and $B_1$ being input to the party X, the data strings $A_1$, $A_2$, $B_1$ and $B_2$ being input to the party Y, and the data strings $A_2$, $A_0$, $B_2$ and $B_0$ being input to the party Z, the secure sum-of-product computation method comprising:

a party-X random number generation step in which the party X generates a number $r_X$ and transmits the number to the party Y;

a party-X first computation step in which the party X computes a value $c_X$ according to $$c_X = \sum_{i0,j1}(e01_{i0,j1} \cdot a0_{i0} \cdot b1_{j1}) + \sum_{i1,j0}(e10_{i1,j0} \cdot a1_{i1} \cdot b0_{j0}) + r_X$$

and transmits the value to the party Z;

a party-X second computation step in which the party X receives a number $r_Z$ from the party Z and a value $c_Y$ from the party Y, computes values $c_0$ and $c_1$ according to $$c_0 = \sum_{i0,j0}(e00_{i0,j0} \cdot a0_{i0} \cdot b0_{j0}) + c_X - r_Z$$
$$c_1 = \sum_{i1,j1}(e11_{i1,j1} \cdot a1_{i1} \cdot b1_{j1}) + c_Y - r_X$$

and outputs the values;

a party-Y random number generation step in which the party Y generates a number $r_Y$ and transmits the number to the party Z;

a party-Y first computation step in which the party Y computes the value $c_Y$ according to $$c_Y = \sum_{i1,j2}(e12_{i1,j2} \cdot a1_{i1} \cdot b2_{j2}) + \sum_{i2,j1}(e21_{i2,j1} \cdot a2_{i2} \cdot b1_{j1}) + r_Y$$

and transmits the value to the party X;

a party-Y second computation step in which the party Y receives the number $r_X$ from the party X and a value $c_Z$ from the party Z, computes values $c_1$ and $c_2$ according to $$c_1 = \sum_{i1,j1}(e11_{i1,j1} \cdot a1_{i1} \cdot b1_{j1}) + c_Y - r_X$$
$$c_2 = \sum_{i2,j2}(e22_{i2,j2} \cdot a2_{i2} \cdot b2_{j2}) + c_Z - r_Y$$

and outputs the values;

a party-Z random number generation step in which the party Z generates the number $r_Z$ and transmits the number to the party X;

a party-Z first computation step in which the party Z computes the value $c_Z$ according to $$c_Z = \sum_{i2,j0}(e20_{i2,j0} \cdot a2_{i2} \cdot b0_{j0}) + \sum_{i0,j2}(e02_{i0,j2} \cdot a0_{i0} \cdot b2_{j2}) + r_Z$$

and transmits the value to the party Y; and a party-Z second computation step in which the party Z receives the number $r_Y$ from the party Y and the value $c_X$ from the party X, computes the values $c_0$ and $c_2$ according to $$c_0 = \sum_{i0,j0} (e00_{i0,j0} \cdot a0_{i0} \cdot b0_{j0}) + c_X - r_Z$$

$$c_2 = \sum_{i2,j2} (e22_{i2,j2} \cdot a2_{i2} \cdot b2_{j2}) + c_Z - r_Y$$

and outputs the values.

2. A secure sum-of-product computation method used for performing, in parallel, a total of m sets of sum-of-product computations of data strings $A_{q\_0}=(a0_{q\_0}, \ldots, a0_{q\_na0-1})$, $A_{q\_1}=(a1_{q\_0}, \ldots, a1_{q\_na1-1})$ and $A_{q\_2}=(a2_{q\_0}, \ldots, a2_{q\_na2-1})$ and $B_{q\_0}=(b0_{q\_0}, \ldots, b0_{q\_nb0-1})$, $B_{q\_1}=(b1_{q\_0}, \ldots, b1_{q\_nb1-1})$ and $B_{q\_2}=(b2_{q\_0}, \ldots, b2_{q\_nb2-1})$ by cooperative computation by three computation apparatuses, which are a party X, a party Y and a party Z, the sum-of-product computations being expressed as $$\sum_{q\_i0,q\_j0} (e00_{q\_i0,q\_j0} \cdot a0_{q\_i0} \cdot b0_{q\_j0}) +$$

$$\sum_{q\_i0,q\_j1} (e01_{q\_i0,q\_j1} \cdot a0_{q\_i0} \cdot b1_{q\_j1}) + \sum_{q\_i1,q\_j0} (e10_{q\_i1,q\_j0} \cdot a1_{q\_i1} \cdot b0_{q\_j0}) +$$

$$\sum_{q\_i1,q\_j1} (e11_{q\_i1,q\_j1} \cdot a1_{q\_i1} \cdot b1_{q\_j1}) + \sum_{q\_i1,q\_j2} (e12_{q\_i1,q\_j2} \cdot a1_{q\_i1} \cdot b2_{q\_j2}) +$$

$$\sum_{q\_i2,q\_j1} (e21_{q\_i2,q\_j1} \cdot a2_{q\_i2} \cdot b1_{q\_j1}) + \sum_{q\_i2,q\_j2} (e22_{q\_i2,q\_j2} \cdot a2_{q\_i2} \cdot b2_{q\_j2}) +$$

$$\sum_{q\_i2,q\_j0} (e20_{q\_i2,q\_j0} \cdot a2_{q\_i2} \cdot b0_{q\_j0}) + \sum_{q\_i0,q\_j2} (e02_{q\_i0,q\_j2} \cdot a2_{q\_i2} \cdot b0_{q\_i0})$$

where $q=0, \ldots, m-1$, m represents an integer equal to or greater than 1, na0, na1, na2, nb0, nb1 and nb2 represent natural numbers, $i0=0, \ldots, na0-1$, $i1=0, \ldots, na1-1$, $i2=0, \ldots, na2-1$, $j0=0, \ldots, nb0-1$, $j1=0, \ldots, nb1-1$, and $j2=0, \ldots, nb2-1$, and $e01_{q\_i0,q\_j1}$, $e10_{q\_i1,q\_j0}$, $e00_{q\_i0,q\_j0}$, $e11_{q\_i1,q\_j1}$, $e12_{q\_i1,q\_j2}$, $e21_{q\_i2,q\_j1}$, $e22_{q\_i2,q\_j2}$, $e20_{q\_i2,q\_j0}$ and $e02_{q\_i0,q\_j2}$ represent any numbers, and the data strings $A_{q\_0}$, $A_{q\_1}$, $B_{q\_0}$ and $B_{q\_1}$ being input to the party X, the data strings $A_{q\_1}$, $A_{q\_2}$, $B_{q\_1}$ and $B_{q\_2}$ being input to the party Y, and the data strings $A_{q\_2}$, $A_{q\_0}$, $B_{q\_2}$ and $B_{q\_0}$ being input to the party Z, the secure sum-of-product computation method comprising:

a party-X first random number generation step in which the party X generates a number $r_{q\_X}$ and transmits the number to the party Y;

a party-X first computation step in which the party X computes a value $c_{q\_X}$ according to $$c_{q\_X} = \sum_{q\_i0,q\_j1} (e01_{q\_i0,q\_j1} \cdot a0_{q\_i0} \cdot b1_{q\_j1}) +$$

$$\sum_{q\_i1,q\_j0} (e10_{q\_i1,q\_j0} \cdot a1_{q\_i1} \cdot b0_{q\_j0}) + r_{q\_X}$$

and transmits the value to the party Z;

a party-X second computation step in which the party X receives a number $r_{q\_Z}$ from the party Z and a value $c_{q\_Y}$ from the party Y, computes values $c_{q\_0}$ and $c_{q\_1}$ according to $$c_{q\_0} = \sum_{q\_i0,q\_j0} (e00_{q\_i0,q\_j0} \cdot a0_{q\_i0} \cdot b0_{q\_j0}) + c_{q\_X} - r_{q\_Z}$$

$$c_{q\_1} = \sum_{q\_i1,q\_j1} (e11_{q\_i1,q\_j1} \cdot a1_{q\_i1} \cdot b1_{q\_j1}) + c_{q\_Y} - r_{q\_X};$$

a party-Y first random number generation step in which the party Y generates a number $r_{q\_Y}$ and transmits the number to the party Z;

a party-Y first computation step in which the party Y computes the value $c_{q\_Y}$ according to $$c_{q\_Y} = \sum_{q\_i1,q\_j2} (e12_{q\_i1,q\_j2} \cdot a1_{q\_i1} \cdot b2_{q\_j2}) +$$

$$\sum_{q\_i2,q\_j1} (e21_{q\_i2,q\_j1} \cdot a2_{q\_i2} \cdot b1_{q\_j1}) + r_{q\_Y}$$

and transmits the value to the party X;

a party-Y second computation step in which the party Y receives the number $r_{q\_X}$ from the party X and a value $c_{q\_Z}$ from the party Z, computes values $c_{q\_1}$ and $c_{q\_2}$ according to $$c_{q\_1} = \sum_{q\_i1,q\_j1} (e11_{q\_i1,q\_j1} \cdot a1_{q\_i1} \cdot b1_{q\_j1}) + c_{q\_Y} - r_{q\_X}$$

$$c_{q\_2} = \sum_{q\_i2,q\_j2} (e22_{q\_i2,q\_j2} \cdot a2_{q\_i2} \cdot b2_{q\_j2}) + c_{q\_Z} - r_{q\_Y};$$

a party-Z first random number generation step in which the party Z generates the number $r_{q\_Z}$ and transmits the number to the party X;

a party-Z first computation step in which the party Z computes the value $c_{q\_Z}$ according to $$c_{q\_Z} = \sum_{q\_i2,q\_j0} (e20_{q\_i2,q\_j0} \cdot a2_{q\_i2} \cdot b0_{q\_j0}) +$$

$$\sum_{q\_i0,q\_j2} (e02_{q\_i0,q\_j2} \cdot a2_{q\_i2} \cdot b0_{q\_j0}) + r_{q\_Z}$$

and transmits the value to the party Y; and a party-Z second computation step in which the party Z receives the number $r_{q\_Y}$ from the party Y and the value $c_{q\_X}$ from the party X, computes the values $c_{q\_0}$ and $c_{q\_2}$ according to $$c_{q\_0} = \sum_{q\_i0,q\_j0} (e00_{q\_i0,q\_j0} \cdot a0_{q\_i0} \cdot b0_{q\_j0}) + c_{q\_X} - r_{q\_Z}$$

$$c_{q\_2} = \sum_{q\_i2,q\_j2} (e22_{q\_i2,q\_j2} \cdot a2_{q\_i2} \cdot b2_{q\_j2}) + c_{q\_Z} - r_{q\_Y};$$

3. The secure sum-of-product computation method according to claim 2, wherein the parties X and Y previously sharing a number $s_{q\_Z}$, the parties Y and Z previously sharing a number $s_{q\_X}$, and the parties Z and X previously sharing a number $s_{q\_Y}$, and said secure sum-of-product computation method further comprising:

a party-X second random number generation step in which the party X generates a number $\rho_X$ and transmits the number to the party Y, and generates number sequences $(\alpha Z0_{q\_0}, \ldots, \alpha Z0_{q\_na0-1})$ and $(\beta Z0_{q\_0}, \ldots, \beta Z0_{q\_nb0-1})$ and transmits the number sequences to the party Z;

a party-X third computation step in which the party X computes number sequences $(\alpha Z0_{q\_0} - s_{q\_Z} \cdot a0_{q\_0}, \ldots, \alpha Z0_{q\_na0-1} - s_{q\_Z} \cdot a0_{q\_na0-1})$ and $(\beta Z0_{q\_0} - s_{q\_Z} \cdot b0_{q\_0}, \ldots, \beta Z0_{q\_nb0-1} - s_{q\_Z} \cdot b0_{q\_nb0-1})$ and transmits the number sequences to the party Y, receives number sequences $(\alpha X1_{q\_0}, \ldots, \alpha X1_{q\_na1-1})$ and $(\beta X1_{q\_0}, \ldots, \beta X1_{q\_nb1-1})$ from the party Y, computes a value $$\gamma_X = \sum_{i1,j0,q} (e10_{i1,j0} \cdot \alpha X1_{q\_i1} \cdot b0_{q\_j0}) + \sum_{i0,j1,q} (e01_{i0,j1} \cdot a0_{q\_i0} \cdot \beta X1_{q\_i1}) + \rho_X,$$

and transmits the value to the party Z;

a party-X fourth computation step in which the party X receives a value $\rho_Z$ from the party Z, computes a value $$\gamma'_Z = \sum_q (-s_{q\_Z} \cdot r_{q\_Z}) + \rho_Z,$$

and transmits the value to the party Y;

a party-X misuse detection step in which the party X receives a value $\gamma_Y$ from the party Y and a value $\gamma'_Y$ and number sequences $(\alpha Y2_{q\_0} - s_{q\_Y} \cdot a2_{q\_0}, \ldots, \alpha Y2_{q\_na2-1} - s_{q\_Y} \cdot a2_{q\_na2-1})$ and $(\beta Y2_{q\_0} - s_{q\_Y} \cdot b2_{q\_0}, \ldots, \beta Y2_{q\_nb2-1} - s_{q\_Y} \cdot b2_{q\_nb2-1})$ from the party Z, computes $$\sum_{i1,i2,j1,j2,q} \{e21_{q\_i2,q\_j1} \cdot (\alpha Y2_{q\_i2} - s_{q\_Y} \cdot a2_{q\_i2}) \cdot b1_{q\_j1} +$$

$$e12_{q\_i1,q\_j2} \cdot (\beta Y2_{q\_j2} - s_{q\_Y} \cdot b2_{q\_j2}) \cdot a1_{q\_i1} + s_{q\_Y} \cdot c_{q\_Y}\} - \gamma_Y + \gamma'_Y,$$

ends the processing by outputting data indicating a misuse detection if the result of the computation is not 0, and outputting the values $c_{q\_0}$ and $c_{q\_1}$ if the result of the computation is 0;

a party-Y second random number generation step in which the party Y generates a number $\rho_Y$ and transmits the number to the party Z, and generates the number sequences $(\alpha X1_{q\_0}, \ldots, \alpha X1_{q\_na1-1})$ and $(\beta X1_{q\_0}, \ldots, \beta X1_{q\_nb1-1})$ and transmits the number sequences to the party X;

a party-Y third computation step in which the party Y computes number sequences $(\alpha X1_{q\_0} - s_{q\_X} \cdot a1_{q\_0}, \ldots, \alpha X1_{q\_na1-1} - s_{q\_X} \cdot a1_{q\_na1-1})$ and $(\beta X1_{q\_0} - s_{q\_X} \cdot b1_{q\_0}, \ldots \beta X1_{q\_nb1-1} - s_{q\_X} \cdot b1_{q\_nb1-1})$ and transmits the number sequences to the party Z, receives number sequences $(\alpha Y2_{q\_0}, \ldots, \alpha Y2_{q\_na2-1})$ and $(\beta Y2_{q\_0}, \ldots, \beta Y2_{q\_nb2-1})$ from the party Z, computes a value $$\gamma_Y = \sum_{i2,j1,q} (e21_{q\_i2,q\_j1} \cdot \alpha Y2_{q\_i2} \cdot b1_{q\_j1}) +$$

$$\sum_{i1,j2,q} (e12_{q\_i1,q\_j2} \cdot a1_{q\_i1} \cdot \beta Y2_{q\_j2}) + \rho_Y,$$

and transmits the value to the party X;

a party-Y fourth computation step in which the party Y receives the number $\rho_X$ from the party X, computes a value $$\gamma'_X = \sum_q (-s_{q\_X} \cdot r_{q\_X}) + \rho_X,$$

and transmits the value to the party Z;

a party-Y misuse detection step in which the party Y receives a value $\gamma'_Z$ and the number sequences $(\alpha Z0_{q\_0} - s_{q\_Z} \cdot a0_{q\_0}, \ldots, \alpha Z0_{q\_na0-1} - s_{q\_Z} \cdot a0_{q\_na0-1})$ and $(\beta Z0_{q\_0} - s_{q\_Z} \cdot b0_{q\_0}, \ldots, \beta Z0_{q\_nb0-1} - s_{q\_Z} \cdot b0_{q\_nb0-1})$ from the party X and a value $\gamma_Z$ from the party Z, computes $$\sum_{i0,i2,j0,j2,q} \{e02_{q\_i0,q\_j2} \cdot (\alpha Z0_{q\_i0} - s_{q\_Z} \cdot a0_{q\_i0}) \cdot b2_{q\_j2} +$$

$$e20_{q\_i2,q\_j0} \cdot (\beta Z0_{q\_j0} - s_{q\_Z} \cdot b0_{q\_j0}) \cdot a2_{q\_i2} + s_{q\_Z} \cdot c_{q\_Z}\} - \gamma_Z + \gamma'_Z,$$

ends the processing by outputting data indicating a misuse detection if the result of the computation is not 0, and outputs the values $c_{q\_1}$ and $c_{q\_2}$ if the result of the computation is 0;

a party-Z second random number generation step in which the party Z generates the number $\rho_Z$ and transmits the number to the party X, and generates the number sequences $(\alpha Y2_{q\_0}, \ldots, \alpha Y2_{q\_na2-1})$ and $(\beta Y2_{q\_0}, \ldots, \beta Y2_{q\_nb2-1})$ and transmits the number sequences to the party Y;

a party-Z third computation step in which the party Z computes the number sequences $(\alpha Y2_{q\_0} - s_{q\_Y} \cdot a2_{q\_0}, \ldots, \alpha Y2_{q\_na2-1} - s_{q\_Y} \cdot a2_{q\_na2-1})$ and $(\beta Y2_{q\_0} - s_{q\_Y} \cdot b2_{q\_0}, \ldots, \beta Y2_{q\_nb2-1} - s_{q\_Y} \cdot b2_{q\_nb2-1})$ and transmits the number sequences to the party X, receives the number sequences $(\alpha Z0_{q\_0}, \ldots, \alpha Z0_{q\_na0-1})$ and $(\beta Z0_{q\_0}, \ldots, \beta Z0_{q\_nb0-1})$ from the party X, computes the value $$\gamma_Z = \sum_{i0,j2,q} (e02_{q\_i0,q\_j2} \cdot \alpha Z0_{q\_i0} \cdot b2_{q\_j0}) +$$

$$\sum_{i2,j0,q} (e20_{q\_i2,q\_j0} \cdot a2_{q\_i2} \cdot \beta Z0_{q\_j0}) + \rho_Z,$$

and transmits the value to the party Y;

a party-Z fourth computation step in which the party Z receives the number $\rho_Y$ from the party Y, computes a value $$\gamma'_Y = \sum_q (-s_{q\_Y} \cdot r_{q\_Y}) + \rho_Y,$$

and transmits the value to the party X; and a party-Z misuse detection step in which the party Z receives a value $\gamma_X$ from the party X and a value $\gamma'_X$ and the number sequences $(\alpha X1_{q\_0}-s_{q\_X}\cdot a1_{q\_0}, \ldots, \alpha X1_{q\_na1-1}-s_{q\_X}\cdot a1_{q\_na1-1})$ and $(\beta X1_{q\_0}-s_{q\_X}\cdot b1_{q\_0}, \ldots, \beta X1_{q\_nb1-1}-s_{q\_X}\cdot b1_{q\_nb1-1})$ from the party Y, computes $$\sum_{i0,i1,j0,j1,q} \{e10_{q\_i1,q\_j0}\cdot(\alpha X1_{q\_i1}-s_{q\_X}\cdot a1_{q\_i1})\cdot b0_{q\_j0} + e01_{q\_i0,q\_j1}\cdot(\beta X1_{q\_j1}-s_{q\_X}\cdot b1_{q\_j1})\cdot a0_{q\_i0}+s_{q\_X}\cdot c_{q\_X}\} - \gamma_X + \gamma'_X,$$

ends the processing by outputting data indicating a misuse detection if the result of the computation is not 0, and outputs the values $c_{q\_2}$ and $c_{q\_0}$ if the result of the computation is 0.

4. The secure sum-of-product computation method according to claim 2, wherein the parties X and Y previously sharing a number $s_{q\_Z}$, the parties Y and Z previously sharing a number $s_{q\_X}$, and the parties Z and X previously sharing a number $s_{q\_Y}$, and said secure sum-of-product computation method further comprising:

a party-X second random number generation step in which the party X generates a number sequence $(\alpha Y1_{q\_0}, \ldots, \alpha Y1_{q\_na1-1})$ and a number $\rho_X$ and transmits the number sequence and the number to the party Y, and generates a number sequence $(\alpha Z0_{q\_0}, \ldots, \alpha Z0_{q\_na0-1})$ and transmits the number sequence to the party Z;

a party-X third computation step in which the party X computes a number sequence $(\alpha Z0_{q\_0}-s_{q\_Z}\cdot a0_{q\_0}, \ldots, \alpha Z0_{q\_na0-1}-s_{q\_Z}\cdot a0_{q\_na0-1})$ and transmits the number sequence to the party Y, receives a number sequence $(\alpha X1_{q\_0}, \ldots, \alpha X1_{q\_na1-1})$ from the party Y and a number sequence $(\alpha X0_{q\_0}, \ldots, \alpha X0_{q\_na0-1})$ from the party Z, computes a number sequence $(\alpha Y1_{q\_0}-s_{q\_Y}\cdot a1_{q\_0}, \ldots, \alpha Y1_{q\_na1-1}-s_{q\_Y}\cdot a1_{q\_na1-1})$ and a value $$\gamma_X = \sum_{i0,j1,q}(e01_{q\_i0,q\_j1}\cdot \alpha X0_{q\_i0}\cdot b1_{q\_j1}) + \sum_{i1,j0,q}(e10_{q\_i1,q\_j0}\cdot \alpha X1_{q\_i1}\cdot b0_{q\_j0}) + \rho_X,$$

and transmits the number sequence and the value to the party Z;

a party-X fourth computation step in which the party X receives a number sequence $(\alpha Z2_{q\_0}-s_{q\_Z}\cdot a2_{q\_0}, \ldots, \alpha Z2_{q\_na2-1}-s_{q\_Z}\cdot a2_{q\_na2-1})$ from the party Y and a value $\rho_Z$ from the party Z, computes a value $$\gamma'_Z = \sum_{i2,j0,q}\{e20_{q\_i2,q\_j0}\cdot(\alpha Z2_{q\_i2}-s_{q\_Z}\cdot a2_{q\_i2})\cdot b0_{q\_j0} - s_{q\_Z}\cdot r_{q\_Z}\} + \rho_Z,$$

and transmits the value to the party Y;

a party-X misuse detection step in which the party X receives a value $\gamma_Y$ from the party Y and a value $\gamma'_Y$ and a number sequence $(\alpha Y2_{q\_0}-s_{q\_Y}\cdot a2_{q\_0}, \ldots, \alpha Y2_{q\_na2-1}-s_{q\_Y}\cdot a2_{q\_na2-1})$ from the party Z, computes $$\sum_{i2,j1,q}\left\{\begin{array}{c}e21_{q\_i2,q\_j1}\cdot(\alpha Y2_{q\_i2}-s_{q\_Y}\cdot a2_{q\_i2})\cdot \\ b1_{q\_j1}+s_{q\_Y}\cdot c_{q\_Y}\end{array}\right\} - \gamma_Y + \gamma'_Y,$$

ends the processing by outputting data indicating a misuse detection if the result of the computation is not 0, and outputting the values $c_{q\_0}$ and $c_{q\_1}$ if the result of the computation is 0;

a party-Y second random number generation step in which the party Y generates a number sequence $(\alpha Z2_{q\_0}, \ldots, \alpha Z2_{q\_na2-1})$ and a number $\rho_Y$ and transmits the number sequence and the number to the party Z, and generates the number sequence $(\alpha X1_{q\_0}, \ldots, \alpha X1_{q\_na1-1})$ and transmits the number sequence to the party X;

a party-Y third computation step in which the party Y computes a number sequence $(\alpha X1_{q\_0}-s_{q\_X}\cdot a1_{q\_0}, \ldots, \alpha X1_{q\_na1-1}-s_{q\_X}\cdot a1_{q\_na1-1})$ and transmits the number sequence to the party Z, receives the number sequence $(\alpha Y1_{q\_0}, \ldots, \alpha Y1_{q\_na1-1})$ from the party X and a number sequence $(\alpha Y2_{q\_0}, \ldots, \alpha Y2_{q\_na2-1})$ from the party Z, computes the number sequence $(\alpha Z2_{q\_0}-s_{q\_Z}\cdot a2_{q\_0}, \ldots, \alpha Z2_{q\_na2-1}-s_{q\_Z}\cdot a2_{q\_na2-1})$ and the value $$\gamma_Y = \sum_{i1,j2,q}(e12_{q\_i1,q\_j2}\cdot \alpha Y1_{q\_i1}\cdot b2_{q\_j2}) + \sum_{i2,j1,q}(e21_{q\_i2,q\_j1}\cdot \alpha Y2_{q\_i2}\cdot b1_{q\_j1}) + \rho_Y,$$

and transmits the number sequence and the value to the party X;

a party-Y fourth computation step in which the party Y receives the number $\rho_X$ from the party X and a number sequence $(\alpha X0_{q\_0}-s_{q\_X}\cdot a0_{q\_0}, \ldots, \alpha X0_{q\_na0-1}-s_{q\_X}\cdot a0_{q\_na0-1})$ from the party Z, computes a value $$\gamma'_X = \sum_{i0,j1,q}\left\{\begin{array}{c}e01_{q\_i0,q\_j1}\cdot(\alpha X0_{q\_i0}-s_{q\_X}\cdot a0_{q\_i0})\cdot \\ b1_{q\_j1}-s_{q\_X}\cdot r_{q\_X}\end{array}\right\} + \rho_X,$$

and transmits the value to the party Z;

a party-Y misuse detection step in which the party Y receives the value $\gamma'_Z$ and the number sequence $(\alpha Z0_{q\_0}-s_{q\_Z}\cdot a0_{q\_0}, \ldots, \alpha Z0_{q\_na0-1}-s_{q\_Z}\cdot a0_{q\_na0-1})$ from the party X and a value $\gamma_Z$ from the party Z, computes $$\sum_{i0,j2,q}\left\{\begin{array}{c}e02_{q\_i0,q\_j2}\cdot(\alpha Z0_{q\_i0}-s_{q\_Z}\cdot a0_{q\_i0})\cdot \\ b2_{q\_j2}+s_{q\_Z}\cdot c_{q\_Z}\end{array}\right\} - \gamma_Z + \gamma'_Z,$$

ends the processing by outputting data indicating a misuse detection if the result of the computation is not 0, and outputs the values $c_{q\_1}$ and $c_{q\_2}$ if the result of the computation is 0;

a party-Z second random number generation step in which the party Z generates the number sequence $(\alpha X0_{q\_0}, \ldots, \alpha X0_{q\_na0-1})$ and the number $\rho_Z$ and transmits the number sequence and the number to the party X, and generates the number sequence $(\alpha Y2_{q\_0}, \ldots, \alpha Y2_{q\_na2-1})$ and transmits the number sequence to the party Y;

a party-Z third computation step in which the party Z computes the number sequence $(\alpha Y2_{q\_0}-s_{q\_Y}\cdot a2_{q\_0}, \ldots, \alpha Y2_{q\_na2-1}-s_{q\_Y}\cdot a2_{q\_na2-1})$ and transmits the number sequence to the party X, receives the number sequence $(\alpha Z0_{q\_0}, \ldots, \alpha Z0_{q\_na0-1})$ from the party X and the number sequence $(\alpha Z2_{q\_0}, \ldots, \alpha Z2_{q\_na2-1})$ from the party Y, computes the number sequence $(\alpha X0_{q\_0}-s_{q\_X}\cdot a0_{q\_0}, \ldots, \alpha X0_{q\_na0-1}-s_{q\_X}\cdot a0_{q\_na0-1})$ and the value $$\gamma_Z = \sum_{i2,j0,q}(e20_{q\_i2,q\_j0}\cdot \alpha Z2_{q\_i2}\cdot b0_{q\_j0}) + \sum_{i0,j2,q}(e02_{q\_i0,q\_j2}\cdot \alpha Z0_{q\_i0}\cdot b2_{q\_j2}) + \rho_Z,$$

and transmits the number sequence and the value to the party Y;

a party-Z fourth computation step in which the party Z receives the number sequence $(\alpha Y1_{q\_0}-s_{q\_Y}\cdot a1_{q\_0}, \ldots, \alpha Y1_{q\_na1-1}-s_{q\_Y}\cdot a1_{q\_na1-1})$ from the party X and the number $\rho_Y$ from the party Y, computes a value $$\gamma'_Y = \sum_{i1,j2,q}\left\{\begin{array}{c}e12_{q\_i1,q\_j2}\cdot (\alpha Y1_{q\_i1}-s_{q\_Y}\cdot a1_{q\_i1})\cdot \\ b2_{q\_j2}-s_{q\_Y}\cdot r_{q\_Y}\end{array}\right\} + \rho_Y,$$

and transmits the value to the party X; and a party-Z misuse detection step in which the party Z receives a value $\gamma_X$ from the party X and a value $\gamma'_X$ and the number sequence $(\alpha X1_{q\_0}-s_{q\_X}\cdot a1_{q\_0}, \ldots, \alpha X1_{q\_na1-1}-s_{q\_Y}\cdot a1_{q\_na1-1})$ from the party Y, computes $$\sum_{i1,j0,q}\left\{\begin{array}{c}e10_{q\_i1,q\_j0}\cdot (\alpha X1_{q\_i1}-s_{q\_X}\cdot a1_{q\_i1})\cdot \\ b0_{q\_j0}+s_{q\_X}\cdot c_{q\_X}\end{array}\right\} - \gamma_X + \gamma'_X,$$

ends the processing by outputting data indicating a misuse detection if the result of the computation is not 0, and outputs the values $c_{q\_2}$ and $c_{q\_0}$ if the result of the computation is 0.

5. A secure sum-of-product computation method used for performing, in parallel, a total of m sets of sum-of-product computations of data strings $A_{q\_0}=(a0_{q\_0}, \ldots, a0_{q\_na0-1})$ and $A_{q\_1}=(a1_{q\_0}, \ldots, a1_{q\_na1-1})$ and $B_{q\_0}=(b0_{q\_0}, \ldots b0_{q\_na0-1})$ and $B_{q\_1}=(b1_{q\_0}, \ldots b1_{q\_nb1-1})$ by cooperative computation by three computation apparatuses, which are a party X, a party Y and a party Z, the sum-of-product computations being expressed as $$\sum_{q\_i0,q\_j1}(e01_{q\_i0,q\_j1}\cdot a0_{q\_i0}\cdot b1_{q\_j1}) + \sum_{q\_i1,q\_j0}(e10_{q\_i1,q\_j0}\cdot a1_{q\_i1}\cdot b0_{q\_j0})$$

where $q=0, \ldots, m-1$, m represents an integer equal to or greater than 1, na0, na1, nb0 and nb1 represent natural numbers, $i0=0, \ldots, na0-1$, $i1=0, \ldots, na1-1$, $j0=0, \ldots, nb0-1$, and $j1=0, \ldots, nb1-1$, and $e01_{q\_i0,q\_j1}$ and $e10_{q\_i1,q\_j0}$ represent any numbers, and the data strings $A_{q\_0}, A_{q\_1}, B_{q\_0}$ and $B_{q\_1}$ being input to the party X, the data strings $A_{q\_1}$ and $B_{q\_1}$ being input to the party Y, and the data strings $A_{q\_0}$ and $B_{q\_0}$ being input to the party Z, the secure sum-of-product computation method comprising:

a party-X random number generation step in which the party X generates numbers $c_{q\_1}$ and $\gamma_1$ and number sequences $(\alpha 1_{q\_0}, \ldots, \alpha 1_{q\_nb0-1})$ and $(\beta 1_{q\_0}, \ldots, \beta 1_{q\_na0-1})$ and transmits the numbers and the number sequences to the party Y;

a party-Y random number generation step in which the party Y generates a number $s_q$ and transmits the number to the party Z;

a party-X computation step in which the party X computes values $c_{q\_0}$ and $\gamma_0$ according to $$c_{q\_0} = \sum_{q\_i0,q\_j1}(e01_{q\_i0,q\_j1}\cdot a0_{q\_i0}\cdot b1_{q\_j1}) + \sum_{q\_i1,q\_j0}(e10_{q\_i1,q\_j0}\cdot a1_{q\_i1}\cdot b0_{q\_j0}) - c_{q\_1}$$

$$\gamma_0 = \sum_{i0,j0,q}(a0_{q\_i0}\cdot \beta 1_{q\_i0}+b0_{q\_j0}\cdot \alpha 1_{q\_j0}) - \gamma_1$$

and transmits the values to the party Z;

a party-Y computation step in which the party Y receives the numbers $c_{q\_1}$ and $\gamma_1$ and the number sequences $(\alpha 1_{q\_0}, \ldots, \alpha 1_{q\_nb0-1})$ and $(\beta 1_{q\_0}, \ldots, \beta 1_{q\_na0-1})$ from the party X, computes number sequences $(\alpha 0_{q\_0}, \ldots, \alpha 0_{q\_nb0-1})$ and $(\beta 0_{q\_0}, \ldots, \beta 0_{q\_na0-1})$ and a value $\gamma'$ according to $$\alpha 0_{q\_j0} = \sum_{q,q\_i1} s_q \cdot e10_{q\_i1,q\_j0}\cdot a1_{q\_i1} - \alpha 1_{q\_j0}$$

$$\beta 0_{q\_i0} = \sum_{q,q\_j1} s_q \cdot e01_{q\_i0,q\_j1}\cdot b1_{q\_j1} - \beta 1_{q\_i0},$$

$$\gamma' = \sum_q s_q \cdot c_{q\_1} - \gamma_1$$

and transmits the number sequences and the value to the party Z; and a misuse detection step in which the party Z receives the values $c_{q\_0}$ and $\gamma_0$ from the party X and the number $s_q$, the number sequences $(\alpha 0_{q\_0}, \ldots, \alpha 0_{q\_nb0-1})$ and $(\beta 0_{q\_0}, \ldots, \beta 0_{q\_na0-1})$ and the value $\gamma'$ from the party Y, computes $$\sum_q s_q\cdot c_{q\_0} - \gamma_0 - \sum_{i0,j0,q}(a0_{q\_i0}\cdot \beta 0_{q\_i0}+b0_{q\_j0}\cdot \alpha 0_{q\_j0}) + \gamma',$$

and ends the processing by outputting data indicating a misuse detection if the result of the computation is not 0, wherein if the result of the computation in the misuse detection step is 0, the party X outputs the values $c_{q\_0}$ and $c_{q\_1}$, the party Y outputs the value $c_{q\_1}$ and 0, and the party Z outputs 0 and the value $c_{q\_0}$.

6. A secure sum-of-product computation method used for performing, in parallel, a total of m sets of sum-of-product computations of data a0 and a1 and data strings $B_{q\_0}=(b0_{q\_0}, \ldots, b0_{q\_nb0-1})$ and $B_{q\_1}=(b1_{q\_0}, \ldots, b1_{q\_nb1-1})$ by cooperative computation by three computation apparatuses, which are a party X, a party Y and a party Z, the sum-of-product computations being expressed as $$\sum_{q\_i} a0 \cdot b1_{q\_i} + \sum_{q\_i} a1 \cdot b0_{q\_i}$$

where q=0, . . . , m−1, m represents an integer equal to or greater than 1, n represents a natural number, and i=0, . . . , n−1, and the data a0 and a1 and the data strings $B_{q\_0}$ and $B_{q\_1}$ being input to the party X, the data a1 and the data string $B_{q\_1}$ being input to the party Y, and the data a0 and the data string $B_{q\_0}$ being input to the party Z, the secure sum-of-product computation method comprising:

a party-X random number generation step in which the party X generates numbers $c_{q\_1}$ and $\gamma_1$, a number sequence $(\alpha 1_{q\_0}, \ldots, \alpha 1_{q\_n-1})$ and a number $\beta 1$ and transmits the numbers and the number sequence to the party Y;

a party-Y random number generation step in which the party Y generates a number $s_q$ and transmits the number to the party Z;

a party-X computation step in which the party X computes values $c_{q\_0}$ and $\gamma_0$ according to $$c_{q\_0} = \sum_{q\_i} a0 \cdot b1_{q\_i} + \sum_{q\_i} a1 \cdot b0_{q\_i} - c_{q\_1}$$

$$\gamma_0 = a0 \cdot \beta 1 + \sum_{i,q} b0_{q\_i} \cdot \alpha 1_{q\_i} - \gamma_1$$

and transmits the values to the party Z;

a party-Y computation step in which the party Y receives the numbers $c_{q\_1}$ and $\gamma_1$, the number sequence $(\alpha 1_{q\_0}, \ldots, \alpha 1_{q\_n-1})$ and the number $\beta 1$ from the party X, computes a number sequence $(\alpha 0_{q\_0}, \ldots, \alpha 0_{q\_n-1})$ and numbers $\beta 0$ and $\gamma'$ according to $$\alpha 0_{q\_i} = \sum_q s_q \cdot a1 - \alpha 1_{q\_i}$$

$$\beta 0 = \sum_{i,q} s_q \cdot b1_{q\_i} - \beta 1$$

$$\gamma' = \sum_q s_q \cdot c_{q\_1} - \gamma_1,$$

and transmits the number sequence and the values to the party Z; and a misuse detection step in which the party Z receives the values $c_{q\_0}$ and $\gamma_0$ from the party X and the number $s_q$, the number sequence $(\alpha 0_{q\_0}, \ldots, \alpha 0_{q\_n-1})$ and the values $\beta 0$ and $\gamma'$ from the party Y, computes $$\sum_q s_q \cdot c_{q\_0} - \gamma_0 - a0 \cdot \beta 0 - \sum_{i,q} b0_{q\_i} \cdot \alpha 0_{q\_i} + \gamma',$$

and ends the processing by outputting data indicating a misuse detection if the result of the computation is not 0, wherein if the result of the computation in the misuse detection step is 0, the party X outputs the values $c_{q\_0}$ and $c_{q\_1}$, the party Y outputs the value $c_{q\_1}$ and 0, and the party Z outputs 0 and the value $c_{q\_0}$.

7. A secure sum-of-product computation system used for performing a sum-of-product computation of data strings $A_0=(a0_0, \ldots, a0_{na0-1})$, $A_1=(a1_0, \ldots, a1_{na1-1})$ and $A_2=(a2_0, \ldots a2_{na2-1})$ and $B_0=(b0_0, \ldots, b0_{nb0-1})$, $B_1=(b1_0, \ldots, b1_{nb1-1})$ and $B_2=(B2_0, \ldots, b2_{nb2-1})$ by cooperative computation by three computation apparatuses, which are a party X, a party Y and a party Z, the sum-of-product computation being expressed as $$\sum_{i0,j0} (e00_{i0,j0} \cdot a0_{i0} \cdot b0_{j0}) +$$

$$\sum_{i0,j1} (e01_{i0,j0} \cdot a0_{i0} \cdot b1_{j1}) + \sum_{i1,j0} (e10_{i1,j0} \cdot a1_{i1} \cdot b0_{j0}) +$$

$$\sum_{i1,j1} (e11_{i1,j1} \cdot a1_{i1} \cdot b1_{j1}) + \sum_{i1,j2} (e12_{i1,j2} \cdot a1_{i1} \cdot b2_{j2}) +$$

$$\sum_{i2,j1} (e21_{i2,j1} \cdot a2_{i2} \cdot b1_{j1}) + \sum_{i2,j2} (e22_{i2,j2} \cdot a2_{i2} \cdot b2_{j2}) +$$

$$\sum_{i2,j0} (e20_{i2,j0} \cdot a2_{i2} \cdot b0_{j0}) + \sum_{i0,j2} (e02_{i0,j2} \cdot a0_{i0} \cdot b2_{j2})$$

where na0, na1, na2, nb0, nb1 and nb2 represent natural numbers, i0=0, . . . , na0-1, i1=0, . . . , na1-1, i2=0, . . . , na2-1, j0=0, . . . , nb0-1, j1=0, . . . , nb1-1, and j2=0, . . . , nb2-1, and $e01_{i0,j1}$, $e10_{i1,j0}$, $e00_{i0,j0}$, $e11_{i1,j1}$, $e12_{i1,j2}$, $e21_{i2,j1}$, $e22_{i2,j2}$, $e20_{i2,j0}$ and $e02_{i0,j2}$ represent any numbers, and the data strings $A_0$, $A_1$, $B_0$ and $B_1$ being input to the party X, the data strings $A_1$, $A_2$, $B_1$ and $B_2$ being input to the party Y, and the data strings $A_2$, $A_0$, $B_2$ and $B_0$ being input to the party Z, wherein the party X comprises party-X random number generation means, party-X first computation means and party-X second computation means, the party-X random number generation means generates a number $r_X$ and transmits the number to the party Y, the party-X first computation means computes a value $c_X$ according to $$c_X = \sum_{i0,j1} (e01_{i0,j1} \cdot a0_{i0} \cdot b1_{j1}) + \sum_{i1,j0} (e10_{i1,j0} \cdot a1_{i1} \cdot b0_{j0}) + r_X$$

and transmits the value to the party Z, and the party-X second computation means receives a number $r_Z$ from the party Z and a value $c_Y$ from the party Y, computes values $c_0$ and $c_1$ according to $$c_0 = \sum_{i0,j0} (e00_{i0,j0} \cdot a0_{i0} \cdot b0_{j0}) + c_X - r_Z$$

$$c_1 = \sum_{i1,j1} (e11_{i1,j1} \cdot a1_{i1} \cdot b1_{j1}) + c_Y - r_X,$$

the party Y comprises party-Y random number generation means, party-Y first computation means and party-Y second computation means, the party-Y random number generation means generates a number $r_Y$ and transmits the number to the party Z, the party-Y first computation means computes the value $c_Y$ according to $$c_Y = \sum_{i1,j2}(e12_{i1,j2}\cdot a1_{i1}\cdot b2_{j2}) + \sum_{i2,j1}(e21_{i2,j1}\cdot a2_{i2}\cdot b1_{j1}) + r_Y$$

and transmits the value to the party X, and the party-Y second computation means receives the number $r_X$ from the party X and a value $c_Z$ from the party Z, computes values $c_1$ and $c_2$ according to $$c_1 = \sum_{i1,j1}(e11_{i1,j1}\cdot a1_{i1}\cdot b1_{j1}) + c_Y - r_X$$

$$c_2 = \sum_{i2,j2}(e22_{i2,j2}\cdot a2_{i2}\cdot b2_{j2}) + c_Z - r_Y, \text{ and}$$

the party Z comprises party-Z random number generation means, party-Z first computation means and party-Z second computation means, the party-Z random number generation means generates the number $r_Z$ and transmits the number to the party X, the party-Z first computation means computes the value $c_Z$ according to $$c_Z = \sum_{i2,j0}(e20_{i2,j0}\cdot a2_{i2}\cdot b0_{j0}) + \sum_{i0,j2}(e02_{i0,j2}\cdot a0_{i0}\cdot b2_{j2}) + r_Z$$

and transmits the value to the party Y, and the party-Z second computation means receives the number $r_Y$ from the party Y and the value $c_X$ from the party X, computes the values $c_0$ and $c_2$ according to $$c_0 = \sum_{i0,j0}(e00_{i0,j0}\cdot a0_{i0}\cdot b0_{j0}) + c_X - r_Z$$

$$c_2 = \sum_{i2,j2}(e22_{i2,j2}\cdot a2_{i2}\cdot b2_{j2}) + c_Z - r_Y.$$

8. A secure sum-of-product computation system used for performing, in parallel, a total of m sets of sum-of-product computations of data strings $A_{q\_0}=(a0_{q\_0},\ldots,a0_{q\_na0-1})$, $A_{q\_1}=(a1_{q\_0},\ldots,a1_{q\_na1-1})$ and $A_{q\_0}=(a2_{q\_0},\ldots,a2_{q\_na2-1})$ and $B_{q\_0}=(b0_{q\_0},\ldots,b0_{q\_nb0-1})$, $B_{q\_1}=(b1_{q\_0},\ldots,b1_{q\_nb1-1})$ and $B_{q\_2}=(b2_{q\_0},\ldots,b2_{q\_nb2-1})$ by cooperative computation by three computation apparatuses, which are a party X, by a party Y and a party Z, the sum-of-product computations being expressed as $$\sum_{q\_i0,q\_j0}(e00_{q\_i0,q\_j0}\cdot a0_{q\_i0}\cdot b0_{q\_j0}) +$$
$$\sum_{q\_i0,q\_j1}(e01_{q\_i0,q\_j1}\cdot a0_{q\_i0}\cdot b1_{q\_j1}) + \sum_{q\_i1,q\_j0}(e10_{q\_i1,q\_j0}\cdot a1_{q\_i1}\cdot b0_{q\_j0}) +$$
$$\sum_{q\_i1,q\_j1}(e11_{q\_i1,q\_j1}\cdot a1_{q\_i1}\cdot b1_{q\_j1}) + \sum_{q\_i1,q\_j2}(e12_{q\_i1,q\_j2}\cdot a1_{q\_i1}\cdot b2_{q\_j2}) +$$
$$\sum_{q\_i2,q\_j1}(e21_{q\_i2,q\_j1}\cdot a2_{q\_i2}\cdot b1_{q\_j1}) + \sum_{q\_i2,q\_j2}(e22_{q\_i2,q\_j2}\cdot a2_{q\_i2}\cdot b2_{q\_j2}) +$$
$$\sum_{q\_i2,q\_j0}(e20_{q\_i2,q\_j0}\cdot a2_{q\_i2}\cdot b0_{q\_j0}) + \sum_{q\_i0,q\_j2}(e02_{q\_i0,q\_j2}\cdot a2_{q\_i2}\cdot b0_{q\_i0})$$

where $q=0,\ldots,m-1$, m represents an integer equal to or greater than 1, na0, na1, na2, nb0, nb1 and nb2 represent natural numbers, $i0=0,\ldots,na0-1, i1=0,\ldots,na1-1, i2=0,\ldots,na2-1, j0=0,\ldots,nb0-1, j1=0,\ldots,nb1-1$, and $j2=0,\ldots,nb2-1$, and $e01_{q\_i0,q\_j1}$, $e10_{q\_i1,q\_j0}$, $e00_{q\_i0,q\_j0}$, $e11_{q\_i1,q\_j1}$, $e12_{q\_i1,q\_j2}$, $e21_{q\_i2,q\_j1}$, $e22_{q\_i2,q\_j2}$, $e20_{q\_i2,q\_j0}$ and $e02_{q\_i0,q\_j2}$ represent any numbers, and the data strings $A_{q\_0}, A_{q\_1}, B_{q\_0}$ and $B_{q\_1}$ being input to the party X, the data strings $A_{q\_1}, A_{q\_2}, B_{q\_1}$ and $B_{q\_2}$ being input to the party Y, and the data strings $A_{q\_2}, A_{q\_0}, B_{q\_2}$ and $B_{q\_0}$ being input to the party Z, wherein the party X comprises party-X first random number generation means, party-X first computation means, party-X second computation means, the party-X first random number generation means generates a number $r_{q\_X}$ and transmits the number to the party Y, the party-X first computation means computes a value $c_{q\_X}$ according to $$c_{q\_X} = \sum_{q\_i0,q\_j1}(e01_{q\_i0,q\_j1}\cdot a0_{q\_i0}\cdot b1_{q\_j1}) +$$
$$\sum_{q\_i1,q\_j0}(e10_{q\_i1,q\_j0}\cdot a1_{q\_i1}\cdot b0_{q\_j0}) + r_{q\_X}$$

and transmits the value to the party Z, the party-X second computation means receives a number $r_{q\_Z}$ from the party Z and a value $c_{q\_Y}$ from the party Y, computes values $c_{q\_0}$ and $c_{q\_1}$ according to $$c_{q\_0} = \sum_{q\_i0,q\_j0}(e00_{q\_i0,q\_j0}\cdot a0_{q\_i0}\cdot b0_{q\_j0}) + c_{q\_X} - r_{q\_Z}$$

$$c_{q\_1} = \sum_{q\_i1,q\_j1}(e11_{q\_i1,q\_j1}\cdot a1_{q\_i1}\cdot b1_{q\_j1}) + c_{q\_Y} - r_{q\_X},$$

the party Y comprises party-Y first random number generation means, party-Y first computation means, and party-Y second computation means, the party-Y first random number generation means generates a number $r_{q\_Y}$ and transmits the number to the party Z, the party-Y first computation means computes the value $c_{q\_Y}$ according to $$c_{q\_Y} = \sum_{q\_i1,q\_j2}(e12_{q\_i1,q\_j2}\cdot a1_{q\_i1}\cdot b2_{q\_j2}) +$$
$$\sum_{q\_i2,q\_j1}(e21_{q\_i2,q\_j1}\cdot a2_{q\_i2}\cdot b1_{q\_j1}) + r_{q\_Y}$$

and transmits the value to the party X, the party-Y second computation means receives the number $r_{q\_X}$ from the party X and a value $c_{q\_Z}$ from the party Z, computes values $c_{q\_1}$ and $c_{q\_2}$ according to $$c_{q\_1} = \sum_{q\_i1,q\_j1}(e11_{q\_i1,q\_j1}\cdot a1_{q\_i1}\cdot b1_{q\_j1}) + c_{q\_Y} - r_{q\_X}$$

$$c_{q\_2} = \sum_{q\_i2,q\_j2}(e22_{q\_i2,q\_j2}\cdot a2_{q\_i2}\cdot b2_{q\_j2}) + c_{q\_Z} - r_{q\_Y},$$

the party Z comprises party-Z first random number generation means, party-Z first computation means, and party-Z second computation means, the party-Z first random number generation means generates the number $r_{q\_Z}$ and transmits the number to the party X, the party-Z first computation means computes the value $c_{q\_Z}$ according to $$c_{q\_Z} = \sum_{q\_i2,q\_j0} (e20_{q\_i2,q\_j0} \cdot a2_{q\_i2} \cdot b0_{q\_j0}) +$$

$$\sum_{q\_i0,q\_j2} (e02_{q\_i0,q\_j2} \cdot a2_{q\_i2} \cdot b0_{q\_i0}) + r_{q\_Z}$$

and transmits the value to the party Y, the party-Z second computation means receives the number $r_{q\_Y}$ from the party Y and the value $c_{q\_X}$ from the party X, computes the values $c_{q\_0}$ and $c_{q\_2}$ according to $$c_{q\_0} = \sum_{q\_i0,q\_j0} (e00_{q\_i0,q\_j0} \cdot a0_{q\_i0} \cdot b0_{q\_j0}) + c_{q\_X} - r_{q\_Z}$$

$$c_{q\_2} = \sum_{q\_i2,q\_j2} (e22_{q\_i2,q\_j2} \cdot a2_{q\_i2} \cdot b2_{q\_j2}) + c_{q\_Z} - r_{q\_Y},$$

9. The secure sum-of-product computation system according to claim 8, wherein the parties X and Y previously sharing a number $s_{q\_Z}$, the parties Y and Z previously sharing a number $s_{q\_X}$, and the parties Z and X previously sharing a number $s_{q\_Y}$, the party X further comprises party-X second random number generation means, party-X third computation means, party-X fourth computation means and party-X misuse detection means the party-X second random number generation means generates a number $\rho_X$ and transmits the number to the party Y, and generates number sequences $(\alpha Z0_{q\_0}, \ldots, \alpha Z0_{q\_na0-1})$ and $(\beta Z0_{q\_0}, \ldots, \beta Z0_{q\_nb0-1})$ and transmits the number sequences to the party Z, the party-X third computation means computes number sequences $(\alpha Z0_{q\_0}-s_{q\_Z} \cdot a0_{q\_0}, \ldots, \alpha Z0_{q\_na0-1}-s_{q\_Z} \cdot a0_{q\_na0-1})$ and $(\beta Z0_{q\_0}-s_{q\_Z} \cdot b0_{q\_0}, \ldots, \beta Z0_{q\_nb0-1}-s_{q\_Z} \cdot b0_{q\_nb0-1})$ and transmits the number sequences to the party Y, receives number sequences $(\alpha X1_{q\_0}, \ldots, \alpha X1_{q\_na1-1})$ and $(\beta X1_{q\_0}, \ldots, \beta X1_{q\_nb1-1})$ from the party Y, computes a value $$\gamma_X = \sum_{i1,j0,q} (e10_{q\_i1,q\_j0} \cdot \alpha X1_{q\_i1} \cdot b0_{q\_j0}) +$$

$$\sum_{i0,j1,q} (e01_{q\_i0,q\_j1} \cdot a0_{q\_i0} \cdot \beta X1_{q\_j1}) + \rho_X,$$

and transmits the value to the party Z, the party-X fourth computation means receives a value $\rho_Z$ from the party Z, computes a value $$\gamma'_Z = \sum_q (-s_{q\_Z} \cdot r_{q\_Z}) + \rho_Z,$$

and transmits the value to the party Y, and the party-X misuse detection means receives a value $\gamma_Y$ from the party Y and a value $\gamma'_Y$ and number sequences $(\alpha Y2_{q\_0}-s_{q\_Y} \cdot a2_{q\_0}, \ldots, \alpha Y2_{q\_na2-1}-s_{q\_Y} \cdot a2_{q\_na2-1})$ and $(\beta Y2_{q\_0}-s_{q\_Y} \cdot b2_{q\_0}, \ldots, \beta Y2_{q\_nb2-1}-s_{q\_Y} \cdot b2_{q\_nb2-1})$ from the party Z, computes $$\sum_{i1,i2,j1,j2,q} \{e21_{q\_i2,q\_j1} \cdot (\alpha Y2_{q\_i2} - s_{q\_Y} \cdot a2_{q\_i2}) \cdot b1_{q\_j1} +$$

$$e10_{q\_i1,q\_j0} \cdot (\beta Y2_{q\_j2} - s_{q\_Y} \cdot b2_{q\_j2}) \cdot a1_{q\_i1} + s_{q\_Y} \cdot c_{q\_Y}\} - \gamma_Y + \gamma'_Y,$$

ends the processing by outputting data indicating a misuse detection if the result of the computation is not 0, and outputting the values $c_{q\_0}$ and $c_{q\_1}$ if the result of the computation is 0, the party Y further comprises party-Y second random number generation means, party-Y third computation means, party-Y fourth computation means and party-Y misuse detection means, the party-Y second random number generation means generates a number $\rho_Y$ and transmits the number to the party Z, and generates the number sequences $(\alpha X1_{q\_0}, \ldots, \alpha X1_{q\_na1-1})$ and $(\beta X1_{q\_0}, \ldots, \beta X1_{q\_nb1-1})$ and transmits the number sequences to the party X, the party-Y third computation means computes number sequences $(\alpha X1_{q\_0}-s_{q\_X} \cdot a1_{q\_0}, \ldots, \alpha X1_{q\_na1-1}-s_{q\_X} \cdot a1_{q\_na1-1})$ and $(\beta X1_{q\_0} \cdot s_{q\_X} \cdot b1_{q\_0}, \ldots, \beta X1_{q\_nb1-1}-s_{q\_X} \cdot b1_{q\_nb1-1})$ and transmits the number sequences to the party Z, receives number sequences $(\alpha Y2_{q\_0}, \ldots, \alpha Y2_{q\_na2-1})$ and $(\beta Y2_{q\_0}, \ldots, \beta Y2_{q\_nb2-1})$ from the party Z, computes a value $$\gamma_Y = \sum_{i2,j1,q} (e21_{q\_i2,q\_j1} \cdot \alpha Y2_{q\_i2} \cdot b1_{q\_j1}) +$$

$$\sum_{i1,j2,q} (e12_{q\_i1,q\_j2} \cdot a1_{q\_i1} \cdot \beta Y2_{q\_j2}) + \rho_Y,$$

and transmits the value to the party X, the party-Y fourth computation means receives the number $\rho_X$ from the party X, computes a value $$\gamma'_X = \sum_q (-s_{q\_X} \cdot r_{q\_X}) + \rho_X,$$

and transmits the value to the party Z, the party-Y misuse detection means receives a value $\gamma'_Z$ and the number sequences $(\alpha Z0_{q\_0}-s_{q\_Z} \cdot a0_{q\_0}, \ldots, \alpha Z0_{q\_na0-1}-s_{q\_Z} \cdot a0_{q\_na0-1})$ and $(\beta Z0_{q\_0}-s_{q\_Z} \cdot b0_{q\_0}, \ldots, \beta Z0_{q\_nb0-1}-s_{q\_Z} \cdot b0_{q\_nb0-1})$ from the party X and a value $\gamma_Z$ from the party Z, computes $$\sum_{i0,i2,j0,j2,q} \{e02_{q\_i0,q\_j2} \cdot (\alpha Z0_{q\_i0} - s_{q\_Z} \cdot a0_{q\_i0}) \cdot b2_{q\_j2} +$$

$$e20_{q\_i2,q\_j0} \cdot (\beta Z0_{q\_j0} - s_{q\_Z} \cdot b0_{q\_j0}) \cdot a2_{q\_i2} + s_{q\_Z} \cdot c_{q\_Z}\} - \gamma_Z + \gamma'_Z,$$

ends the processing by outputting data indicating a misuse detection if the result of the computation is not 0, and outputs the values $c_{q\_1}$ and $c_{q\_2}$ if the result of the computation is 0, and the party Z further comprises party-Z second random number generation means, party-Z third computation means, party-Z fourth computation means and party-Z misuse detection means, the party-Z second random number generation means generates the number $\rho_Z$ and transmits the number to the party X, and generates the number sequences $(\alpha Y2_{q\_0}, \ldots, \alpha Y2_{q\_na2-1})$ and $(\beta Y2_{q\_0}, \ldots, \beta Y2_{q\_nb2-1})$ and transmits the number sequences to the party Y, the party-Z third computation means computes the number sequences $(\alpha Y2_{q\_0}-s_{q\_Y}\cdot a2_{q\_0}, \ldots, \alpha Y2_{q\_na2-1}-s_{q\_Y}\cdot a2_{q\_na2-1})$ and $(\beta Y2_{q\_0}-s_{q\_Y}\cdot b2_{q\_0}, \ldots, \beta Y2_{q\_nb2-1}-s_{q\_Y}\cdot b2_{q\_nb2-1})$ and transmits the number sequences to the party X, receives the number sequences $(\alpha Z0_{q\_0}, \ldots, \alpha Z0_{q\_na0-1})$ and $(\beta Z0_{q\_0}, \ldots, \beta Z0_{q\_nb0-1})$ from the party X, computes the value $$\gamma_Z = \sum_{i0,j2,q} (e02_{q\_i0,q\_j2} \cdot \alpha Z0_{q\_i0} \cdot b2_{q\_j0}) + \sum_{i2,j0,q} (e20_{q\_i2,q\_j0} \cdot a2_{q\_i2} \cdot \beta Z0_{q\_j0}) + \rho_Z,$$

and transmits the value to the party Y, the party-Z fourth computation means receives the number $\rho_Y$ from the party Y, computes a value $$\gamma'_Y = \sum_q (-s_{q\_Y} \cdot r_{q\_Y}) + \rho_Y,$$

and transmits the value to the party X, and the party-Z misuse detection means receives a value $\gamma_X$ from the party X and a value $\gamma'_X$ and the number sequences $(\alpha X1_{q\_0}-s_{q\_X}\cdot a1_{q\_0}, \ldots, \alpha X1_{q\_na1-1}-s_{q\_X}\cdot a1_{q\_na1-1})$ and $(\beta X1_{q\_0}-s_{q\_X}\cdot b1_{q\_0}, \ldots, \beta X1_{q\_nb1-1}-s_{q\_X}\cdot b1_{q\_nb1-1})$ from the party Y, computes $$\sum_{i0,i1,j0,j1,q} \{e10_{q\_i1,q\_j0} \cdot (\alpha X1_{q\_i1} - s_{q\_X} \cdot a1_{q\_i1}) \cdot b0_{q\_j0} + e01_{q\_i0,q\_j1} \cdot (\beta X1_{q\_j1} - s_{q\_X} \cdot b1_{q\_j1}) \cdot a0_{q\_i0} + s_{q\_X} \cdot c_{q\_X}\} - \gamma_X + \gamma'_X,$$

ends the processing by outputting data indicating a misuse detection if the result of the computation is not 0, and outputs the values $c_{q\_2}$ and $c_{q\_0}$ if the result of the computation is 0.

10. The secure sum-of-product computation system according to claim 8, wherein the parties X and Y previously sharing a number $s_{q\_Z}$, the parties Y and Z previously sharing a number $s_{q\_X}$, and the parties Z and X previously sharing a number $s_{q\_Y}$, the party X further comprises party-X second random number generation means, party-X third computation means, party-X fourth computation means and party-X misuse detection means, the party-X second random number generation means generates a number sequence $(\alpha Y1_{q\_0}, \ldots, \alpha Y1_{q\_na1-1})$ and a number $\rho_X$ and transmits the number sequence and the number to the party Y, and generates a number sequence $(\alpha Z0_{q\_0}, \ldots, \alpha Z0_{q\_na0-1})$ and transmits the number sequence to the party Z, the party-X third computation means computes a number sequence $(\alpha Z0_{q\_0}-s_{q\_Z}\cdot a0_{q\_0}, \ldots, \alpha Z0_{q\_na0-1}-s_{q\_Z}\cdot a0_{q\_na0-1})$ and transmits the number sequence to the party Y, receives a number sequence $(\alpha X1_{q\_0}, \ldots, \alpha X1_{q\_na1-1})$ from the party Y and a number sequence $(\alpha X0_{q\_0}, \ldots, \alpha X0_{q\_na0-1})$ from the party Z, computes a number sequence $(\alpha Y1_{q\_0}-s_{q\_Y}\cdot a1_{q\_0}, \ldots, \alpha Y1_{q\_na1-1}-s_{q\_Y}\cdot a1_{q\_na1-1})$ and a value $$\gamma_X = \sum_{i0,j1,q} (e01_{q\_i0,q\_j1} \cdot \alpha X0_{q\_i0} \cdot b1_{q\_j1}) + \sum_{i1,j0,q} (e10_{q\_i1,q\_j0} \cdot \alpha X1_{q\_i1} \cdot b0_{q\_j0}) \cdot \rho_X,$$

and transmits the number sequence and the value to the party Z, the party-X fourth computation means receives a number sequence $(\alpha Z2_{q\_0}-s_{q\_Z}\cdot a2_{q\_0}, \ldots, \alpha Z2_{q\_na2-1}-s_{q\_Z}\cdot a2_{q\_na2-1})$ from the party Y and a value $\rho_Z$ from the party Z, computes a value $$\gamma'_Z = \sum_{i2,j0,q} \left\{ \frac{e20_{q\_i2,q\_j0} \cdot (\alpha Z2_{q\_i2} - s_{q\_Z} \cdot a2_{q\_i2}) \cdot}{b0_{q\_j0} + s_{q\_Z} \cdot r_{q\_Z}} \right\} + \rho_Z,$$

and transmits the value to the party Y, and the party-X misuse detection means receives a value $\gamma_Y$ from the party Y and a value $\gamma'_Y$ and a number sequence $(\alpha Y2_{q\_0}-s_{q\_Y}\cdot a2_{q\_0}, \ldots, \alpha Y2_{q\_na2-1}-s_{q\_Y}\cdot a2_{q\_na2-1})$ from the party Z, computes $$\sum_{i2,j1,q} \left\{ \frac{e21_{q\_i2,q\_j1} \cdot (\alpha Y2_{q\_i2} - s_{q\_Y} \cdot a2_{q\_i2}) \cdot}{b1_{q\_j1} + s_{q\_Y} \cdot c_{q\_Y}} \right\} - \gamma_Y + \gamma'_Y,$$

ends the processing by outputting data indicating a misuse detection if the result of the computation is not 0, and outputting the values $c_{q\_0}$ and $c_{q\_1}$ if the result of the computation is 0, the party Y further comprises party-Y second random number generation means, party-Y third computation means, party-Y fourth computation means and party-Y misuse detection means, the party-Y second random number generation means generates a number sequence $(\alpha Z2_{q\_0}, \ldots, \alpha Z2_{q\_na2-1})$ and a number $\rho_Y$ and transmits the number sequence and the number to the party Z, and generates the number sequence $(\alpha X1_{q\_0}, \ldots, \alpha X1_{q\_na1-1})$ and transmits the number sequence to the party X, the party-Y third computation means computes a number sequence $(\alpha X1_{q\_0}-s_{q\_X}\cdot a1_{q\_0}, \ldots, \alpha X1_{q\_na1-1}-s_{q\_X}\cdot a1_{q\_na1-1})$ and transmits the number sequence to the party Z, receives the number sequence $(\alpha Y1_{q\_0}, \ldots, \alpha Y1_{q\_na1-1})$ from the party X and a number sequence $(\alpha Y2_{q\_0}, \ldots, \alpha Y2_{q\_na2-1})$ from the party Z, computes the number sequence $(\alpha Z2_{q\_0}-s_{q\_Z}\cdot a2_{q\_0}, \ldots, \alpha Z2_{q\_na2-1}-s_{q\_Z}\cdot a2_{q\_na2-1})$ and the value $$\gamma_Y = \sum_{i1,j2,q} (e12_{q\_i1,q\_j2} \cdot \alpha Y1_{q\_i1} \cdot b2_{q\_j2}) + \sum_{i2,j1,q} (e21_{q\_i2,q\_j1} \cdot \alpha Y2_{q\_i2} \cdot b1_{q\_j1}) + \rho_Y,$$

and transmits the number sequence and the value to the party X, the party-Y fourth computation means receives the number $\rho_X$ from the party X and a number sequence $(\alpha X0_{q\_0}-s_{q\_X}\cdot a0_{q\_0}, \ldots, \alpha X0_{q\_na0-1}-s_{q\_X}\cdot a0_{q\_na0-1})$ from the party Z, computes a value $$\gamma'_X = \sum_{i0,j1,q} \left\{ \begin{array}{c} e01_{q\_i0,q\_j1}\cdot(\alpha X0_{q\_i0}-s_{q\_X}\cdot a0_{q\_i0})\cdot \\ b1_{q\_j1}-s_{q\_X}\cdot r_{q\_X} \end{array} \right\} + \rho_X,$$

and transmits the value to the party Z, and the party-Y misuse detection means receives the value $\gamma'_Z$ and the number sequence $(\alpha Z0_{q\_0}-s_{q\_Z}\cdot a0_{q\_0}, \ldots, \alpha Z0_{q\_na0-1}-s_{q\_Z}\cdot a0_{q\_na0-1})$ from the party X and a value $\gamma_Z$ from the party Z, computes $$\sum_{i0,j2,q} \{e02_{q\_i0,q\_j2}\cdot(\alpha Z0_{q\_i0}-s_{q\_Z}\cdot a0_{q\_i0})\cdot b2_{q\_j2}+s_{q\_Z}\cdot c_{q\_Z}\}-\gamma_Z+\gamma'_Z,$$

ends the processing by outputting data indicating a misuse detection if the result of the computation is not 0, and outputs the values $c_{q\_1}$ and $c_{q\_2}$ if the result of the computation is 0, and the party Z further comprises party-Z second random number generation means, party-Z third computation means, party-Z fourth computation means and party-Z misuse detection means, the party-Z second random number generation means generates the number sequence $(\alpha X0_{q\_0}, \ldots, \alpha X0_{q\_na0-1})$ and the number $\rho_Z$ and transmits the number sequence and the number to the party X, and generates the number sequence $(\alpha Y2_{q\_0}, \ldots, \alpha Y2_{q\_na2-1})$ and transmits the number sequence to the party Y, the party-Z third computation means computes the number sequence $(\alpha Y2_{q\_0}-s_{q\_Y}\cdot a2_{q\_0}, \ldots, \alpha Y2_{q\_na2-1}-s_{q\_Y}\cdot a2_{q\_na2-1})$ and transmits the number sequence to the party X, receives the number sequence $(\alpha Z0_0, \ldots, \alpha Z0_{q\_na0-1})$ from the party X and the number sequence $(\alpha Z2_{q\_0}, \ldots, \alpha Z2_{q\_na2-1})$ from the party Y, computes the number sequence $(\alpha X0_{q\_0}-s_{q\_X}\cdot a0_{q\_0}, \ldots, \alpha X0_{q\_na0-1}-s_{q\_X}\cdot a0_{q\_na0-1})$ and the value $$\gamma_Z = \sum_{i2,j0,q} (e20_{q\_i2,q\_j0}\cdot \alpha Z2_{q\_i2}\cdot b0_{q\_j0}) + \sum_{i0,j2,q}(e02_{q\_i0,q\_j2}\cdot \alpha Z0_{q\_i0}\cdot b2_{q\_j2}) + \rho_Z,$$

and transmits the number sequence and the value to the party Y, the party-Z fourth computation means receives the number sequence $(\alpha Y1_{q\_0}-s_{q\_Y}\cdot a1_{q\_0}, \ldots, \alpha Y1_{q\_na1-1}-s_{q\_Y}\cdot a1_{q\_na1-1})$ from the party X and the number $\rho_Y$ from the party Y, computes a value $$\gamma'_Y = \sum_{i1,j2,q} \{(\alpha Y1_{q\_i1}-s_{q\_Y}\cdot a1_{q\_i1})\cdot b2_{q\_j2}-s_{q\_Y}\cdot r_{q\_Y}\}+\rho_Y,$$

and transmits the value to the party X, and the party-Z misuse detection means receives a value $\gamma_X$ from the party X and a value $\gamma'_X$ and the number sequence $(\alpha X1_{q\_0}-s_{q\_X}\cdot a1_{q\_0}, \ldots, \alpha X1_{q\_na1-1}-s_{q\_X}\cdot a1_{q\_na1-1})$ from the party Y, computes $$\sum_{i1,j0,q}\{(\alpha X1_{q\_i1}-s_{q\_X}\cdot a1_{q\_i1})\cdot b0_{q\_j0}+s_{q\_X}\cdot c_{q\_X}\}-\gamma_X+\gamma'_X,$$

ends the processing by outputting data indicating a misuse detection if the result of the computation is not 0, and outputs the values $c_{q\_2}$ and $c_{q\_0}$ if the result of the computation is 0.

11. A secure sum-of-product computation system used for performing, in parallel, a total of m sets of sum-of-product computations of data strings $A_{q\_0}=(a0_{q\_0},\ldots,a0_{q\_na0-1})$ and $A_{q\_1}=(a1_{q\_0},\ldots,a1_{q\_na1-1})$ and $B_{q\_0}=(b0_{q\_0},\ldots b0_{q\_nb0-1})$ and $B_{q\_1}=(b1_{q\_0},\ldots b1_{q\_nb1-1})$ by cooperative computation by three computation apparatuses, which are a party X, a party Y and a party Z, the sum-of-product computations being expressed as $$\sum_{q\_i0,q\_j1} = (e01_{q\_i0,q\_j1}\cdot a0_{q\_i0}\cdot b1_{q\_j1}) + \sum_{q\_i1,q\_j0}(e10_{q\_i1,q\_j0}\cdot a1_{q\_i1}\cdot b0_{q\_j0})$$

where $q=0,\ldots,m-1$, m represents an integer equal to or greater than 1, na0, na1, nb0 and nb1 represent natural numbers, $i0=0,\ldots,na0-1$, $i1=0,\ldots,na1-1$, $j0=0,\ldots,nb0-1$, and $j1=0,\ldots,nb1-1$, and $e01_{q\_i0,q\_j1}$ and $e10_{q\_i1,q\_j0}$ represent any numbers, and the data strings $A_{q\_0}, A_{q\_1}, B_{q\_0}$ and $B_{q\_1}$ being input to the party X, the data strings $A_{q\_1}$ and $B_{q\_1}$ being input to the party Y, and the data strings $A_{q\_0}$ and $B_{q\_0}$ being input to the party Z, wherein the party X comprises party-X random number generation means and party-X computation means, the party-X random number generation means generates numbers $c_{q\_1}$ and $\gamma_1$ and number sequences $(\alpha 1_{q\_0},\ldots,\alpha 1_{q\_nb0-1})$ and $(\beta 1_{q\_0},\ldots,\beta 1_{q\_na0-1})$ and transmits the numbers and the number sequences to the party Y, the party-X computation means computes values $c_{q\_0}$ and $\gamma_0$ according to $$c_{q\_0} = \sum_{q\_i0,q\_j1}(e01_{q\_i0,q\_j1}\cdot a0_{q\_i0}\cdot b1_{q\_j1}) +$$
$$\sum_{q\_i1,q\_j0}(e10_{q\_i1,q\_j0}\cdot a1_{q\_i1}\cdot b0_{q\_j0}) - c_{q\_1}$$

$$\gamma_0 = \sum_{i0,j0,q}(a0_{q\_i0}\cdot \beta 1_{q\_j0} + b0_{q\_j0}\cdot \alpha 1_{q\_j0}) - \gamma_1$$

and transmits the values to the party Z, the party Y comprises party-Y random number generation means and party-Y computation means, the party-Y random number generation means generates a number $s_q$ and transmits the number to the party Z and the party-Y computation means receives the numbers $c_{q\_1}$ and $\gamma_1$ and the number sequences $(\alpha 1_{q\_0},\ldots,\alpha 1_{q\_nb0-1})$ and $(\beta 1_{q\_0},\ldots,\beta 1_{q\_na0-1})$ from the party X, computes number sequences $(\alpha 0_{q\_0},\ldots,\alpha 0_{q\_nb0-1})$ and $(\beta 0_{q\_0},\ldots,\beta 0_{q\_na0-1})$ and a value $\gamma'$ according to $$\alpha 0_{q\_j0} = \sum_{q,q\_i1} s_q\cdot e10_{q\_i1,q\_j0}\cdot a1_{q\_i1} - \alpha 1_{q\_j0}$$

-continued $$\beta 0_{q\_i0} = \sum_{q,q\_j1} s_q \cdot e01_{q\_i0,q\_j1} \cdot b1_{q\_j1} - \beta 1_{q\_i0},$$

$$\gamma' = \sum_q s_q \cdot c_{q\_1} - \gamma_1$$

and transmits the number sequences and the value to the party Z, the party Z comprises misuse detection means and receives the values $c_{q\_0}$ and $\gamma_0$ from the party X and the number $s_q$, the number sequences $(\alpha 0_{q\_0}, \ldots, \alpha 0_{q\_nb0-1})$ and $(\beta 0_{q\_0}, \ldots, \beta 0_{q\_na0-1})$ and the value $\gamma'$ from the party Y, computes $$\sum_q s_q \cdot c_{q\_0} - \gamma_0 - \sum_{i0,j0,q} (a0_{q\_i0} \cdot \beta 0_{q\_i0} + b0_{q\_j0} \cdot \alpha 0_{q\_j0}) + \gamma',$$

and ends the processing by outputting data indicating a misuse detection if the result of the computation is not 0, and the party X outputs the values $c_{q\_0}$ and $c_{q\_1}$, the party Y outputs the value $c_{q\_1}$ and 0, and the party Z outputs 0 and the value $c_{q\_0}$ if the result of the computation by the misuse detection means is 0.

12. A secure sum-of-product computation system used for performing, in parallel, a total of m sets of sum-of-product computations of data a0 and a1 and data strings $B_{q\_0}=(b0_{q\_0}, \ldots, b0_{q\_nb0-1})$ and $B_{q\_1}=(b1_{q\_0}, \ldots, b1_{q\_nb1-1})$ by cooperative computation by three computation apparatuses, which are a party X, a party Y and a party Z, the sum-of-product computations being expressed as $$\sum_{q\_i} a0 \cdot b1_{q\_i} + \sum_{q\_i} a1 \cdot b0_{q\_i}$$

where $q=0, \ldots, m-1$, m represents an integer equal to or greater than 1, n represents a natural number, and $i=0, \ldots, n-1$, and the data a0 and a1 and the data strings $B_{q\_0}$ and $B_{q\_1}$ being input to the party X, the data a1 and the data string $B_{q\_1}$ being input to the party Y, and the data a0 and the data string $B_{q\_0}$ being input to the party Z, wherein the party X comprises party-X random number generation means and party-X computation means, the party-X random number generation means generates numbers $c_{q\_1}$ and $\gamma_1$, a number sequence $(\alpha 1_{q\_0}, \ldots, \alpha 1_{q\_n-1})$ and a number $\beta 1$ and transmits the numbers and the number sequence to the party Y, the party-X computation means computes values $c_{q\_0}$ and $\gamma_0$ according to $$c_{q\_0} = \sum_{q\_i} a0 \cdot b1_{q\_i} + \sum_{q\_i} a1 \cdot b0_{q\_i} - c_{q\_1}$$

$$\gamma_0 = a0 \cdot \beta 1 + \sum_{i,q} b0_{q\_i} \cdot \alpha 1_{q\_i} - \gamma_1$$

and transmits the values to the party Z, the party Y comprises party-Y random number generation means and party-Y computation means, the party-Y random number generation means generates a number $s_q$ and transmits the number to the party Z, the party-Y computation means receives the numbers $c_{q\_1}$ and $\gamma_1$, the number sequence $(\alpha 1_{q\_0}, \ldots, \alpha 1_{q\_n-1})$ and the number $\beta 1$ from the party X, computes a number sequence $(\alpha 0_{q\_0}, \ldots, \alpha 0_{q\_n-1})$ and numbers $\beta 0$ and $\gamma'$ according to $$\alpha 0_{q\_i} = \sum_q s_q \cdot a1 - \alpha 1_{q\_i}$$

$$\beta 0 = \sum_{i,q} s_q \cdot b1_{q\_i} - \beta 1$$

$$\gamma' = \sum_q s_q \cdot c_{q\_1} - \gamma_1,$$

and transmits the number sequence and the values to the party Z, the party Z comprises misuse detection means and receives the values $c_{q\_0}$ and $\gamma_0$ from the party X and the number $s_q$, the number sequence $(\alpha 0_{q\_0}, \ldots, \alpha 0_{q\_n-1})$ and the values $\beta 0$ and $\gamma'$ from the party Y, computes $$\sum_q s_q \cdot c_{q\_0} - \gamma_0 - a0 \cdot \beta 0 - \sum_{i,q} b0_{q\_i} \cdot \alpha 0_{q\_i} + \gamma',$$

and ends the processing by outputting data indicating a misuse detection if the result of the computation is not 0, and the party X outputs the values $c_{q\_0}$ and $c_{q\_1}$, the party Y outputs the value $c_{q\_1}$ and 0, and the party Z outputs 0 and the value $c_{q\_0}$ if the result of the computation by the misuse detection means is 0.

13. A computation apparatus that is used in performing a sum-of-product computation by three computation apparatuses in cooperation, the three computation apparatuses serving as a party X, a party Y and a party Z and performing symmetric processings, wherein provided that any of the computation apparatuses is a party P, it is assumed that the party Z is a party $P_-$, the party Y is a party $P_+$, and subscripts 0p and 1p are 0 and 1, respectively, if the party P is the party X, the party X is the party $P_-$, the party Z is the party $P_+$, and the subscripts 0p and 1p are 1 and 2, respectively, if the party P is the party Y, and the party Y is the party $P_-$, the party X is the party $P_+$, and the subscripts 0p and 1p are 2 and 0, respectively, if the party P is the party Z, na0p, na1p, nb0p and nb1p represent natural numbers, i0p=0, ... na0p−1, i1p=0, ... , na1p−1, j0p=0, ... , nb0p−1, and j1p=0, ... , nb1p−1, $e0p1p_{i0p,j1p}$, $e1p0p_{i1p,j0p}$, $e0p0p_{i0p,j0p}$ and $e1p1p_{i1p,j1p}$ represent any numbers, and the party P comprises:

random number generation means that generates a number $r_P$ and transmits the number to the party $P_+$;

first computation means that receives data strings $A_{0p}=(a0p_0, \ldots, a0p_{na0p-1})$, $A_{1p}=(a1p_0, \ldots, a1p_{na1p-1})$, $B_{0p}=(b0p_0, \ldots, b0p_{nb0p-1})$ and $B_{1p}=(b1p_0, \ldots, b1p_{nb1p-1})$, computes a value $c_P$ according to $$c_P = \sum_{i0p,j1p} (e0p1p_{i0p,j1p} \cdot a0p_{i0p} \cdot b1p_{j1p}) +$$

-continued $$c_{0p} = \sum_{i1p,j0p} (e1p0p_{i1p,j0p} \cdot a1p_{i1p} \cdot b0p_{j0p}) + r_P,$$

and transmits the value to the party $P_-$; and second computation means that receives a number $r_{P_-}$ from the party $P_-$ and a value $c_{P_+}$ from the party $P_+$ and computes $c_{0p}$ and $c_{1p}$ according to $$c_{0p} = \sum_{i0p,j0p} (e0p0p_{i0p,j0p} \cdot a0p_{i0p} \cdot b0p_{j0p}) + c_P - r_{P_-}$$

$$c_{1p} = \sum_{i1p,j1p} (e1p1p_{i1p,j1p} \cdot a1p_{i1p} \cdot b1p_{j1p}) + c_{P_+} - r_P.$$

14. A computation apparatus that is used in performing a sum-of-product computation by three computation apparatuses in cooperation, the three computation apparatuses serving as a party X, a party Y and a party Z and performing symmetric processings, wherein provided that any of the computation apparatuses is a party P, it is assumed that the party Z is a party $P_-$, and the party Y is a party $P_+$, and subscripts 0p, 1p and 2p are 0, 1 and 2, respectively, if the party P is the party X, the party X is the party $P_-$, the party Z is the party $P_+$, and the subscripts 0p, 1p and 1p are 1, 2 and 0, respectively, if the party P is the party Y, and the party Y is the party $P_-$, the party X is the party $P_+$, and the subscripts 0p, 1p and 2p are 2, 0 and 1, respectively, if the party P is the party Z, m represents an integer equal to or greater than 1, na0p, na1p, na2p, nb0p and nb1p represent natural numbers, $q=0,\ldots,m-1$, $i0p=0,\ldots,na0p-1$, $i1p=0,\ldots,na1p-1$, $i2p=0,\ldots,na2p-1$, $j0p=0,\ldots,nb0p-1$, and $j1p=0,\ldots,nb1p-1$, $e0p1p_{i0p,j1p}$, $e1p0p_{i1p,j0p}$, $e0p0p_{i0p,j0p}$ and $e1p1p_{i1p,j1p}$ represent any numbers, and the party P comprises:

first random number generation means that generates a number $r_{q\_P}$ and transmits the number to the party $P_+$;

first computation means that receives data strings $A_{q\_0p} = (a0p_{q\_0},\ldots,a0p_{q\_na0p-1})$ $A_{q\_1p} = (a1p_{q\_0},\ldots,a1p_{q\_na1p-1})$, $B_{q\_0p} = (b0p_{q\_0},\ldots,b0p_{q\_nb0p-1})$ and $B_{q\_1p} = (b1p_{q\_0},\ldots,b1p_{q\_nb1p-1})$, computes a value $c_{q\_P}$ according to $$c_{q\_P} = \sum_{q\_i0p,q\_j1p} (e0p1p_{q\_i0p,q\_j1p} \cdot a0p_{q\_i0p} \cdot b1p_{q\_j1p}) +$$
$$\sum_{q\_i1p,q\_j0p} (e1p0p_{q\_i1p,q\_j0p} \cdot a1p_{q\_i1p} \cdot b0p_{q\_j0p}) + r_{q\_P},$$

and transmits the value to the party $P_-$; and second computation means that receives a number $r_{q\_P-}$ from the party $P_-$, a value $c_{q\_P+}$ from the party $P_+$, computes values $c_{q\_0p}$ and $c_{q\_1p}$ according to $$c_{q\_0p} = \sum_{q\_i0p,q\_j0p} (e0p0p_{q\_i0p,q\_j0p} \cdot a0p_{q\_i0p} \cdot b0p_{q\_j0p}) + c_{q\_P} - r_{q\_P-}$$

$$c_{q\_1p} = \sum_{q\_i1p,q\_j1p} (e1p1p_{q\_i1p,q\_j1p} \cdot a1p_{q\_i1p} \cdot b1p_{q\_j1p}) + c_{q\_P+} - r_{q\_P};$$

15. The computation apparatus according to claim 14, wherein the parties $P_-$ and P previously share a number $s_{q\_P+}$, the parties P and $P_+$ previously share a number $s_{q\_P-}$, and the parties $P_+$ and $P_-$ previously share a number $s_{q\_P}$, and the party P further comprises:

second random number generation means that generates a number $\rho_P$ and transmits the number to the party $P_+$, and generates number sequences $(\alpha P\_0p_{q\_0},\ldots,\alpha P\_0p_{q\_na0p-1})$ and $(\beta P\_0p_{q\_0},\ldots,\beta P\_0p_{q\_nb0p-1})$ and transmits the number sequences to the party $P_-$;

third computation means that computes number sequences $(\alpha P\_0p_{q\_0}-s_{q\_P-}\cdot a0_{q\_0},\ldots,\alpha P\_0p_{q\_na0p-1}-s_{q\_P-}\cdot a0p_{q\_na0p-1})$ and $(\beta P\_0p_{q\_0}-s_{q\_P-}\cdot b0p_{q\_0},\ldots,\beta P\_0p_{q\_na0p-1}-s_{q\_P-}\cdot b0p_{q\_na0p-1})$ and transmits the number sequences to the party $P_+$, receives number sequences $(\alpha P1p_{q\_0},\ldots,\alpha P1p_{q\_na1p-1})$ and $(\beta P1p_{q\_0},\ldots,\beta P1p_{q\_nb1p-1})$ from the party $P_+$, computes a value $$\gamma_P = \sum_{i1p,j0p,q} (e1p0p_{i1p,j0p} \cdot \alpha P1p_{q\_i1p} \cdot b0p_{q\_j0p}) +$$
$$\sum_{i0p,j1p,q} (e0p1p_{i0p,j1p} \cdot a0p_{q\_i0p} \cdot \beta P1p_{q\_j1p}) + \rho_P,$$

and transmits the value to the party $P_-$;

fourth computation means that receives a value $\rho_{P-}$ from the party $P_-$, computes $$\gamma'_{P-} = \sum_q (-s_{q\_P-} \cdot r_{q\_P-}) + \rho_{P-},$$

and transmits the value to the party $P_+$; and misuse detection means that receives a value $\gamma_{P+}$ from the party $P_+$ and a value $\gamma'_{P+}$ and number sequences $(\alpha P_+2p_{q\_0}-s_{q\_P+}\cdot a2p_{q\_0},\ldots,\alpha P_+2p_{q\_na2p-1}-s_{q\_P+}\cdot a2p_{q\_na2p-1})$ and $(\beta P_+2p_{q\_0}-s_{q\_P+}\cdot b2p_{q\_0},\ldots,\beta P_+2p_{q\_na2p-1}-s_{q\_P+}\cdot b2p_{q\_na2p-1})$ from the party $P_-$, computes $$\sum_{i1p,i2p,j1p,j2p,q} \left\{ \begin{array}{l} (\alpha P_+2p_{q\_i2p} - s_{q\_P+} \cdot a2p_{q\_i2p}) \cdot b1p_{q\_j1p} + \\ (\beta P_+2p_{q\_j2p} - s_{q\_P+} \cdot b2p_{q\_j2p}) \cdot \\ a1p_{q\_i1p} + s_{q\_P+} \cdot c_{q\_P+} \end{array} \right\} - \gamma_{P+} + \gamma'_{P+},$$

ends the processing by outputting data indicating a misuse detection if the result of the computation is not 0, and outputs a values $c_{q\_0p}$ and $c_{q\_1p}$ if the result of the computation is 0.

16. A non-transitory computer readable medium including computer executable instructions that make a computer function as a computation apparatus according to claim 14.

17. The computation apparatus according to claim 14, wherein the parties $P_-$ and P previously share a number $s_{q\_P+}$, the parties P and $P_+$ previously share a number $s_{q\_P-}$, and the parties $P_+$ and $P_-$ previously share a number $s_{q\_P}$, and the party P further comprises:

second random number generation means that generates a number sequence $(\alpha P_+ 1p_{q\_0}, \ldots, \alpha P_+ 1p_{q\_na1p-1})$ and a number $\rho_P$ and transmits the number sequence and the number to the party $P_+$, and generates a number sequence $(\alpha P\_0p_{q\_0}, \ldots, \alpha P\_0p_{q\_na0p-1})$ and transmits the number sequence to the party $P_-$;

third computation means that computes a number sequence $(\alpha P\_0p_{q\_0} - s_{q\_P-} \cdot a0p_{q\_0}, \ldots, \alpha P\_0p_{q\_na0p-1} - s_{q\_P-} \cdot a0p_{q\_na0p-1})$ and transmits the number sequence to the party $P_+$, receives a number sequence $(\alpha P1p_{q\_0}, \ldots, \alpha P1p_{q\_na1p-1})$ from the party $P_+$ and a number sequence $(\alpha P0p_{q\_0}, \ldots, \alpha P0p_{q\_na0p-1})$ from the party $P_-$, computes a number sequence $(\alpha P_+ 1p_{q\_0} - s_{q\_P+} \cdot a1p_{q\_0}, \ldots, \alpha P_+ 1p_{q\_na1p-1} - s_{q\_P+} \cdot a1p_{q\_na1p-1})$ and a value $$\gamma_P = \sum_{i0p, j1p, q} (e0p1p_{i0p,j1p} \cdot \alpha P0p_{q\_i0p} \cdot b1p_{q\_j1p}) + \sum_{i1p, j0p, q} (e1p0p_{i1p,j0p} \cdot \alpha P1p_{q\_i1p} \cdot b0p_{q\_j0p}) + \rho_P,$$

and transmits the number sequence and the value to the party $P_-$;

fourth computation means that receives a number sequence $(\alpha P\_2p_{q\_0} - s_{q\_P-} \cdot a2p_{q\_0}, \ldots, \alpha P\_2p_{q\_na2p-1} - s_{q\_P-} \cdot a2p_{q\_na2p-1})$ from the party $P_+$ and a value $\rho_{P-}$ from the party $P_-$, computes a value $\gamma'_{P-}$ $$\gamma'_{P-} = \sum_{i2p, j0p, q} \{(\alpha P\_2p_{q\_i2p} - s_{q\_P-} \cdot a2p_{q\_i2p}) \cdot b0p_{q\_j0p} - s_{q\_P-} \cdot r_{q\_P-}\} + \rho_{P-},$$

and transmits the value to the party $P_+$; and misuse detection means that receives a value $\gamma_{P+}$ from the party $P_+$ and a value $\gamma'_{P+}$ and a number sequence $(\alpha P_+ 2p_{q\_0} - s_{q\_P+} \cdot a2p_{q\_0}, \ldots, \alpha P_+ 2p_{q\_na2p-1} - s_{q\_P+} \cdot a2p_{q\_na2p-1})$ from the party $P_-$, computes $$\sum_{i2p, j1p, q} \{(\alpha P_+ 2p_{q\_i2p} - s_{q\_P+} \cdot a2p_{q\_i2p}) \cdot b1p_{q\_j1p} + s_{q\_P} + \cdot c_{q\_P+}\} - \gamma_{P+} + \gamma'_{P+},$$

ends the processing by outputting data indicating a misuse detection if the result of the computation is not 0, and outputs a values $c_{q\_0p}$ and $c_{q\_1p}$ if the result of the computation is 0.

* * * * *